March 27, 1962  C. W. HARGENS III, ET AL  3,027,086
DEVICE FOR COMPUTING RELATIVE CONCENTRATIONS
OF ELEMENTS IN A MIXTURE
Filed Jan. 20, 1956  23 Sheets-Sheet 1

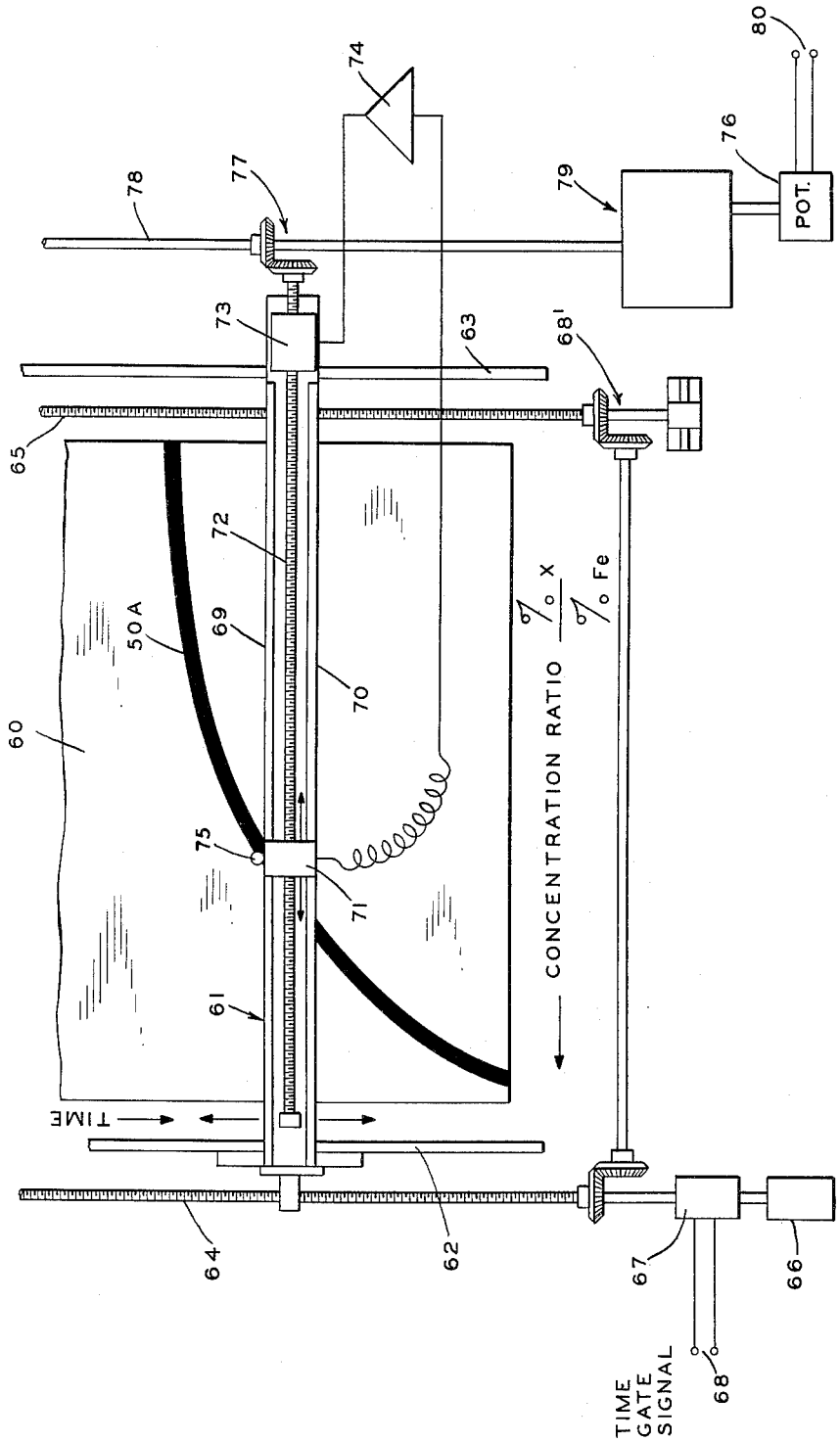

March 27, 1962 C. W. HARGENS III, ET AL 3,027,086
DEVICE FOR COMPUTING RELATIVE CONCENTRATIONS
OF ELEMENTS IN A MIXTURE
Filed Jan. 20, 1956 23 Sheets-Sheet 4

March 27, 1962  C. W. HARGENS III, ET AL  3,027,086
DEVICE FOR COMPUTING RELATIVE CONCENTRATIONS
OF ELEMENTS IN A MIXTURE
Filed Jan. 20, 1956  23 Sheets-Sheet 5

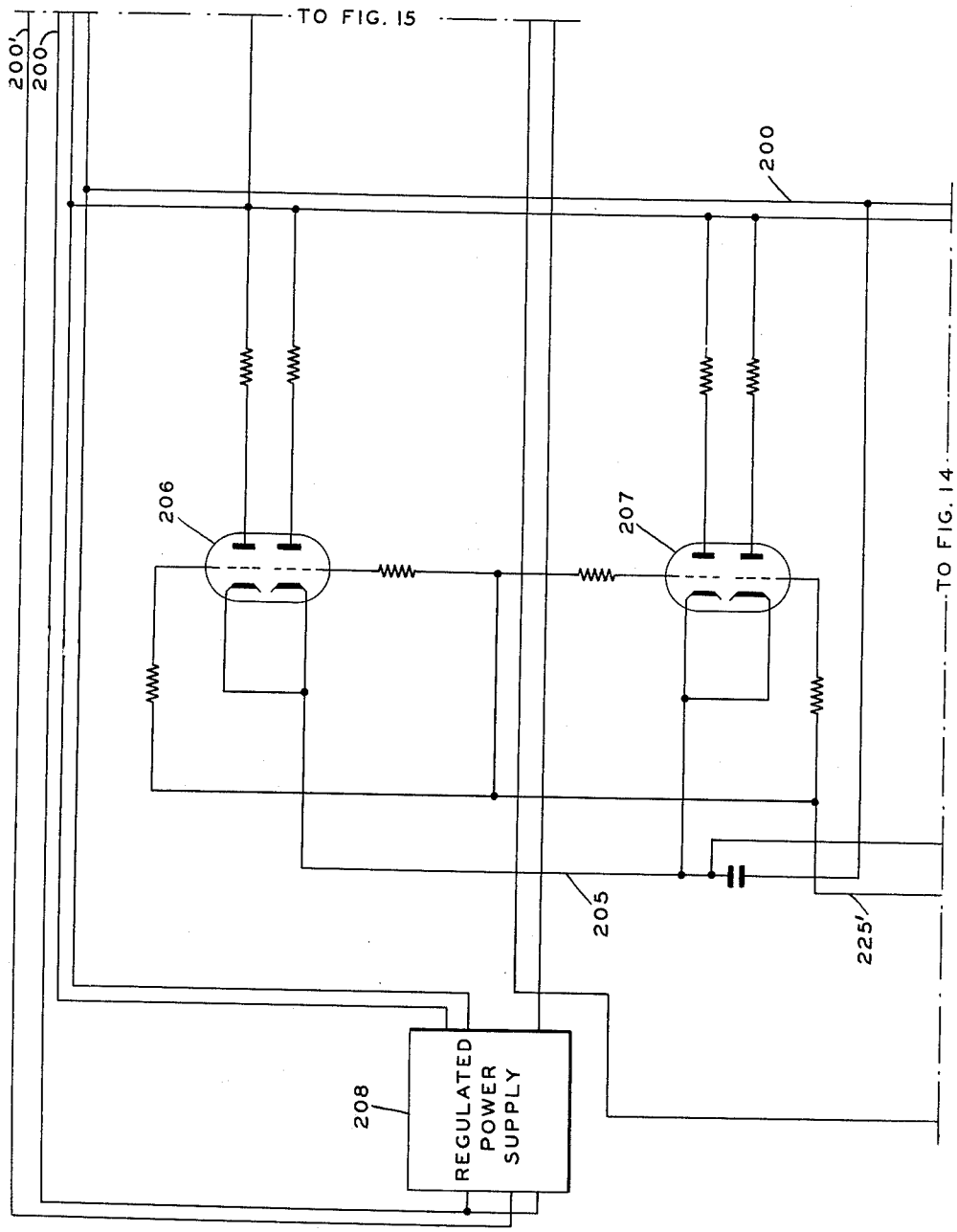

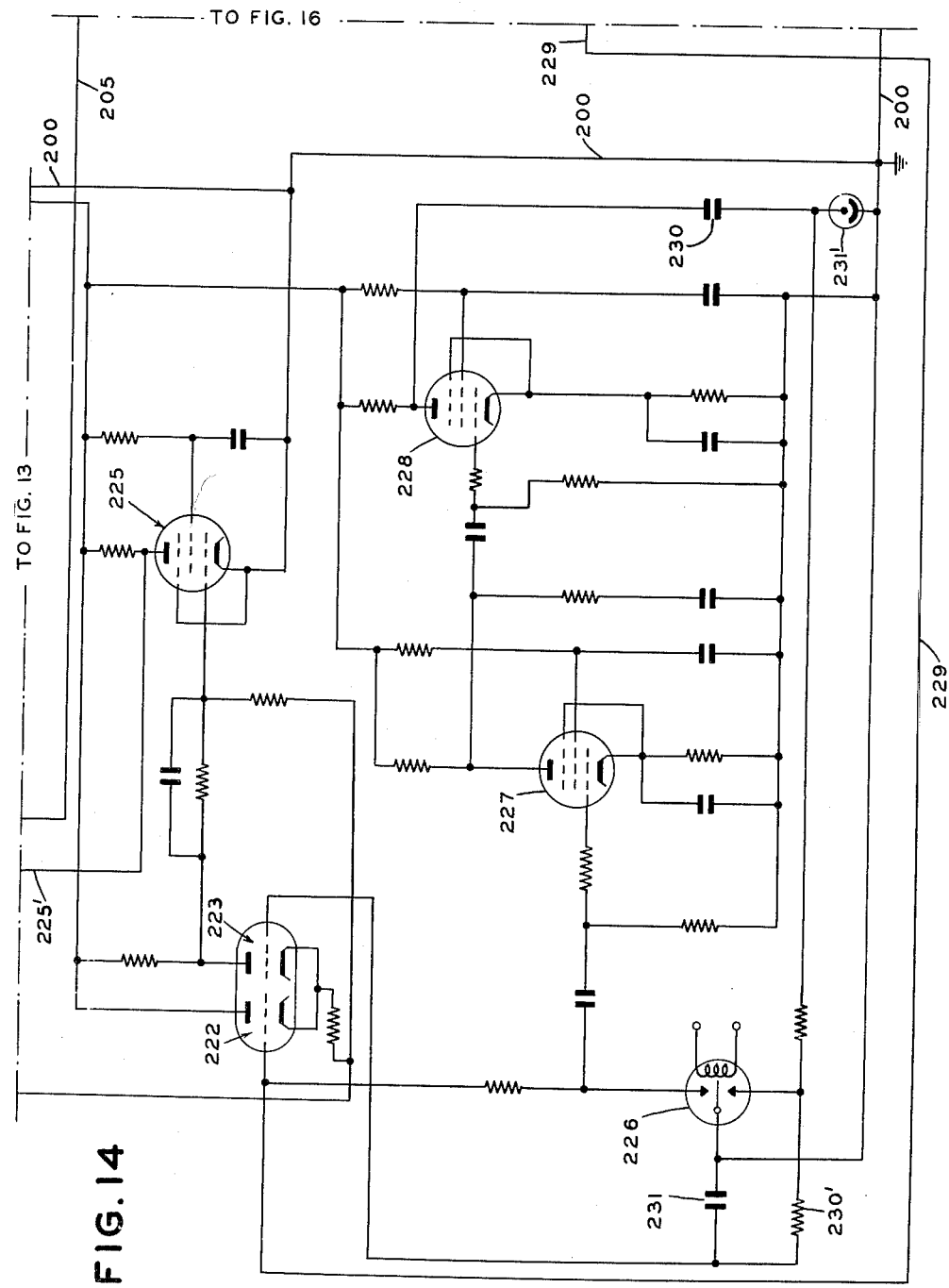

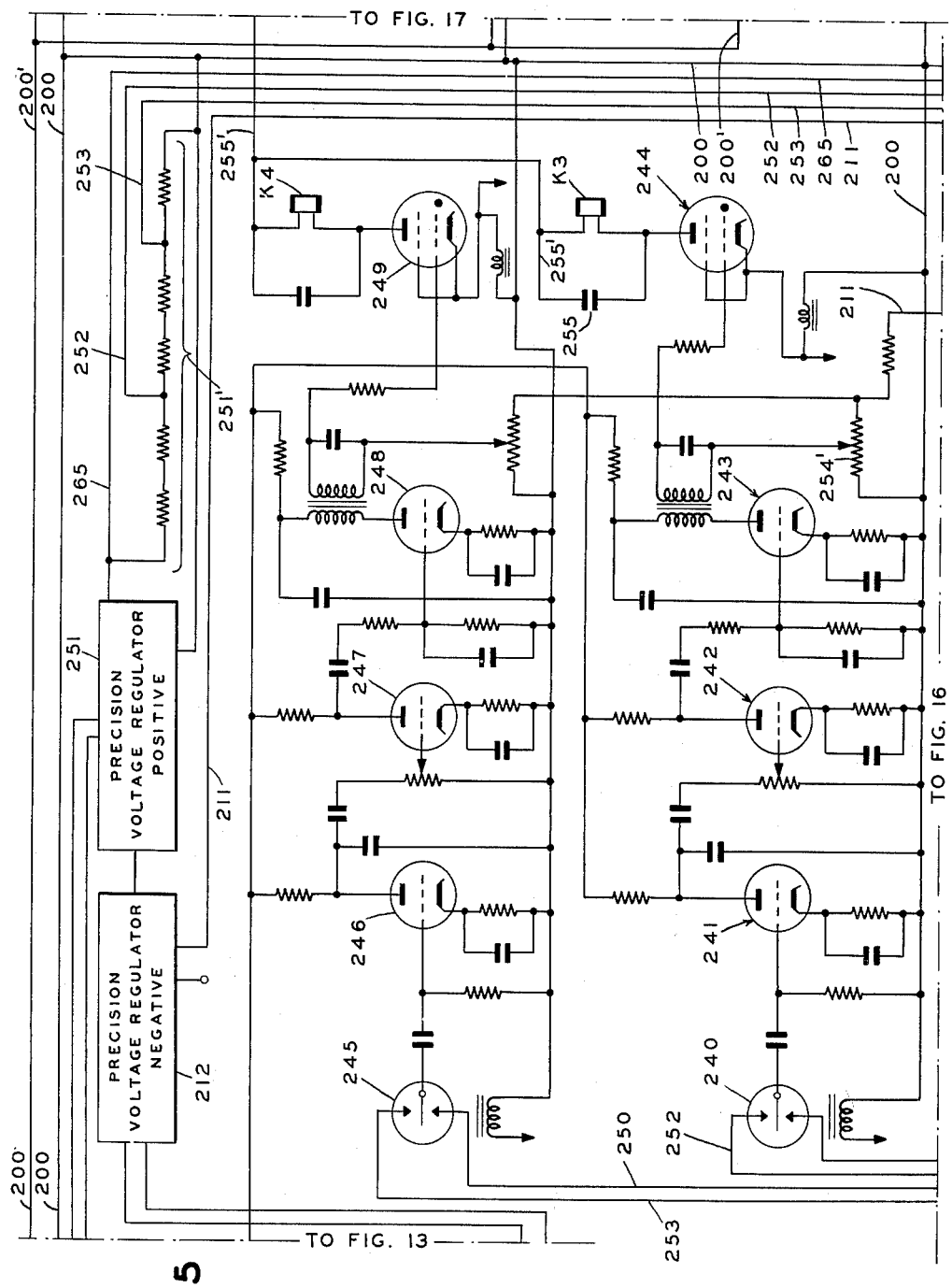

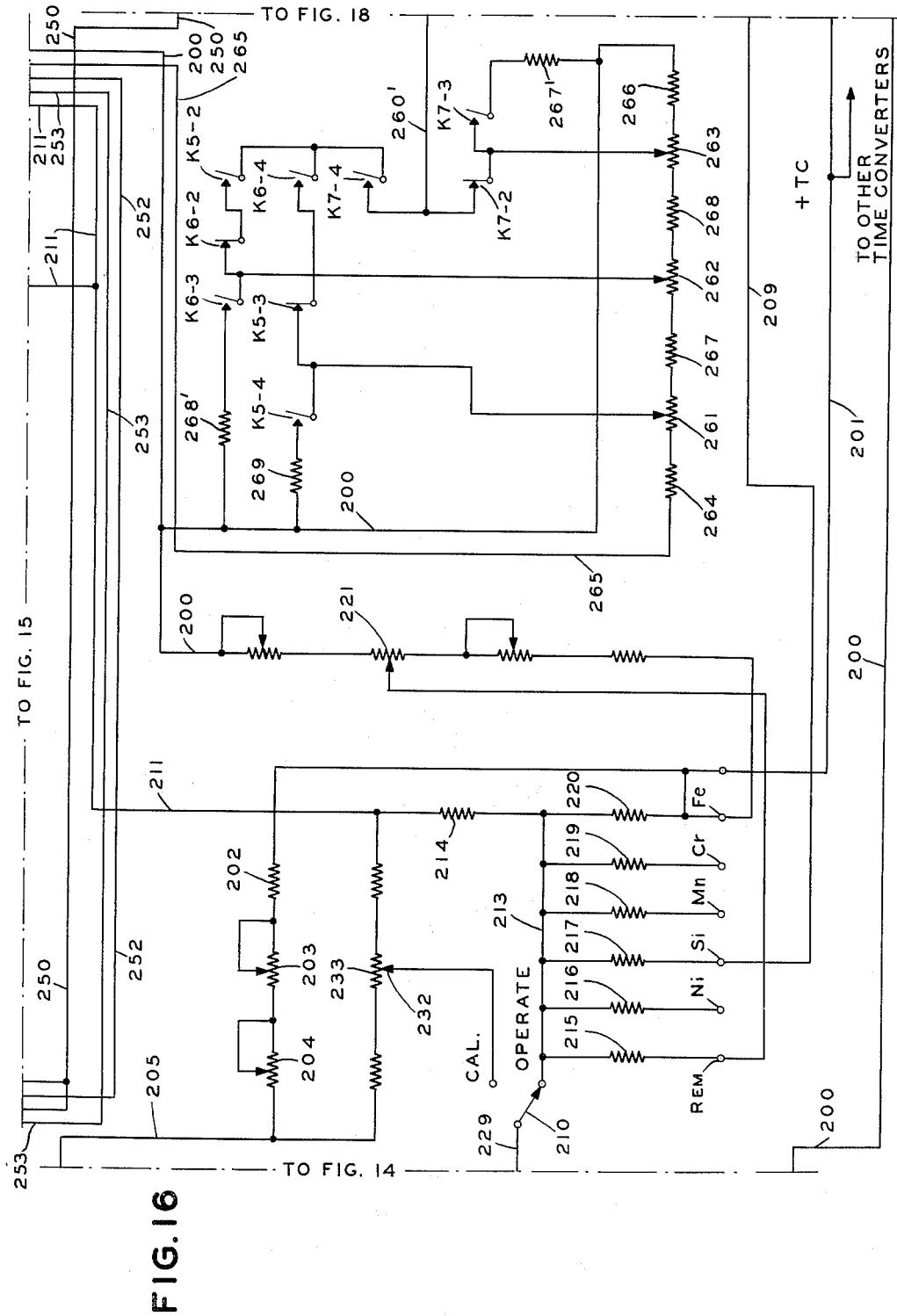

March 27, 1962 C. W. HARGENS III, ET AL 3,027,086
DEVICE FOR COMPUTING RELATIVE CONCENTRATIONS
OF ELEMENTS IN A MIXTURE
Filed Jan. 20, 1956 23 Sheets-Sheet 13

March 27, 1962 C. W. HARGENS III, ET AL 3,027,086
DEVICE FOR COMPUTING RELATIVE CONCENTRATIONS
OF ELEMENTS IN A MIXTURE
Filed Jan. 20, 1956 23 Sheets-Sheet 17

United States Patent Office 3,027,086
Patented Mar. 27, 1962

3,027,086
DEVICE FOR COMPUTING RELATIVE CONCENTRATIONS OF ELEMENTS IN A MIXTURE
Charles W. Hargens III, Oreland, and Paul R. Irish and William F. Horscroft, Jr., Bethlehem, Pa., assignors to Bethlehem Steel Company, Bethlehem, Pa., a corporation of Pennsylvania
Filed Jan. 20, 1956, Ser. No. 560,341
42 Claims. (Cl. 235—193)

The present invention relates to the conversion of data from one form to another and more particularly to a method and apparatus for operating on data available in a not readily usable form to convert the same into a readily usable form. The invention is of particular importance in connection with spectrochemical analysis, and will be described in connection therewith, but it should be understood that it will have utility in other fields.

In the modern direct reading spectrograph, photographic films have been replaced by electronic detection devices which register the line intensity at the output slits of the spectrograph. These electronic detectors have been connected so as to compare the line intensity produced by a constituent element with the line intensity produced by another or reference element. The result of this comparison, which is made electrically, has been the operation of an electric clock or other device which presents the ratio of these intensities as a unit of time. In order to render the reading intelligible it has been necessary for the operator of the spectrograph to read the times registered upon the clock dials and to make computations either mathematically or through the use of graphs in order to obtain the percent concentration of any alloying element.

For many industrial applications, such as in the manufacture of steel, it is highly desirable to provide means for speedily, accurately and reliably checking the percent concentration of the various constituents of a product batch, such as a heat of steel. Heretofore, such determinations have been made in the laboratory under conditions making it difficult to achieve both speed and accuracy. The present invention is aimed at providing means for overcoming these disadvantages to spectrochemical analysis to the end that process and product control may be materially facilitated.

In accordance with the present invention, the steps of clock reading and computation are eliminated and the corresponding functions are rendered entirely automatic. The apparatus of the invention produces directly a record of the percent concentration of the constituent elements of the sample. The apparatus automatically accepts from the spectrograph electrical data representing a time function of the spectral line intensities, computes the percent concentrations of the elements, and yields a printed record of the analysis.

In general, the principal object of the present invention has been to provide a method and apparatus for operating on data supplied in a not readily usable form to convert the same into a readily usable form. The invention is particularly concerned with the conversion of data, which is supplied in a form representative of a time function of certain desired information, into a direct indication of the desired information.

A principal object of the present invention has been to provide a method and apparatus for automatically, speedily and accurately converting the spectrograph time function output into a direct indication of the percent concentration of the constituents of a sample subjected to spectrographic analysis.

In a modern direct reading spectrograph, for example, one of the type described in Saunderson et al. Patent 2,577,814, granted December 11, 1951, or in Geffner et al. Patent 2,446,874, granted August 10, 1948, the material to be analyzed is formed into an electrode which is caused to spark by connecting it across a high voltage source. Light from this spark is broken up into spectral lines for analysis. Where the percent concentration of a particular element is very small, it often happens that the spark test range of the direct reading spectrograph is exceeded so that, in place of a spark test of the material, an arc test must be made to determine accurately the percent concentration of the particular low concentration element or elements.

It has been a further object of the present invention to provide apparatus which responds to a situation in which the spark test range is exceeded to initiate an arc test and to use the results of the arc test in supplying the final results desired.

Where an element concentration is extremely low, it somtimes happens that the spectrograph range even for an arc test is exceeded. It has been a feature of the invention to provide apparatus responsive to such a situation to yield directly an indication that the element percent concentration is below the effective range of the spectrograph.

Another feature of the invention has been the provision of apparatus which will combine with the test data in the printed results certain standard information which will facilitate interpretation and use of the test data.

Other and further objects, features and advantages of the invention will appear more fully from the following description of the invention.

In accordance with the invention, a plurality of items of primary data, which vary individually as functions of items of intermediate data, are converted into electrical parameters each representative of a respective item of intermediate data, the items of intermediate data being interrelated in accordance with a predetermined mathematical functional relationship. A plurality of electrical quantities proportional to a respective one of the items of intermediate data are derived from the electrical parameters and are used to solve the mathematical functional relationship and thereby to produce a plurality of electrical outputs constituting a solution of the mathematical functional relationship. Each of the outputs is proportional to a respective item of final data. The electrical outputs are used to render the items of final data readily available.

Data received from a spectrograph such as the one described in the above mentioned Saunderson et al. and Geffner et al. patents may be in the form of electrical gates whose lengths represent concentration ratios. The time durations of the electrical gates are converted into specific values of some parameter such as voltage or resistance in an electrical network. This conversion may be achieved, for example, through the use of a synchronous timing motor and an electrically operated clutch which is capable of driving a variable function resistance unit. The electrical parameter representing concentration ratio is incorporated in a computing circuit which solves the basic arithmetical equations necessary for conversion from percent concentration ratios to actual percent concentration. These equations may be written as follows:

(1) $$\%\text{Fe} = \frac{100}{1 + \frac{\%x}{\%\text{Fe}} + \frac{\%y}{\%\text{Fe}} + \frac{\%z}{\%\text{Fe}} \cdots}$$

(2) $$\%x = \%\text{Fe}\left(\frac{\%x}{\%\text{Fe}}\right)$$

In these equations Fe represents the reference element, e.g., iron, and $x$, $y$ and $z$ represent the elements alloyed with the reference element. Solution of these equations implies that the voltages or currents representing the true percent concentrations of alloy elements will occur at some point within the computer network. Equations 1 and 2, which are really a single equation since Equation 2 is a simple identity, are equivalent to an expression of the principle that the whole is equal to the sum of its parts.

These voltage or current quantities representative of the true percent concentration are accurately measured and the measured quantities are used to provide a printed indication of the true percent concentrations. For example, the measured quantities may be converted into a teletype code which is combined with other information in teletype code and used to operate a teletype printer. The term "teletype" as used in the specification and claims herein is intended to include not only Teletype printers but also all similar electrical typing and printing devices. When the quantity of an alloy element is below a certain level at which the instrument calibration becomes unreliable, a "less than" indication may be printed for this element. In addition, a value for the lowest concentration ratio may be printed to indicate that the corresponding element is present in some amount less than the value shown.

If the spark test in the spectrograph produces a percent concentration ratio for an alloy element below a useful level, the rest is repeated with an arc instead of a spark, and the results of the arc test for such element are converted into the parameter supplied to the computer. During such arc test the parameters provided for the other element or elements are retained ready for computation after the arc test conversion is completed. As indicated previously, when the arc test indicates a quantity of an element below a reliable level, the "less than" indication in the printed results is produced. Some spectrographs are excited by means other than arc and spark excitation, and these other excitation means are equally usable in the present invention. Furthermore, the descriptions herein of spark to arc transfer are equally applicable to transfer between any suitable excitation means.

The invention will now be described in greater detail with reference to the appended drawings, in which:

FIG. 3 is a diagrammatic representation of one suitable form of time converter for use in the system of the invention;

FIGS. 13–27, when arranged in accordance with FIG. 28, illustrate one example of a computer printer circuit arrangement in accordance with the invention; and FIG. 28 is a diagram illustrating the relationship of FIGS. 13–27 relative to each other.

Figure 1:
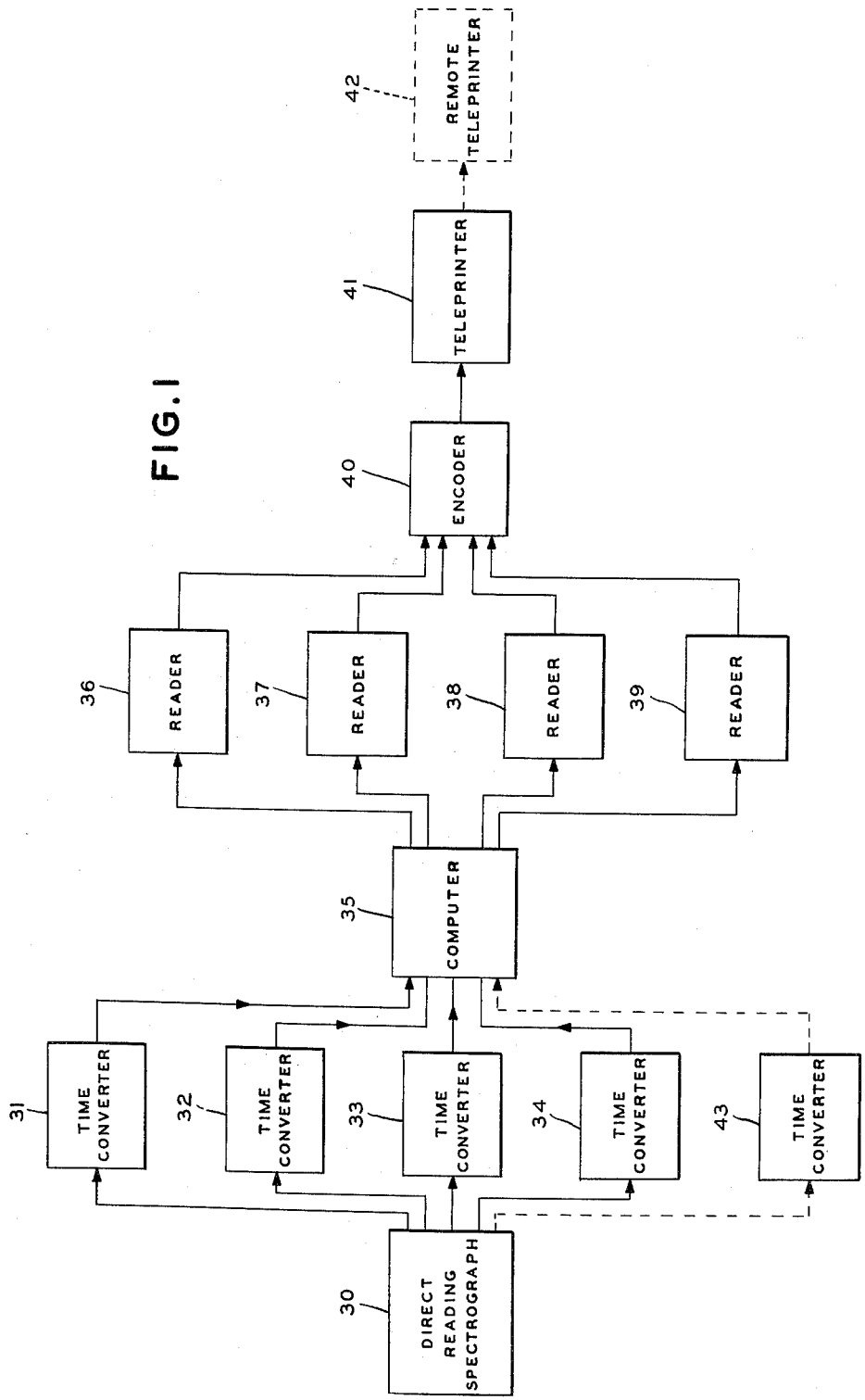
FIG. 1 is a block diagram showing the basic elements of a system in accordance with the invention.

Referring now to the drawings and more particularly to FIG. 1, there is shown a source 30 of data in some suitable form, e.g., electrical gates whose lengths represent concentration ratios. The source 30 might be, for example, a direct reading spectrograph of the type shown in the above mentioned Saunderson et al. patent. The output of such an instrument consists of long electrical pulses, the lengths of which are (inversely) proportional to the intensities (i.e., log intensities) of the spectral lines of the respective elements relative to the intensity of the reference element spectral line and hence to the ratios of concentration of these elements, respectively, to the reference element concentration. Thus, when testing a steel sample with a direct reading spectrograph, the output electrical gates might represent, for example, ratios of percentage concentration of silicon, manganese, chromium and nickel, respectively, to percentage concentration of iron. In other direct reading spectrographs, such as the one described in the above mentioned Geffner et al. patent, the output for each analyzed element may be relatively short pulses, the total number of which is a measure of the concentration ratio of the associated element to the reference element. In the specification and claims herein, the terms "impulses" and "signals" are intended to include a variety of time indications such as the long electrical pulses of the Saunderson et al. direct reader and the groups of short electrical pulses of the Geffner et al. direct reader.

These electrical gates have heretofore been converted to a time indication, as, for example, by operating clocks. In accordance with the invention, the spectograph output data is converted into analog quantities such as voltages, each voltage representing a particular concentration ratio. In the system of FIG. 1, the spectrograph output pulses are applied to respective time converters 31, 32, 33 and 34. The output of each time converter is a voltage or other parameter the amplitude of which is proportional to the associated concentration ratio. For some alloys, such as many aluminum alloys, the concentration of particular elements has a significant effect on the spectrograph output for other elements. Where this effect is pronounced, it may be desirable to interrelate the time converters so as to provide compensation therefor, whereby the time converter outputs will be approximately proportional to concentration ratio despite varying concentrations of such elements in different tests. These various time converter outputs are applied to a computer 35 which solves Equations 1 and 2 above. The output of the computer 35 is a group of voltages or other parameters each proportional to the actual concentration of a respective element in the test sample.

Should the output of the spectrograph or other instrument not be a time indication, for example, a voltage, current or mechanical displacement function, the "time converter" would be replaced by a comparable device which could act on the spectrograph output to convert the same to another parameter which would be suitable for the necessary computations.

The computer outputs should be measured and recorded to yield the desired analytical results. As shown in FIG. 1, each one of the computer outputs is applied to a respective one of readers 36, 37, 38 and 39, which perform the desired measuring function. If desired, a single reading device selectively responsive to the various computer outputs could be used. Each reader might be, for example, a self-balancing potentiometer which converts input voltage into proportionate output shaft rotation. Such shaft rotation or other measurement may be used to develop a code indication of percentage concentration, as, for example, a numerical indication of percentage concentration in teletype code. An encoder 40 may be provided to scan the output codes of the readers, to combine this information with other information supplied thereto, for example, information on the date, time, heat number, etc., and to operate a teleprinter 41 and, if desired, additional teleprinters 42. The reader output may also be visually registered.

In certain cases where the concentration of alloying elements is low, or where the matrix element remains relatively constant, the computer may be dispensed with and the time converter outputs may be applied directly to the respective readers.

Where the percent concentration ratio of an element is too low to provide accurate results with the associated time converter, the direct reading spectrograph 30 is caused to repeat the test with an arc instead of a spark. The time gate representing the result of the arc test for such element is applied to an additional time converter 43 which converts the time gate into the selected parameter for application to the computer 35. The output of the arc time converter 43 will replace the output of the spark time converter representing such low concentration element. During an arc test the remaining time converters will retain their information. It will be understood that additional time converters corresponding to the time converter 43 may be provided for each of the alloy elements where it is expected that under some circumstances such alloy elements will have very low concentrations.

The direct reading spectrograph 30 provides a number of electrical gate outputs, the time duration of each of such gates being a measure of the spectral line intensity ratio of a particular alloying element to a reference element. The number of outputs provided will depend on the number of significant alloying elements. For example, for certain types of steel, an output gate for each of manganese, silicon, chromium, nickel, vanadium, molybdenum, copper, cobalt, tungsten, titanium, tin, aluminum, lead, boron and niobium will be desired. For certain magnesium alloys, a separate output gate for each of aluminum, beryllium, cadmium, manganese, zinc, copper and silicon will be desired. It will be evident that the number of output gates employed can vary considerably depending on the particular alloy being analyzed. In general, an output gate should be provided for each significant element or, as will be explained hereinafter, a remainder term should be present in the equations to be solved by the computer.

For each spectrograph output gate there is provided at least one time converter. One or more additional time converters can be provided to accommodate arc operation for all or selected spectrograph outputs. Thus in FIG. 1, which assumes four spectrograph outputs, four time converters are arranged to receive the respective spectrograph output gates. Also in FIG. 1, one additional time converter is provided to accommodate arc operation for a selected element when the concentration of such element is below the accurate range of spark time converter calibration. If desired, two, three or four of such additional time converters could be provided so that any one or more of the elements could be analyzed by the arc test. Means should be provided to disconnect the spark time converters during the arc test and to connect to the spectrograph only the arc time converter or converters associated with the low concentration element or elements for which the spark test was inadequate.

The term "time converter" as used herein means the apparatus which receives a time signal or gate from the direct reading spectrograph and converts this representation of the element intensity ratio into a voltage or other parameter for use in the computer.

For any given alloying element there will, in general, be a non-linear relationship between spectrograph output signal duration and percent concentration ratio. An empirical calibration curve can be prepared for an alloying element by determining the time durations of the spectrograph output signals for a variety of generally similar alloys in which the percent concentration of the particular alloying element in question is known. A typical empirical calibration curve is shown at 50 in FIG. 2, which is a plot of percent concentration ratio $$\left(\text{designated } \frac{\%x}{\%\text{Fe}}\right)$$

vs. time signal duration (designated time). The function of the time converter is to measure the time signal duration and to produce a voltage or other parameter corresponding in amplitude or other characteristic to the height of the calibration curve for such time.

There are a number of mechanisms which can be used to perform this function. One such mechanism is illustrated diagrammatically in FIG. 3. In this figure, a surface 60, which might be, for example, a sheet of paper provided on a table top, has marked thereon, preferably in black, a curve 50A representing an accurately scaled plot of percent concentration ratio $$\left(\frac{\%x}{\%\text{Fe}}\right)$$

vs. time. The time scale is shown to the left of the figure and time increases from top to bottom. The concentration ratio scale is shown at the bottom of the figure, and percent concentration ratio increases from right to left. The percent concentration ratio is preferably drawn to a logarithmic scale. A carriage 61 mounted on guides 62 and 63 extends across the surface 60 and can be moved between the top and bottom of the surface 60 through rotation of lead screws 64 and 65, which are arranged for threaded engagement with the carriage 61. The lead screws 64 and 65 are arranged to be driven in either direction by an electric motor 66. The coupling mechanism between the motor 66 and the screws 64 and 65 includes an electrically operable clutch 67. Forward rotation of the motor 66 with the clutch 67 energized will cause the carriage 61 to travel from the 0 time position at the top of the sheet 60 toward a maximum time position at the bottom of the sheet 60. Reverse rotation of the motor 66 will return the carriage 61 to the 0 time position. The motor 66 is preferably a constant speed motor such as a synchronous motor, so that the distance traveled by the carriage 61 will be directly proportional to the period of energization of the clutch 67 when the latter is energized by application of a time gate signal to the terminals 68. The carriage 61 is provided with longitudinal guides 69 and 70 which carry an auxiliary carriage 71. This auxiliary carriage 71 is caused to travel laterally across the sheet 60 by rotation of the lead screw 72 which engages the auxiliary carriage. The lead screw 72 is rotated in either direction by an electric motor 73. The motor 73 which is preferably of the two-phase type is energized for rotation through a suitable servo amplifier 74.

The auxiliary carriage 71 carries a photocell 75 which is arranged to scan the edge of the black line 50A. When the photocell scans the white surface of the sheet 60, one of the two-phase windings of the motor 73 will be energized and will rotate the lead screw 72 in a sense to cause the photocell 75 to return to the edge of the curve 50A. When the photocell 75 scans the black line 50A, the servo motor 73 will rotate the lead screw 72 in a sense to return the photocell to the edge of the line 50A. In this way the photocell 75 will follow the edge of the line 50A as the carriage 61 is moved from top to bottom in the figure. It will be evident that the auxiliary carriage 71 will have its primary travel from right to left in order to follow the line 50A. For any given time, the lateral position of the photocell 75 will correspond to the percent concentration ratio associated with that time. At the end of the time gate signal, the clutch 67 will disengage the lead screws 64 and 65 and the carriage 61 will stop. At this time the lateral position of the photocell 75 will be a measure of the corresponding percent concentration ratio.

The motor 73 also operates a linear potentiometer 76, through a suitable gear train 77, a drive shaft 78 and a gear box 79. The potentiometer 76 will provide a voltage variation at its output terminals 80 corresponding to the percent concentration ratio associated with the lateral position of the photocell 75. Hence, the voltage at the terminals 80 at the time the clutch 67 disengages the lead screws 64 and 65 will be proportional to the percent concentration ratio corresponding to the duration of the time gate signal applied to the terminals 68. Thus, duration of the signal applied to the terminals 68 is converted into a voltage whose amplitude is directly proportional to the percent concentration ratio measured by the direct reading spectrograph which supplies the time signal to the terminals 68.

When the time converter is released, the motors 66 and 73 will be energized to return the carriage 61 and the auxiliary carriage 71 to their respective zero positions in preparation for the next measurement cycle.

If desired, the curve 50A can be broken up into a number of segments vertically displaced on the sheet 60. In such case the motor 73 should be energized to return the carriage 71 to an appropriate zero position when transferring from segment to segment. When such transfer takes place, a different range of the potentiometer 76 should be actuated. In lieu of the photo-electric sensing arrangement described in connection with FIG. 3, it will be evident that a magnetic sensing head or other appropriate curve following mechanism can be provided.

Figure 4:
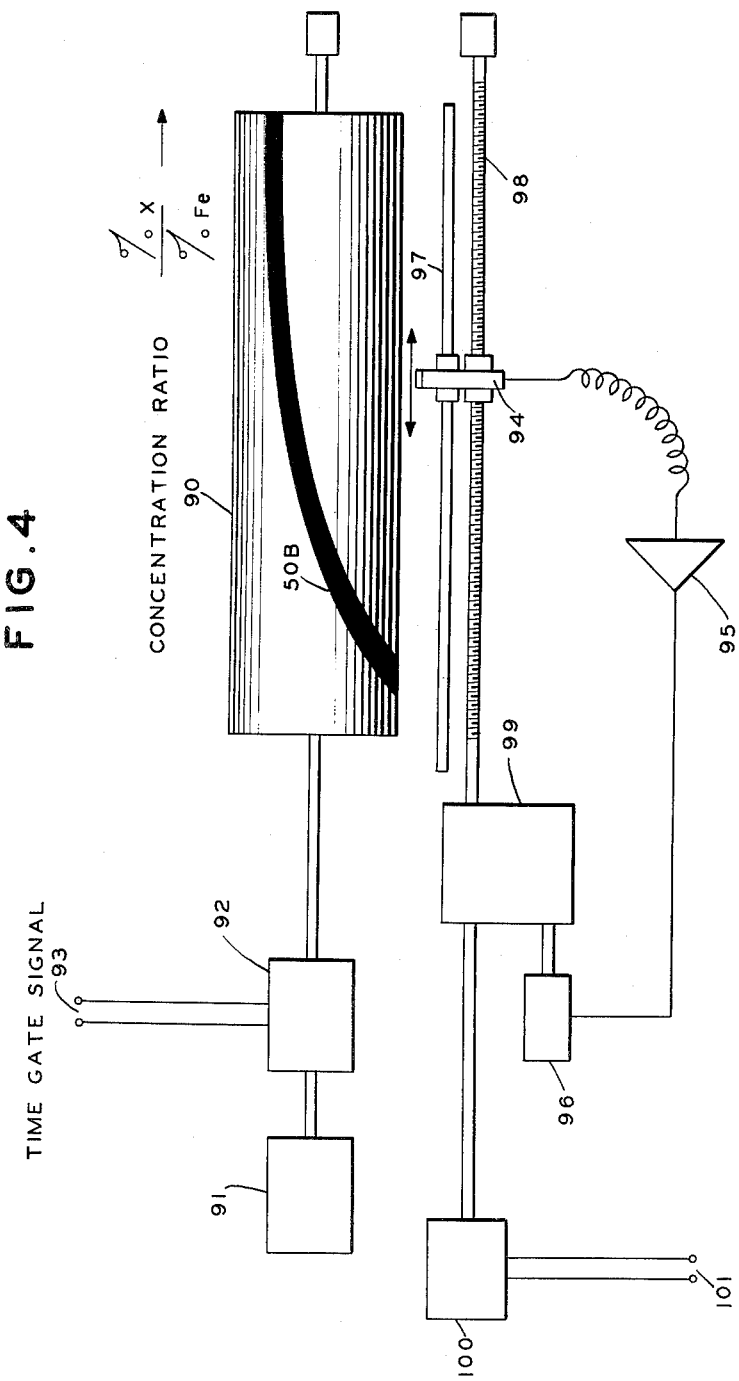
FIG. 4 is a diagrammatic representation of another suitable form of time converter for use in the system of the invention.

In FIG. 4 there is shown another form of time converter. In this form the time signal is provided by rotation of a drum 90. The drum 90 is arranged to be rotated by a constant speed motor 91 through an electrically operable clutch 92 which is energized by the time gate signal output of the direct reading spectrograph applied to the terminals 93. In general, the motor 91 and the clutch 92 correspond to the motor 66 and the clutch 67 of FIG. 3. Rotation of the drum 90 corresponds to travel of the carriage 61 of FIG. 3. A curve 50B corresponding to the curve 50A of FIG. 3 is provided on the surface of the drum 90. A sensing element 94 (shown in disengaged position) is arranged to scan the curve 50B in the same way that the photocell 75 scans the curve 50A. The sensing element 94 might be a photocell, a magnetic pick-up, or other suitable curve follower. A servo amplifier 95 operated by the sensing element 94 energizes a motor 96 in an appropriate direction to cause the sensing element 94 to scan the edge of the curve 50B. The sensing element 94 is carried on a guide 97 and is caused to move by a lead screw 98. Lead screw 98 is driven by motor 96 through a suitable gear train 99. A potentiometer 100, corresponding to the potentiometer 76, is likewise driven by the motor 96 so that the voltage output at terminals 101 will be directly proportional to the percent concentration ratio corresponding to the duration of the input time signal.

While either of the time converters described could be employed in the system of the invention, any other suitable mechanism can be used. A preferred form of time converter is described and claimed in James C. Heselwood Patent 2,913,694, issued November 17, 1959, and entitled "Controllable Function Potentiometer." This controllable function potentiometer has a number of advantages which render it desirable for use in the system of the instant invention. In particular, it is relatively easy to set up, requires a relatively small space, and provides high precision.

Basically, the controllable function potentiometer comprises a voltage divider with adjustable taps connected to the contact points of a switching device, a linear interpolating potentiometer connected to the wipers of the switching device, and a mechanical drive for operating these elements. A diagrammatic illustration of the controllable function potentiometer is shown in FIG. 5 with the switch plate and gear shown developed and an enlarged detail view of the contact points is shown in FIG. 6.

Figures 5, 6:
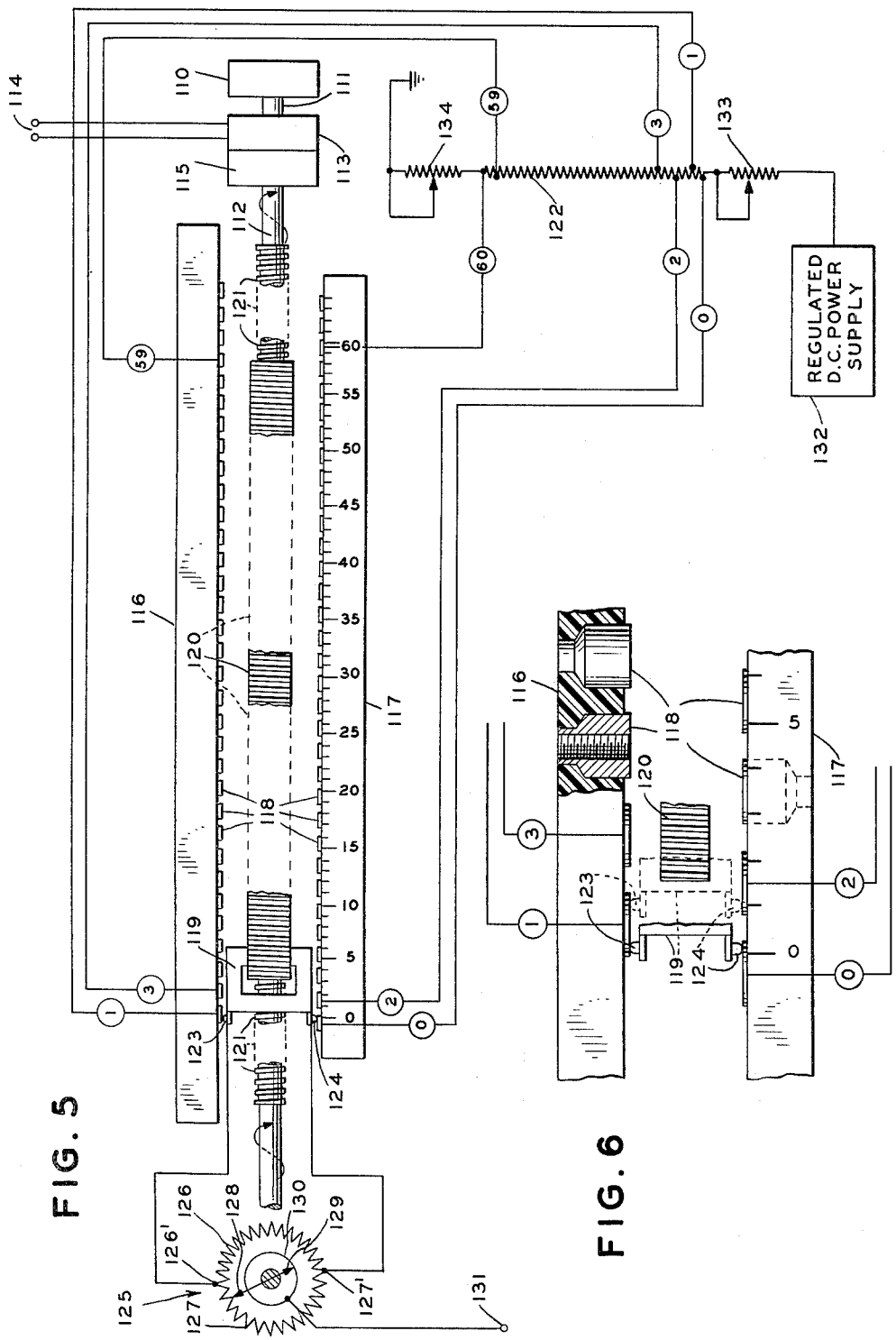
FIG. 5 is a diagrammatic representation of a preferred form of time converter for use in the system of the invention.
FIG. 6 is an enlarged detail view of a portion of FIG. 5.

The time base for the time converter of FIGS. 5 and 6 is provided by a synchronous or other constant speed motor 110 which is geared so that its output shaft 111 turns at a desired speed, e.g., 180 r.p.m. The shaft 111 is connected to a shaft 112 through an electric clutch 113 which is arranged to be energized by an output signal from a direct reading spectrograph applied to terminals 114. A brake 115 is provided to insure precise stopping of the shaft 112 when the clutch 113 is de-energized.

Two circular switch plates 116 and 117 (best seen developed in FIG. 6) are provided with contact points 118 arranged so that the contact points on one of the plates are staggered from the contact points on the other plate. A wiper carrying arm 119 is mounted on a gear 120 arranged to mesh with a worm 121 carried by the shaft 112 and is arranged to bridge corresponding contact points 118 provided on the switch plates 116 and 117. Each of the contact points 118 is connected to a respective tap of a potentiometer 122. Thus, the first contact point of the plate 117 is connected through a conductor designated 0 to a 0 tap of the potentiometer 122. The corresponding contact point of the plate 116 is connected through a conductor designated 1 to a tap designated 1 on the potentiometer 122. The number of taps provided on the potentiometer 122 and hence the number of contact points provided on the plates 116 and 117 will depend upon the time base employed and the precision desired. In the arrangement illustrated in FIG. 5, 60 taps are provided on the potentiometer 122. A wiper 123 carried on the arm 119 is arranged successively to engage the contact points of the switch plate 116 as the arm 119 is rotated. Similarly, a wiper 124 carried on the arm 119 is arranged successively to engage the contact points of the plate 117. The wipers 123 and 124 are insulated from each other. As will appear most clearly from FIG. 6, during a portion of the travel of the wiper 123 past the contact connected to the tap 1, the wiper 124 will make with the contact connected to the tap 0. During a later portion of the travel of wiper 123 past the contact connected to tap 1, the wiper 124 will make with the contact connected to tap 2. The staggered relationship of the contacts on the plate 116 and the contacts on the plate 117 causes alternate connection to continue as the arm 119 moves along.

Figure 2:
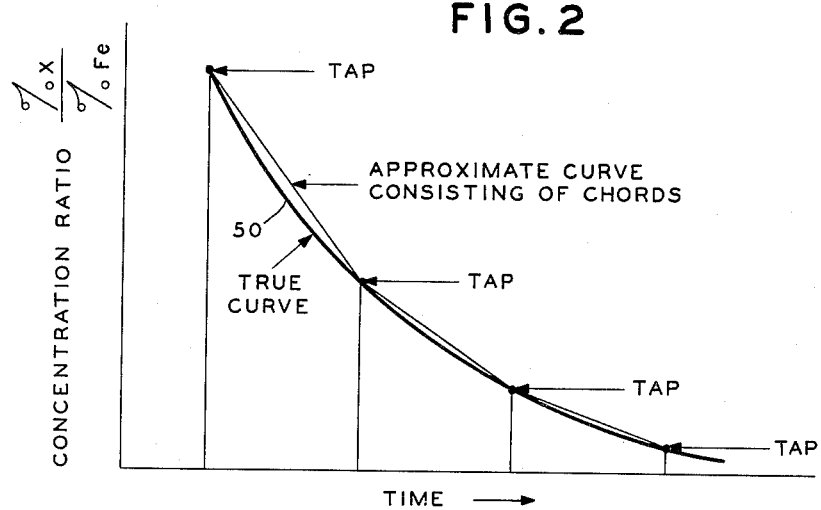
FIG. 2 is a typical spectrograph calibration curve showing the relationship of concentration ratio (in arithmetic scale) to time.
Figure 7:
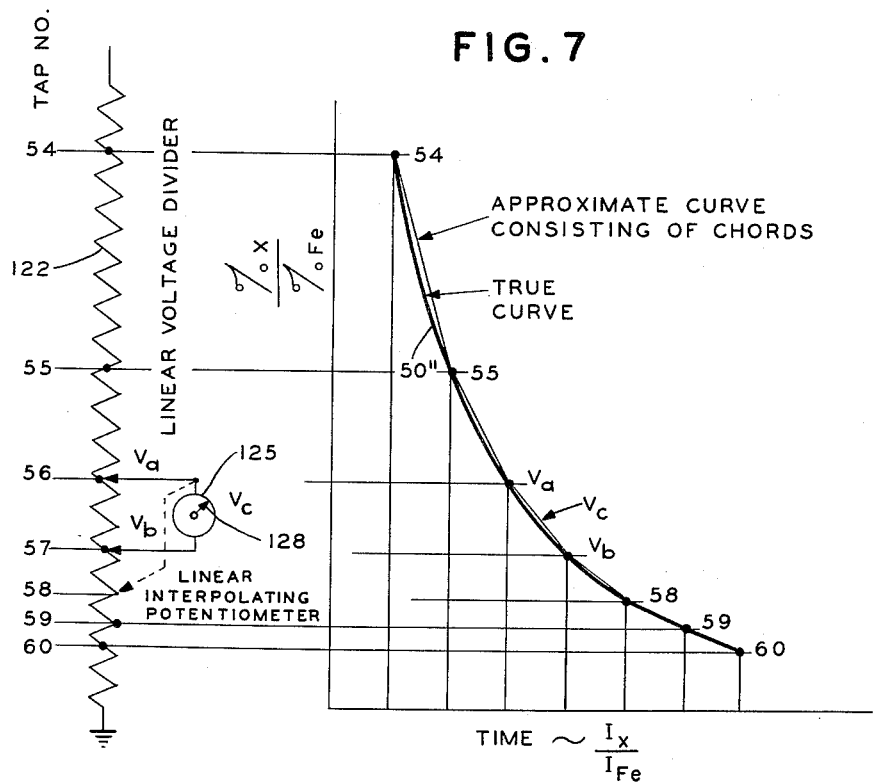
FIG. 7 illustrates the schematic relationship between the variable function potentiometer of FIG. 5 and a typical calibration curve.

For convenience, only a few of the taps on the potentiometer 122 have been illustrated. Each of the taps is adjustable to accommodate different characteristic curves. Each tap is set at a resistance position on the potentiometer 122 corresponding to the height of the characteristic curve relating the percent concentration ratio to time (e.g., the curve 50 of FIG. 2), having regard to the time elapsed between the 0 position of the arm 119 and its position when one of its wipers is connected to any particular tap of the potentiometer 122. It will be evident that the resistance between adjacent taps along the potentiometer 122 will, in general, be different. By making these taps adjustable, any particular characteristic curve can easily be simulated. Since only a finite number of taps is provided on the potentiometer 122, this potentiometer will be equivalent to an approximate curve consisting of chords joining points along the characteristic calibration curve. Such chords are shown in FIG. 2. As the number of taps provided is increased, the accuracy achieved will be increased. The resistance between adjacent taps on potentiometer 122 will correspond to the difference in amplitude between adjacent taps on the calibration curve. The schematic relationship between the potentiometer 122 and the calibration curve is illustrated in FIG. 7. This figure shows the potentiometer 122, which acts as a voltage divider, and also an interpolating potentiometer 125. Shown also is a calibration curve indicating the relationship between the electrical and mathematical quantities.

The interpolating potentiometer 125 has a pair of equal resistance elements 126 and 127 arranged to be wiped by a rotating contact 128 carried on the shaft 112. The junction points 126′ and 127′ of the resistance elements 126 and 127 are connected to the wipers 123 and 124, respectively. A second movable wiper 129, which is directly connected to the wiper 128, is arranged to wipe a conductive ring 130 which is connected to an output terminal 131.

The main potentiometer 122 and the interpolating potentiometer 125 provide adequate means for storing the functional relation between intensity (time) and concentration ratios. Each tap along the potentiometer 122 represents a definite equal interval along the time axis of the calibration curve. Since the calibration curve is logarithmic in shape, equal units of time will generally represent widely varying increments in voltage. Thus the taps in FIG. 7 have a staggered appearance along the linear voltage divider.

As the arm 119 is driven forward by the timing motor 110, the interpolating potentiometer is switched sequentially from one pair of taps to the next, such next pair including one of the taps of the previous pair. This may be seen most clearly from FIG. 7 in which the interpolating potentiometer 125 is connected to taps 56 and 57. The next tap change, as shown by the dotted line, will connect the potentiometer 125 between taps 57 and 58. The wiper 128 of the interpolating potentiometer itself rotates one-half revolution for each one-half rotation of the shaft 112. This is made to correspond to the time required for the wiper unit 119 to advance one pair of contacts along the plates 116 and 117. When the contact points 123 and 124 are connected to opposite contact points on the plates 116 and 117, for example, taps 0 and 1 as shown in FIG. 6, the resistance between the output terminal 131 and ground will be the resistance between tap 1 and ground plus the parallel resistance of two branches, a first extending between junction point 126′ and wiper 128, and the second including the resistance of potentiometer 122 between taps 0 and 1 and the resistance between junction point 127′ and wiper 128. It is evident that this resistance will be somewhere between the resistance to ground of the tap 0 and the resistance of the tap 1.

When the arm 119 is located so that wiper 124 engages the center of the 0 contact of plate 117 (a position slightly in advance of the solid line position of FIG. 6), wiper 123 will be spaced between adjacent contacts 65 and 1 of plate 116. At this time wiper 128 will engage junction point 127′ so that the resistance between terminal 131 and ground will be exactly the resistance between tap 0 and ground. As wipers 124 and 128 advance, the resistance between terminal 131 and ground will decrease toward the tap 1 resistance, which will be reached when wiper 123 engages the center of the 1 contact of plate 116 and wiper 128 engages junction point 126′. Thereafter, as the wipers advance through the dotted line position of FIG. 6 and to a position in which the wiper 124 engages the center of the 2 contact of plate 117 and the wiper 128 engages junction point 127′, the resistance between terminal 131 and ground will decrease toward the tap 2 resistance. The ratio between worm 121 and gear 120 and the spacing between adjacent contacts should be selected so that the arm 119 advances one contact pitch while the wiper 128 makes one-half a revolution.

While the interpolating potentiometer 125 is connected to any one pair of taps, its output varies linearly with time. However, upon moving to another pair of taps, the rate of variation changes so as to approximate the shape of the calibration curve. The reason for this change of rate lies in the fact that the resistance between adjacent taps of the potentiometer 122 is included in the resistance variation with time, and the resistance between any adjacent pair of taps will, in general, be different from the resistance between any other adjacent pair of taps. When a sufficient number of taps is provided on the potentiometer 122, the curve will be smooth enough to give the desired accuracy of the functional relation. With the construction illustrated, 65 taps may be employed. Actually, only 60 taps are connected to the potentiometer 122 in FIG. 5.

A regulated D.C. power supply 132 is connected to one end of the potentiometer 122 through an adjusting potentiometer 133. The other end of the potentiometer 122 is connected to ground through a second adjusting potentiometer 134. Adjustment of the potentiometers 133 and 134 permits shifting of the entire curve (i.e., the curve 50″ of FIG. 7) parallel to itself or permits changing its slope. Such adjustment compensates for changes in value of the circuit elements. It will be evident that the potentiometer 122 and the interpolating potentiometer 125 form a voltage divider. The voltage appearing between the terminal 131 and ground will vary in accordance with the characteristic curve approximated by the tap settings of the potentiometer 122.

The calibration curve is set up in the potentiometer 122 as indicated in FIG. 7. Thus the resistance of the tap 60 will correspond to the height of the point 60 on curve 50″. Similarly, the resistance between the tap 59 and ground will correspond to the height of the curve 50″ at point 59. With the interpolating potentiometer 125 connected as shown in FIG. 7, the voltage $V_a$ will similarly correspond to the height of the curve 50″ at point $V_a$, while the voltage $V_b$ will correspond to the height of the curve 50″ at point $V_b$ thereon. The output voltage $V_c$ will be determined by the position of the wiper 128 and will correspond to the height of point $V_c$ on the chord joining points $V_a$ and $V_b$ on curve 50″. As will be readily apparent from FIG. 7, the slope of chords joining adjacent points on the calibration curve varies, so that the output voltage $V_c$ will remain relatively close to the calibration curve 50″ as time increases.

The tap settings of the potentiometer 122 may easily be corrected when the spectrograph calibration curve changes. Such changes may occur through the deterioration of a photomultiplier tube or through the aging of some other component which changes the relation between percent concentration ratio and intensity ratio or time. The potentiometer taps may also easily be changed to render the instrument available for use with other alloys. In order to prevent crowding of the taps on the potentiometer 122, which would normally result from the logarithmic character of the function, it has been found desirable to break the potentiometer 122 up into sections differing in resistance pitch. This permits spreading the windings out and facilitates placing the taps at the desired locations without having them interfere with each other or with the winding terminals.

Figure 8:
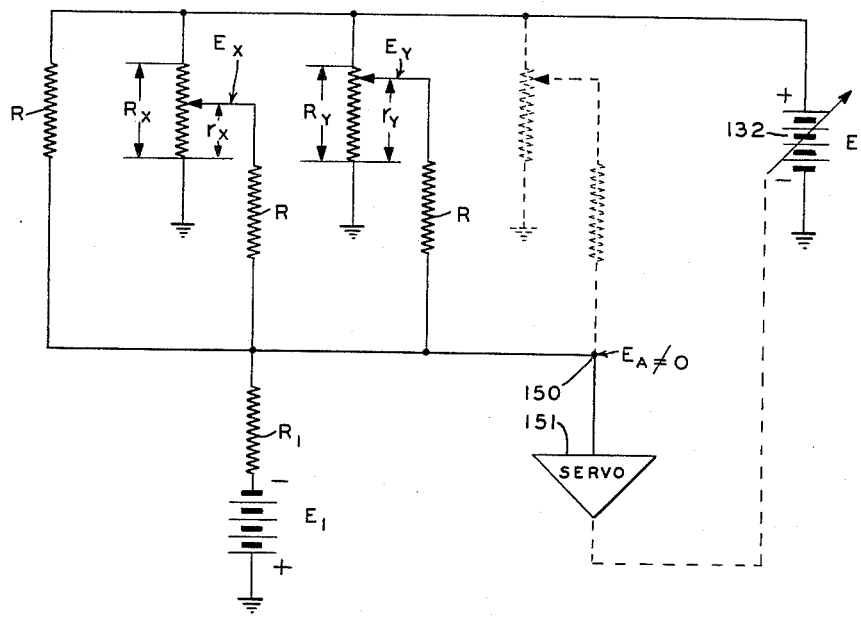
FIG. 8 is a schematic drawing of a suitable computer circuit in an unbalanced condition thereof.
Figure 9:
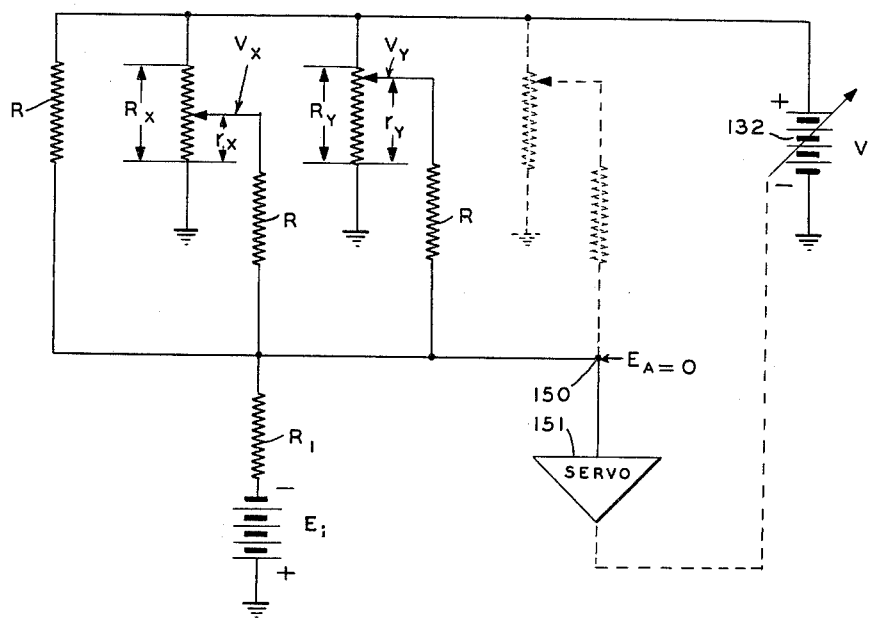
FIG. 9 is a schematic drawing of the circuit of FIG. 8 in a balanced condition thereof.

It will be understood that each time converter will have an output terminal corresponding to the terminal 131 of FIG. 5, and the voltage appearing at each such output terminal will be proportional to the percent concentration ratio. As indicated in FIG. 1, the output of each time converter is applied to a computer 35, which is designed to solve Equations 1 and 2 above. These equations are strictly arithmetical in nature and the only necessary operations to be performed are those of addition and multiplication. In the mechanization of the equations in the computer, voltages, currents, and resistance ratios may be used to represent the terms in the arithmetical relationship. FIGS. 8 and 9 are simplified schematic diagrams of a suitable computer, FIG. 8 showing the voltages present before a balanced condition in the network is achieved, and FIG. 9 showing the voltages after a balanced condition is achieved.

The simplified circuit of FIGS. 8 and 9 is intended to solve the equations for two elements designated $x$ and $y$. The resistance $R_x$ corresponds to the potentiometer 122 of the time converter of FIG. 5 for the $x$ element. The resistance $R_y$ represents a like potentiometer for the $y$ element time converter. An additional resistance stage for an additional element is shown in dotted lines. It will be understood that additional resistance stages could be provided as needed to accommodate the number of time converters employed. Where an arc time converter is employed, its potentiometer will be substituted for the spark time converter potentiometer corresponding thereto. The portions of the resistances $R_x$ and $R_y$, which are designated $r_x$ and $r_y$, represent those portions of the time converter potentiometer resistances existing between the time converter output terminal (131) and ground. The various resistances designated R form a summing network, and the resistance designated $R_1$ is a balancing resistor and may be made equal in value to the resistances R. The voltages $E_x$ and $E_y$ are voltages appearing at the time converter output terminals and are proportional to the concentration ratios of the respective elements. A variable voltage source E is the regulated D.C. power supply 132 of FIG. 5 and may be common to all the time converters. A series circuit, including the balancing resistor $R_1$ and a fixed voltage source $E_1$, is connected between the junction points of the resistors R and ground. The addition of the voltages $E_x$ and $E_y$ produces at terminal 150 a voltage $E_A$ different from zero. The voltage $E_A$ is applied to a servo 151 which operates on the voltage source providing the voltage E. The output voltage of this voltage source is changed by the servo to a voltage V at which the voltage $E_A$ will equal zero. As a result of this change to voltage V, the voltages $E_x$ and $E_y$ become $V_x$ and $V_y$ respectively (FIG. 9). The voltages $V_x$ and $V_y$ are directly proportional to the true percent concentration of the elements $x$ and $y$. By making $\%Fe + \%x + \%y = 100 = E_1 = E$, the voltages $V_x$ and $V_y$ will actually be equal, respectively, to $\%x$ and $\%y$.

The functioning of the computer network will be clearer from the following equations:

Let:

(3) $$E = E_1 = 100$$

(4) $$E_x = E\left(\frac{r_x}{R_x}\right)$$

(5) $$E_x = E\left(\frac{\%x}{\%Fe}\right)$$

(6) Since $$\frac{r_x}{R_x} = \frac{\%x}{\%Fe} = f_x(t)$$

(by calibration), $f_x(t)$ represents the functional relation of $$\frac{\%x}{\%Fe}$$

which is set into the $x$ time converter potentiometer.

(7) Similarly, $$E_y = E\left(\frac{\%y}{\%Fe}\right)$$

$E_A$ is made zero through action of servo 151 which changes E to V.

Now (8) $$\frac{E_1}{R_1} = \frac{V}{R} + \frac{V_x}{R} + \frac{V_y}{R}$$

because the sum of the currents through the R resistors equals the current through $R_1$.

Since (9) $$R_1 = R$$

it is evident that

(10) $$E_1 = V + V_x + V_y$$

Furthermore, substituting

(11) $$V_x = r_x\left(\frac{V}{R_x}\right),$$

and

(12) $$V_y = r_y\left(\frac{V}{R_y}\right),$$

one obtains

(13) $$E_1 = V\left[1 + \frac{r_x}{R_x} + \frac{r_y}{R_y}\right]$$

Transposing,

(14) $$V = \frac{E_1}{1 + \frac{r_x}{R_x} + \frac{r_y}{R_y}}$$

and substituting $$\frac{\%x}{\%Fe} \text{ for } \frac{r_x}{R_x}$$

one obtains

(15) $$V = \frac{E_1}{1 + \frac{\%x}{\%Fe} + \frac{\%y}{\%Fe}}$$

Multiplying numerator and denominator by $\%Fe$, one obtains

(16) $$V = \frac{\%Fe \, E_1}{\%Fe + \%x + \%y}$$

(17) But $$\%Fe + \%x + \%y = 100 = E_1$$

(18) Therefore, $$V = \%Fe$$

Applying $V = \%Fe$ to Equation 11,

(19) $$V_x = V\left(\frac{r_x}{R_x}\right) = \%Fe\left(\frac{\%x}{\%Fe}\right) = \%x$$

Similarly,

(20) $$V_y = V\left(\frac{r_y}{R_y}\right) = \%Fe\left(\frac{\%y}{\%Fe}\right) = \%y$$

The voltages $V_x$ and $V_y$ appearing at output terminals corresponding to the terminal 131 thus becomes equal to the percent concentrations of the corresponding elements when the voltage E is changed to the voltage V at which voltage $E_A$ equals zero. The voltages $V_x$ and $V_y$ are therefore the voltages applied to the respective readers in FIG. 1.

In the foregoing simplified discussion it was assumed (Equation 17) that $\%Fe + \%x + \%y = 100$. As a practical matter, this equation will seldom, if ever, be completely correct since it assumes that a time converter is provided for each element in the test sample and that each such element is present in a concentration sufficiently great to be within the spectrograph spark or arc range. Since this will not, in general, be the case, provision should be made for a remainder term in the computer so that Equation 17 will become:

(17a) $$\%Fe + \%x + \%y + \text{remainder} = 100 = E_1$$

Figure 10:
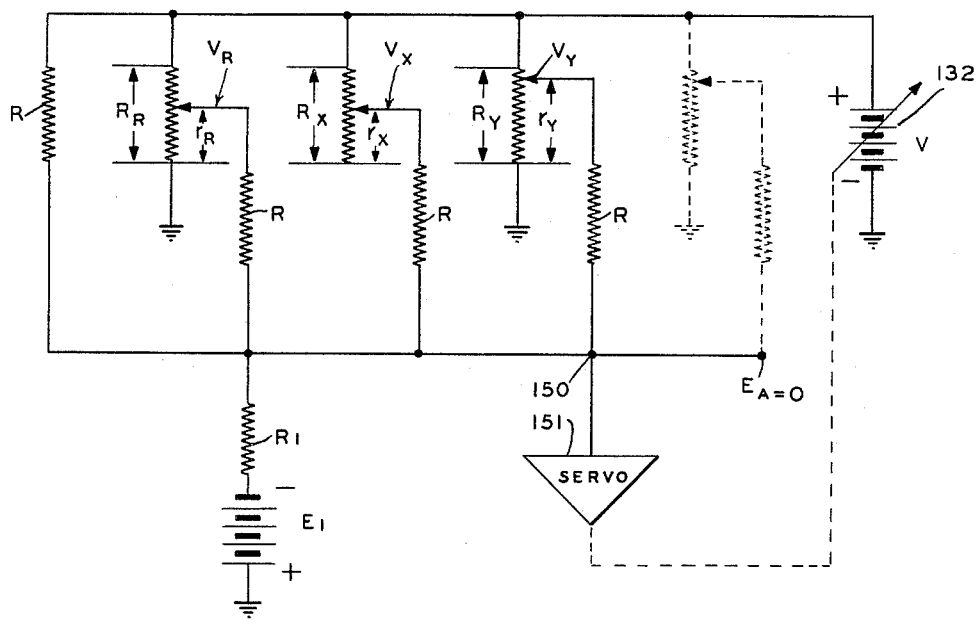
FIG. 10 illustrates the circuit of FIG. 9 with the addition of a remainder term.

This remainder will normally be quite small, e.g., less than 0.5%, and may be manually set through a knowledge of the type of alloy being tested. To accommodate the remainder term, the circuit of FIGS. 8 and 9 should be modified, as shown in FIG. 10, to include a potentiometer $R_R$, the slider of which should be manually adjusted to provide a resistance $r_R$ which will yield a voltage $V_R$ equal to the true percent concentration of the remainder. Since the percent concentration of the remainder will be quite small, error introduced by virtue of slightly inaccurate setting of the potentiometer $R_R$ will not materially affect the overall system accuracy.

Figure 11:
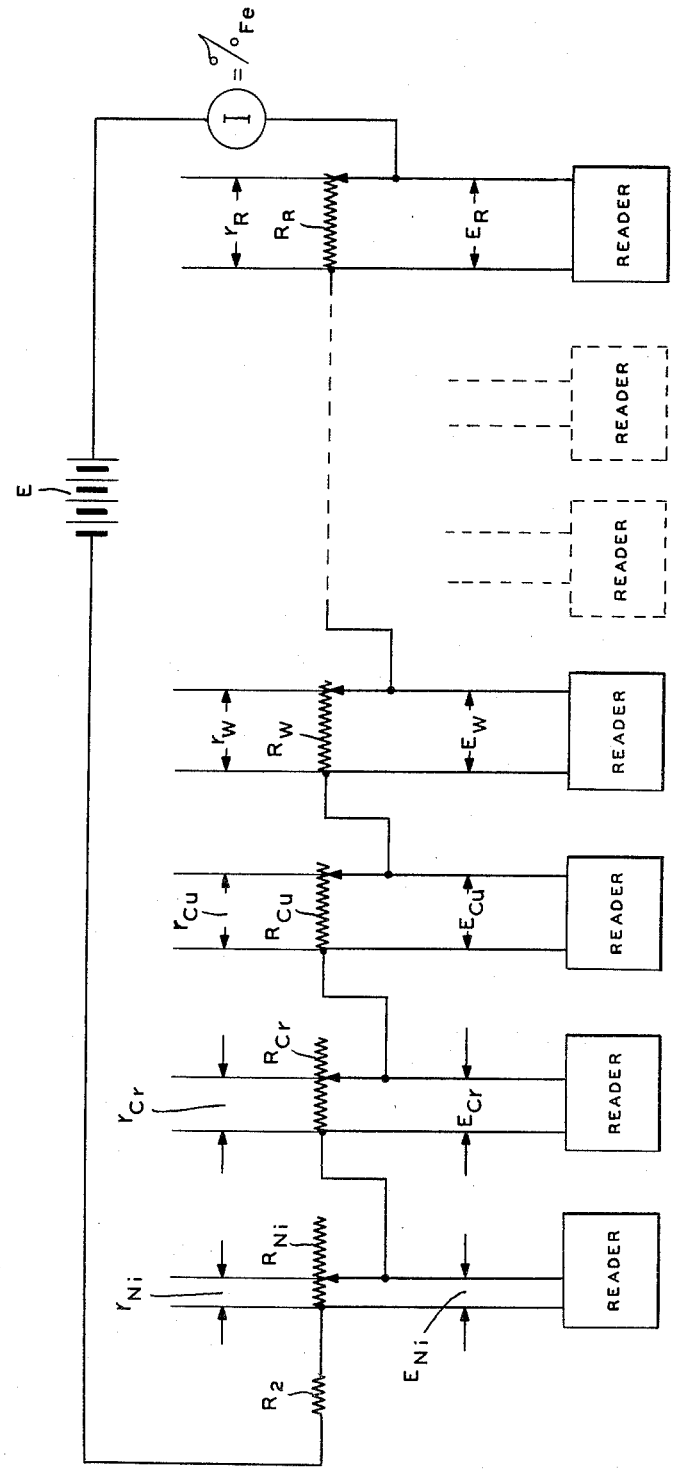
FIG. 11 is a schematic drawing of another form of computer circuit suitable for use in accordance with the invention.

Equations 1 and 2 can be solved with other circuits. Another such suitable circuit is shown in FIG. 11, in which a constant voltage source E is connected in series with a resistor $R_2$, a portion $r_{Ni}$ of a potentiometer $R_{Ni}$, a portion $r_{Cr}$ of a potentiometer $R_{Cr}$, a portion $r_{Cu}$ of a potentiometer $R_{Cu}$, a portion $r_W$ of a potentiometer $R_W$ (additional such potentiometers for additional elements, if any), and a portion $r_R$ of a potentiometer $R_R$. The potentiometers represent the time converter potentiometers (122) for nickel, chromium, copper, tungsten, and a manually set remainder term, respectively. The sliders of the potentiometers will be moved by the time converters (except for the manually set remainder potentiometer R) and their final positions will be determined by the percent concentration ratios of the respective elements. Each of the potentiometers is provided with a reader which measures the potentiometer voltage and uses this voltage to provide the final results desired, normally in printed form.

The voltage between the left hand of each potentiometer and its slider will be proportional to the actual percent concentration of the associated element and, if the voltage E is made equal to 100, and if resistor $R_2$ is made equal to one ohm (other values could, of course, be used), these potentiometer voltages $E_{Ni}$, $E_{Cr}$, $E_{Cu}$, $E_W$ and $E_R$ will be equal to the actual percent concentrations. This will be seen from the following equations:

(21)
$$\%Fe = \frac{100}{1 + \frac{\%Ni}{\%Fe} + \frac{\%Cr}{\%Fe} + \frac{\%Cu}{\%Fe} + \frac{\%W}{\%Fe} + \cdots + \frac{\%R}{\%Fe}}$$

(22) $I = \dfrac{E}{R_2 + r_{Ni} + r_{Cr} + r_{Cu} + r_W + \cdots + r_R}$

(23) $r_{Ni} = \dfrac{\%Ni}{\%Fe};\ r_{Cr} = \dfrac{\%Cr}{\%Fe};\ r_{Cu} = \dfrac{\%Cu}{\%Fe};$ $r_W = \dfrac{\%W}{\%Fe};\ \cdots\ r_R = \dfrac{\%R}{\%Fe}$

(24) $\%Ni = Ir_{Ni};\ \%Cr = Ir_{Cr};$ $\%Cu = Ir_{Cu};\ \%W = Ir_W;\ \%R = Ir_R$

(25) $Ir_{Ni} = E_{Ni};\ Ir_{Cr} = E_{Cr};$ $Ir_{Cu} = E_{Cu};\ Ir_W = E_W;\ \ldots\ Ir_R = E_R$

(26) $\%Ni = E_{Ni};\ \%Cr = E_{Cr};$ $\%Cu = E_{Cu};\ \%W = E_W;\ \ldots\ \%R = E_R$ From Equation 26 is will be evident that the voltage across each potentiometer will be equal to the percent concentration of the associated element. In each case this voltage may be applied to a reader of the type to be described.

Figure 12:
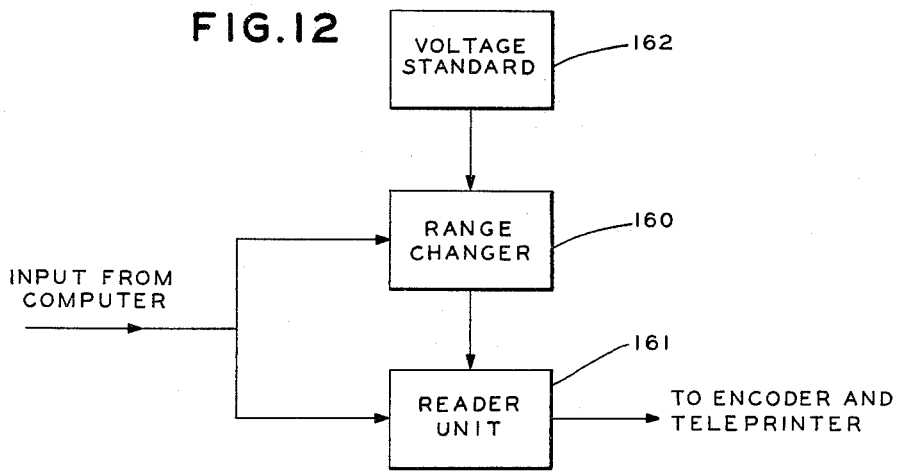
FIG. 12 is a block diagram of a reader arrangement.

The link between the computer 35 (FIG. 1) and the printer 41 is provided by the readers 36—39, one of which is provided for each element whose concentration is to be determined, and the encoder 40. The latter converts the computer output signals, which may be in the form of D.C. voltages, into a teletype code suitable for actuating the teleprinter. The readers 36—39 are each actually a combination of a reader unit, which performs the actual conversion, a range changer, which senses the order of magnitude of the computer output, and a voltage standard source, which supplies the range changer. As shown in the block diagram of FIG. 12, the computer output is applied to a range changer 160 and also to a reader unit 161. The range changer 160 is supplied with a number of voltage standards from a source 162. The range changer senses the general level of the voltage to be read and applies the appropriate reference voltage from the source 162 to the reader unit 161. This sensing takes place momentarily, and the reader unit, which may be a self-balancing potentiometer, proceeds to seek a null. Balance of the reader unit provides a proper stimulus to the encoder 40, which sets up the teletype code for operation of the teleprinter 41. A preferred reader circuit is described in detail hereinafter, but it will be understood that a variety of suitable voltage reading devices are available.

In order to provide a complete understanding of the system of the invention, a circuit diagram of an actual system embodying the invention will be described. This system, including the relays and contacts used for programming, is shown in FIGS. 13–27. The arrangement of these figures relative to each other is illustrated in FIG. 28.

COMPUTER AND COMPUTER SERVO

Referring now to FIGS. 13–27, the potentiometer 122 (FIG. 20) corresponds to the potentiometer 122 of FIG. 5. Similarly, the interpolating potentiometer 125 and the wiper 128 correspond to the interpolating potentiometer 125 and wiper 128 of FIG. 5. One end of the potentiometer 122 is connected to ground through a conductor 200. The corresponding points of the corresponding potentiometers in all other time converters will similarly be connected to ground, as indicated by the box 122'. Only one time converter is shown in these figures, but it will be understood, of course, that an additional time converter will be provided for each element being analyzed for and that further time converters will be provided for each element which may be subjected to an arc test. The other end of the potentiometer 122 is connected to a source of positive potential through a conductor 201. The high ends of the other time converter potentiometers may be connected to the point +TC while the ground ends of these potentiometers may be connected to the point −TC, so that all of these time converter potentiometers will be in parallel with the one illustrated. This includes both the arc and spark time converter potentiometers, since permanently connecting these potentiometers across the line will facilitate maintaining good power supply voltage regulation characteristics.

For purposes of illustration only, it will be assumed that a steel alloy is being analyzed for nickel, silicon, manganese and chromium, so that a spark time converter should be provided for each of these elements. An input terminal is also provided for a silicon arc time converter. It should be understood that time converters for other elements can be provided. In the arrangement illustrated, only one input terminal is provided for the spark and arc time converters, as will be explained below.

The conductor 201 is connected to a source of positive potential (tubes 206 and 207, FIG. 13) through a resistor 202 (FIG. 16), a potentiometer 203, a potentiometer 204 and a conductor 205. The conductor 205 is connected to the cathodes of the two parallel connected double triode tubes 206 and 207, which may provide, for example, 200 volts positive D.C. potential. As will be explained later, this potential is varied during operation and corresponds to the source 132 of FIG. 8. The voltage available at the cathodes of the tubes 206 and 207 is reduced by one-half through the potentiometer and resistor circuits 202, 203 and 204, so as to provide a basic voltage E of 100 volts between terminal +TC and ground.

The anodes of the triodes 206 and 207 are connected to a regulated power supply shown as a box 208 and which may be of conventional design. The regulated power supply 208 might provide, for example, 250 volts. The silicon time converter output appearing at wiper 128 is applied to a computer input terminal Si (FIG. 16) through normally closed contacts K1-1 of a relay K1 and a conductor 209. The corresponding wiper 128' of a silicon arc time converter (whose interpolating potentiometer only is shown) is also connected to the silicon input terminal Si through normally open contacts K1-2 of the relay K1, so that when relay K1 is energized the arc time converter will be connected to the terminal Si, whereas with relay K1 de-energized the spark time converter will be so connected. Similar connections (not shown) through corresponding relays and contacts may be provided for the other element spark and arc (if any) time converters. The corresponding input terminal for nickel is shown at Ni, for manganese at Mn, and for chromium at Cr.

As explained previously in connection with FIG. 8, the voltage applied to the time converter potentiometer before computation begins is preferably 100 volts. Because of the voltage drop across resistors 202, 203 and 204, the voltage appearing between the conductor 205 and ground should be 200 volts. In the illustrated circuit, a single-pole double-throw switch 210 (FIG. 16) is provided to permit calibration of this voltage in one position thereof, and operation in the other position thereof. When the switch 210 is in the calibrate position, the voltage between conductor 205 and ground is adjusted to +200 volts by comparison with a −200 volts appearing between a conductor 211 and ground. The conductor 211 derives its negative potential from a negative precision voltage regulator shown as a box 212 (FIG. 15), and which may be of any suitable design. When the conductor 205 voltage is +200 volts, the voltage at terminal +TC will be made +100 volts by suitable adjustment of potentiometers 203 and 204.

The negative voltage at conductor 211 is applied to a conductor 213 (FIG. 16) through a resistor 214 corresponding to the resistor $R_1$ of FIG. 8. A terminal REM (remainder), terminals Ni, Si, Mn, Cr and a terminal Fe (iron) are coupled to the conductor 213 through resistors 215, 216, 217, 218, 219 and 220, respectively. These resistors correspond to the resistors R of FIG. 8. The positive voltage output of each time converter is applied to the appropriate one of the computer input-output terminals Ni, Si, Mn and Cr. The remainder terminal REM derives a positive potential from a potentiometer 221, the slider of which may be manually set to provide an appropriate remainder potential. One end of the potentiometer 221 is connected to ground conductor 200, while the other end thereof is connected to contact +TC through computer input terminal Fe. After each of the time converters has completed its operation, voltage applied to the terminals Ni, Si, Mn and Cr will correspond (assuming the voltage at terminal +TC remains constant) to the corresponding percent concentration ratio. In order to cause the computation to be effected, the potential between terminal +TC and ground should be modified so that the voltage between conductor 213 and ground will be zero, e.g., so that this conductor will be at ground potential. The potential between conductor 213 and ground will depend upon three factors: first, the settings of the time converter potentiometers coupled thereto; second, the potential between conductor 211 and ground; and third, the potential between conductor 205 and ground. The time converter potentiometer settings are governed by the direct reading spectrometer outputs, as previously explained, and the voltage between conductor 211 and ground is a carefully regulated −200 volts. Accordingly, in order to effect the computation, the voltage between conductor 205 and ground should be varied until conductor 213 arrives at ground potential. This adjustment of the voltage between conductor 205 and ground is made through adjustment of the grid potential of the double triodes 206 and 207, which in turn may be effected through a suitable servo-mechanism. It will be understood that the two tubes 206 and 207 are provided for current-carrying capacity and that a single tube could be used if its current-carrying capacity were adequate.

While a number of servo-mechanisms could be employed to vary the potential between conductor 205 and ground so as to cause conductor 213 to assume ground potential, the circuit illustrated is a chopper stabilized D.C. amplifier. This circuit includes a three-stage D.C. amplifier, including triode sections 222 (FIG. 14) and 223 and a pentode 225. A synchronous chopper 226 and a two-stage A.C. amplifier comprising pentodes 227 and 228 form the stabilizing part of the servo circuit. The input for triode 222 and chopper 226 is derived from conductor 213 through switch 210 and a conductor 229. Tube 222 is connected as a cathode follower so that its output is again amplified in tube 223. The output of tube 223 is applied to tube 225 whose anode is connected through a conductor 225′ and suitable resistors to the parallel connected grids of tubes 206 and 207. Chopper 226, which may be powered from the A.C. supply, acts as a synchronous rectifier so that A.C. amplifier tube 227 receives a half wave rectified signal proportional to the potential between conductor 213 and ground. The output of tube 227 is again amplified in tube 228. The output of tube 228 is applied through a capacitor 230 and a resistor 230′ to the grid of triode 223, resistor 230′ and a capacitor 231 acting as a filter circuit. A gas tube 231′ acting as a voltage limiter may be provided between capacitor 230 and ground. The servo circuit illustrated exhibits great stability since the output voltage will be equal to the input voltage times the gain of the D.C. amplifier plus a constant (drift) times the gain of the D.C. amplifier plus the input voltage times the gain of the A.C. amplifier times the gain of the D.C. amplifier. Expressed in symbols, this is $$E \text{ output} = E \text{ input} \times GD.C. + KGD.C. + E \text{ input} \times GD.C. \times GA.C.$$

By making the gain of the A.C. amplifier much greater than the gain of the D.C. amplifier, the drift factor will be rendered very small and the output voltage will be approximately equal to the input voltage times the gain of the A.C. amplifier times the gain of the D.C. amplifier. The arrangement is such that, if the potential between conductor 213 and ground is positive, a negative voltage will be applied to the grids of tubes 206 and 207; conversely, if the potential between the conductor 213 and ground is negative, a positive voltage will be applied to the grids of the tubes 206 and 207. Thus the circuit acts as a servo-mechanism to maintain the potential between conductor 213 and ground at zero. For convenience, this computer servo-mechanism functions throughout the period that the time converters are operating instead of only after the time converters have finished their sensing periods. Thus the voltage applied to the time converters, e.g., the voltage at terminal +TC, will constantly vary to maintain the conductor 213 at ground potential.

After the time converters have completed their operations, the voltage at terminal +TC will be stabilized at some value equal to the percent of iron (or other reference element) in the sample. Terminal Fe is at the same potential as terminal +TC. Similarly, the potentials at terminals Ni, Si, Mn, Cr and REM will be equal to the true percent concentrations of nickel, silicon, manganese, chromium and the remainder, respectively.

For initially calibrating the computer and computer servo circuits described previously, the switch 210 is placed in the calibrate position so that the D.C. amplifier and chopper input is derived from a slider 232 of a potentiometer 233 (FIG. 16). The potentiometer 233 is coupled between conductors 205 and 211. When the voltage between conductor 205 and ground is +200 volts and the voltage between conductor 211 and ground is −200 volts, the voltage between slider 232 and ground will be zero when this slider is located at the middle of potentiometer 233. Thus, for calibration the slider 232 is placed in the middle of potentiometer 233 and a voltage will be applied to the computer servo circuit only when the voltage between conductor 205 and ground differs from +200 volts. The action of the computer servo will be to vary the grid potentials of the tubes 206 and 207 in a sense to cause conductor 205 to reach +200 volts. When this condition is reached, the voltage at terminal +TC will be 100 volts, and will remain so until the switch 210 is placed in the operate condition, provided potentiometers 203 and 204 have been properly adjusted. With 100 volts at terminal +TC, the time converter taps may be adjusted for different functional relationships.

READER

It will be recalled from FIG. 1 that one reader is provided for each unknown concentration element. As will be evident from FIG. 12, each reader includes a range changer, a reader unit and a voltage standard. The voltage standard employed may be common to all readers, but the range changer and reader unit are individual and one of each should be provided for each element for which an analysis is sought. Alternatively, one or more readers may be connected to be used for sequential reading, thereby reducing the number of readers needed.

The analytical data available from the direct reader spectograph will be known to a certain number of significant figures, and, in general, this number of significant figures, e.g., three, should be used in reporting analyses. However, the total range of data encountered may cover more figures, e.g., five. This range can be accommodated by using a number of scales, e.g., three scales of three significant figures each. For this latter grouping the ranges selected may divide the scale of concentrations into suitable groups such as those percentages below 1%, those between 1 and 10%, and those greater than 10%. Other ranges could, of course, be provided if desired. In order properly to locate the decimal point, it is necessary for the reader to sense which range contains the computed numerical result in volts. In the circuit illustrated, a sensitive servo-mechanism is employed to determine this range directly from the output voltage of the computer. Two such servo range changers may be employed to shift scales of the reader at the points of transfer, e.g., 1 volt and 10 volts. One of the servos includes a synchronous chopper 240 (FIG. 15), a three-stage narrow band amplifier comprising triodes 241, 242 and 243, and a thyratron 244. The other includes a synchronous chopper 245, a three-stage narrow band amplifier comprising triodes 246, 247 and 248, and a thyratron 249. The computer output for silicon (only the silicon reader is shown) is applied from terminal Si through conductor 209, normally open contacts K2–1 (FIG. 20) of a relay K2 and a conductor 250 to one contact of chopper 240 and to a similar contact of chopper 245. The other fixed contact of chopper 240 is provided with a regulated +10 volt potential from a positive precision voltage regulator 251 through a conductor 252. The conductor 252 is connected to a 10 volt tap of a voltage divider 251′ coupled across the output of regulator 251. The corresponding contact of chopper 245 is provided with a carefully regulated +1 volt potential from regulator 251 through a conductor 253 connected to the 1 volt tap of the voltage divider 251′. The regulator 251 derives its power from power supply 208. The choppers 240 and 245 should be powered directly from the 60 cycle supply.

Chopper 240 generates a square wave having an amplitude proportional to the difference between the reference potential of 10 volts and the unknown potential derived from terminal Si. If the reference potential is higher than the unknown potential, the square wave will be negative going, considering the reference potential as a base. If, on the other hand, the unknown potential is higher than the reference potential, the square wave will be positive going. In other words, the phase of an unknown potential higher than the reference potential will be 180° different from the phase of an unknown potential lower than the reference potential. The three-stage narrow band amplifier comprising triodes 241, 242 and 243 converts this square wave approximately to a sine wave which is applied to the control grid of thyratron 244. The anode of the thyratron 244 is provided with operating potential from a secondary winding of a transformer 254 (FIG. 18) through the coil of a relay K3 and a conductor 255′. The transformer 254 may be supplied directly from the A.C. lines 200 and 200′. When the alternating anode and grid potentials of the thyratron 244 are in phase, the thyratron will conduct and will energize relay coil K3. When these potentials are out of phase, the thyratron will not conduct and the relay K3 will remain de-energized. Suitable grid bias for the thyratron 244 may be provided through a potentiometer 254′ connected between conductor 211 (−200 volts) and ground. When the computer output potential derived from terminal Si is less than 10 volts, the phase relation is such that the thyratron 244 will conduct. If this potential is greater than 10 volts, the thyratron 244 will not conduct.

The operation of the chopper 245, amplifiers 246, 247 and 248, and thyratron 249 is similar to that just described, except that the reference voltage applied to the chopper in this case is 1 volt so that the thyratron 249 will fire when the unknown potential is less than 1 volt, but will not fire when this potential exceeds 1 volt. A relay coil K4 is included in the anode circuit of thyratron 249.

The operation of relays K3 and K4 will be made clear in the following table.

*Table I*

| Relay | Range | | |
|---|---|---|---|
| | 0–1 v. | 1–10 v. | 10–100 v. |
| K3 | E | E | N |
| K4 | E | N | N |

In this table E stands for energized and N stands for not energized (de-energized). When both relays are energized, the range is 0–1 volts, or, in other words, 0.1%. When relay K3 is energized and relay K4 is not energized, the range will be 1–10%. When both relays are not energized, the range will be 10–100%.

Contacts controlled by relays K3 and K4 will provide a proper reference potential for the reader potentiometer and will set the decimal point in the proper place in the final results.

Figure 20:
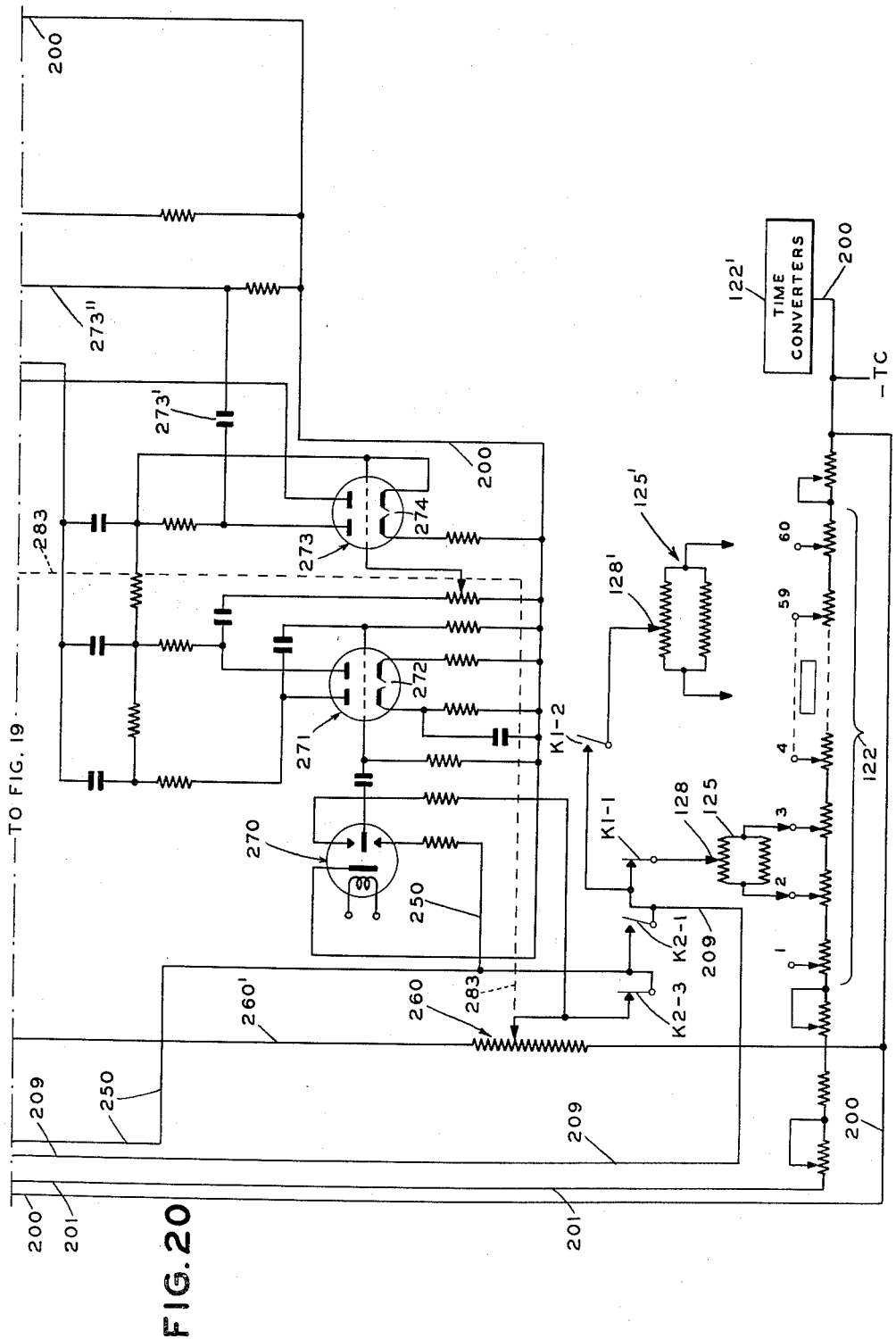
Figure 21:
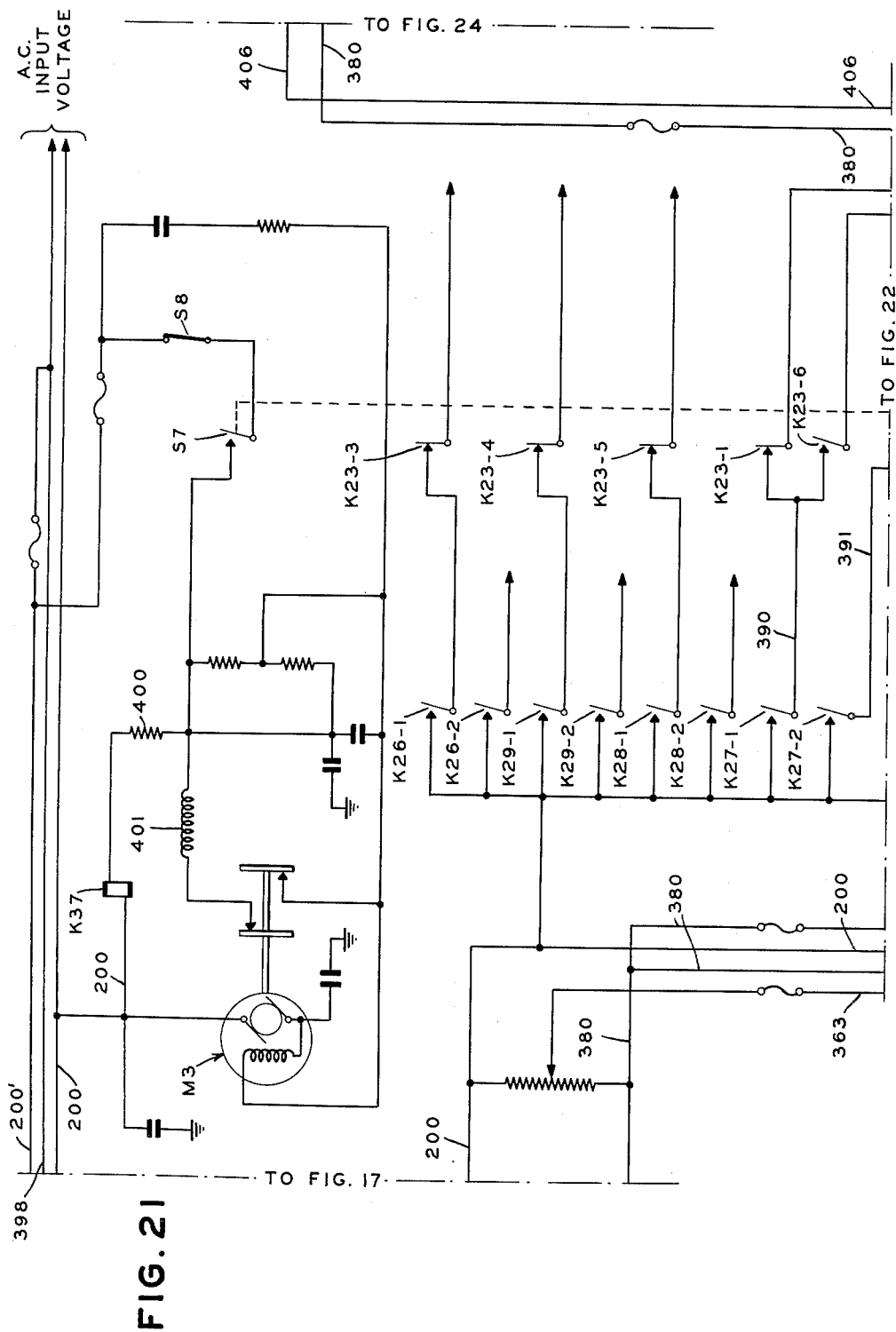

The function of the range changer is to provide a reference potential of 1, 10 or 100 volts to a potentiometer for comparison with the computer output potential and to set properly the decimal point. The range changer insures that the comparison voltage is of the same order of magnitude as the unknown voltage. The potentiometer to which the reference voltage is applied is shown at 260 (FIG. 20). The three reference voltages selectively applicable to the potentiometer 260 are derived from a series connected chain of potentiometers 261, 262 and 263 (FIG. 16). The high end of the potentiometer 261 is coupled to a 200 volt terminal of the precision voltage regulator 251 through a resistor 264 and a conductor 265. The resistor 264 and the potentiometer 261 serve to drop the voltage appearing between the slider of potentiometer 261 and ground to 100 volts. The low end of potentiometer 263 is coupled to ground conductor 200 through a resistor 266. Potentiometers 261 and 262 are intercoupled through a resistor 267, while potentiometers 262 and 263 are intercoupled through a resistor 268. The potentiometers and resistors 261, 262, 263, 264, 266, 267 and 268 serve as a voltage divider providing 100 volts at the slider of potentiometer 261, 10 volts at the slider of potentiometer 262, and 1 volt at the slider of potentiometer 263. The selective application of these potentials to the potentiometer 260 is effected through contact circuits controlled by the relays K3 and K4 and therefore by the range changer.

Contacts of relays K3 and K4 together with contacts of relay K8 are arranged selectively to energize relays K5, K6 and K7 (FIG. 18) which in turn control the application of the reference potentials to potentiometer 260. The relays K5, K6, K7 and K8 are selectively energized for the various ranges in accordance with the following table.

*Table II*

| Relay | Range | | |
|---|---|---|---|
| | 0-1 v. | 1-10 v. | 10-100 v. |
| K5 | E | E | N |
| K6 | E | N | E |
| K7 | N | E | E |
| K8 | E | E | E |

From Table II it will be seen that for the 0-1 volt range relays K5, K6 and K8 should be energized and relay K7 should not be energized. It will be recalled that for this range both relays K3 and K4 were energized. When it is desired to apply the proper reference potential to the potentiometer 260, a relay K9 (FIG. 25) will be energized (through a circuit to be described hereinafter), closing contacts K9-1 (FIG. 19) thereof. This completes an energizing circuit for relay K8 extending from ground conductor 200 through the coil of relay K8 and contacts K9-1 to the high side of the A.C. line at conductor 200'. A lamp 12 (FIG. 19) will be illuminated when contacts K9-1 close. With relay K8 energized, relay K5 will pick up through a circuit extending from the high side of the A.C. line through normally open contacts K3-1 and K8-1. Since relay K8 will drop out at a later stage in the sequence of operations and before the range changer settings should be released, relay K5 is prepared to lock in at such time through normally closed contacts K8-2 and normally open contacts K5-1. Relay K6 will pick up through contacts K8-3 and K4-1. Relay K6 is also provided with a locking circuit including normally closed contacts K8-4 and normally open contacts K6-1. Relay K7 will remain de-energized.

For the 1-10 volt range, relays K5, K7 and K8 should be energized as well as relay K3. The energizing circuits for relays K8 and K5 are the same as described previously. Relay K6 will be de-energized and relay K7 will be energized through normally open contacts K8-5 and normally closed contacts K4-2. Relay K7 has a locking circuit including normally closed contacts K8-6 and normally open contacts K7-1.

For the 10-100 volt range, relay K5 will remain de-energized while relays K6, K7 and K8 will be energized. Relays K3 and K4 are both de-energized in this condition. The energizing circuit for relay K8 is the same as described previously. The energizing circuit for relay K6 includes contacts K8-3 and normally closed contacts K3-2. The energizing circuit for relay K7 is the same as described previously.

Relays K5, K6 and K7 assume the conditions indicated in response to the conditions of relays K3 and K4, provided relay K8 has been picked up. Assuming first the 0-1 volt range, in which relays K5, K6 and K8 are energized, the 1 volt reference potential from the slider of potentiometer 263 is applied to the top of the potentiometer 260 through normally closed contacts K7-2 and the conductor 260'. When contacts K7-2 are open upon energization of relay K7 (for other ranges), contacts K7-3 close, connecting a resistor 267' to the slider of potentiometer 263 in order to assist in achieving good voltage regulation by maintaining a constant load on the power supply.

Assuming next the 1-10 volt range, in which relays K5, K7 and K8 are energized, the 10 volt reference potential from the slider of potentiometer 262 is applied to potentiometer 260 through normally closed contacts K6-2, normally open contacts K5-2, normally open contacts K7-4 and conductor 260'. When this circuit is open the slider of potentiometer 262 is coupled to ground for stabilization through normally open contacts K6-3 and a resistor 268'.

Lastly, when the 10-100 volt range is desired, the 100 volt reference potential is applied to potentiometer 260 from the slider of potentiometer 261 through normally closed circuits K5-3, normally open contacts K6-4, normally open contacts K7-4 and conductor 260'. When this circuit is open the slider of potentiometer 261 is coupled to ground for stabilization through normally open contacts K5-4 and a resistor 269.

The voltage developed between the slider of potentiometer 260 and ground is applied to a fixed terminal of a synchronous chopper 270 for comparison with the computer output voltage which is applied to the other fixed contact of the chopper 270 through conductor 259. The chopper 270 (FIG. 20) may be powered directly from the A.-C. lines. The output of the chopper 270 is a square wave whose phase varies by 180° depending upon whether the reference potential from potentiometer 260 is greater or less than the computer output voltage. This square wave output is amplified in a four-stage narrow band amplifier including triode sections 271, 272 and 273. The amplified output is approximately a sine wave whose phase is fixed relative to the square wave amplifier input. The approximate sine wave amplifier output derived from the anode of triode section 273 is applied to the grids of two double triode tubes 275 and 276 serving as a power amplifier, through a capacitor 273' and a conductor 273". Section 274 acts as a power supply rectifier for the servo amplifier.

One phase winding 277 of a two-phase servo motor 278 (FIG. 19) derives its power from the A.-C. line through normally open contacts K2-2 and a capacitor 279. One end of the other phase winding 277' of the motor 278 is connected to the center tap of a secondary winding of a transformer 280 whose primary winding is connected to the A.-C. lines. The other end of the winding 277' is connected to ground. One end of the secondary winding is connected to one anode of each of tubes 275 and 276 through a conductor 281. The other side of the secondary winding is connected to the other anode of each of the tubes 275 and 276 through a conductor 282. Depending upon the relation between the phase of the signal input to tubes 275 and 276 and the power line phase, the servo motor 278 will turn in one direction or the other, and at a zero signal input to these tubes the motor 278 will stand still.

The shaft of the motor 278 is mechanically coupled through a mechanism indicated at 283 to the slider of the potentiometer 260. The phase relations are chosen so that rotation of the motor 278 in one direction causes the slider of the potentiometer 277 to move in a direction such that the input signal to the tubes 275 and 276 will decrease. When the signal reaches zero the motor 278 will stop. The position of the slider of potentiometer 260 at which the input to tubes 275 and 276 reaches zero is one at which the potential between the slider of potentiometer 260 and ground is equal to the unknown potential constituting the computer output at terminal $S_i$. Hence this portion of the reader circuit is, in effect, a self-balancing potentiometer.

The rotational position of the shaft of servo motor 278 relative to its position when the slider of potentiometer 260 is in a zero or reference position thereof is a measure of the unknown voltage. Through suitable gearing each rotation of the shaft of motor 278 or desired fraction thereof may be made to correspond to one or any other suitable number of digits in a numerical representation of the computer output voltage. Thus, where three significant figures are employed, each rotation of the shaft of servo motor 278 might be equal to one minor digit of the three digit number equaling the computer output voltage. By connecting the shaft of the motor 278 to a rotation counter (indicated at 278C), the percent concentration of the associated element, e.g. silicon, may be read directly in numerals. The location of the decimal point in the three digit number is determined by the range changer, as described previously. Hence, with relays K3 and K4 energized, the decimal point should come before the first digit. With relay K3 energized and relay K4 not energized, the decimal point should come between the first and second digits. With both relays K3 and K4 not energized, the decimal point should come between the second and third digits. A suitable circuit arrangement for indicating the decimal point in a counter by the illumination of suitably placed lamps on the counter is shown. Thus a decimal point indicating the 0–1% range is set up by illuminating a lamp 284 (FIG. 18) through a circuit extending from the high side of the A.-C. line through normally closed contacts K7–5, the lamp 284 and a resistor 285 to ground conductor 200. A lamp 286 constituting a decimal point for the 1–10% range is similarly illuminated upon closing of normally closed contacts K6–5. A lamp 287 indicating the decimal point for the 10–100% range is illuminated upon closing of normally closed contacts K5–5.

A similar reader circuit, including a servo motor corresponding to the motor 278, should be provided for each element for which an analysis is desired. For convenience, only one such circuit has been illustrated. Also for convenience, the circuit has been limited to operation with three significant digits, although it will be evident that any suitable number of digits may be employed. Location of the decimal point in any number may be effected in a similar manner.

As will be described hereinafter, the servo motor 278 may also be caused to operate a teletype encoding device or other printing mechanism to provide a permanent record of the percent concentration of each element. When the printing operation in initiated, a relay K10 (FIG. 24) is energized, causing normally open contacts K10–1 (FIG. 19) thereof to close, thereby energizing a solenoid K11. Solenoid K11 is mechanically coupled to the servo motor shaft to cause the latter positively to assume the nearest integral position so that no ambiguity may arise as to the last digit of the percent concentration, which might be caused, for example, by minor fluctuations in potential.

The description of the reader circuit given heretofore pertains to its normal action during the reading process. However, during the printing period the readers may be disconnected from the computer circuit and simply serve as data storage devices. Under these conditions it is desirable to provide reference voltages which will prevent the range changers from shifting the voltage applied to the reader potentiometers (260) so as to maintain the proper decimal point locations. Considering the silicon reader illustrated, it will be remembered that in achieving a balance of the potentiometer 260 the reader servo has adjusted the slider of this potentiometer to a point of voltage equal to the percent concentration of silicon. Use may be made of this voltage when the reader is disconnected from the computer (by opening of contacts K2–1) and the computer settings are destroyed. When the printing action is initiated by the closing of switch PB–1 (FIG. 26), the relay K2 is de-energized (by the opening of contacts K9–1) so that contacts K2—2 open. The opening of contacts K2—2 disconnects the fixed phase winding 277 of servo motor 278. At the same instant the range changers are connected to the slider of potentiometer 260 through normally closed contacts K2–3 (FIG. 20) and conductor 250. This action is performed rapidly so that the range changers have no opportunity to shift from their original settings. The system will stay in this condition until a clear button PB–2 (FIG. 25) is operated. Closing of the switch PB–2 will cause a relay K9 (FIG. 25) to pick up, which will in turn energize relay K2 and will open contacts K2–3 and close contacts K2–1, so that the range changers will be disconnected from the reader potentiometer 260 and be connected instead to the computer through the conductor 209.

ENCODER

Figure 25:
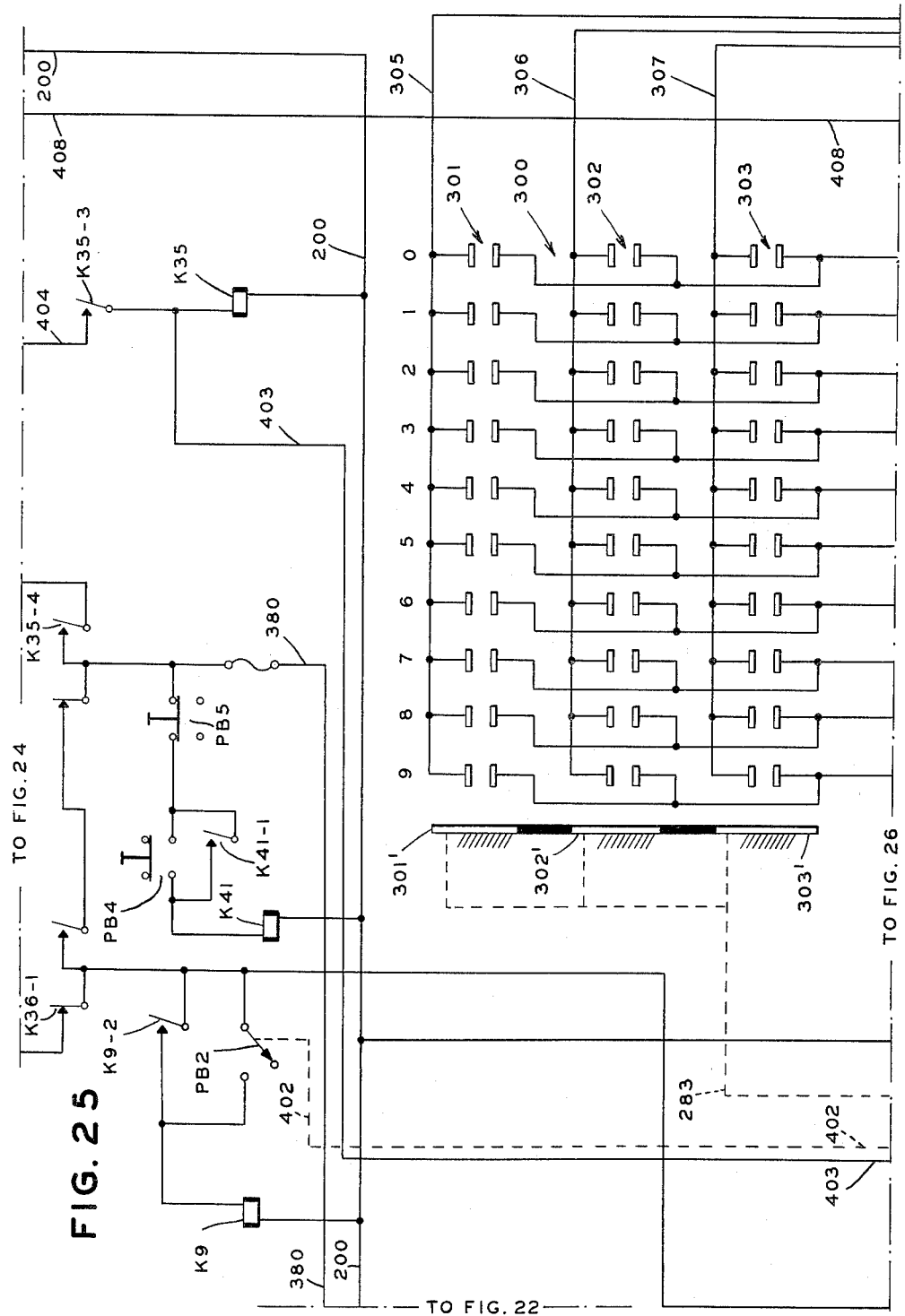

The encoder (40 in FIG. 1) includes those components which translate the reader shaft positions into a teletype code suitable for actuating a teleprinter. The encoder should thus have components for effecting this operation for each reader. The silicon channel components only are shown in the drawings, although it will be understood that these components will be duplicated for whatever other channels are provided. The output shaft 283 of the silicon channel reader servo motor 278 asumes a rotational position representative of the silicon percent concentration. This output shaft position may be recorded by a series of rotary switches which may physically be realized as commutator segments generally designated 300 (FIG. 25). These rotary switches may be connected to a group of relays each of which carries the teletype (or other suitable) code for a number from 0 to 9. When the printing process is initiated, a magnetic stepping device scans the reader position switches (300) and energizes the appropriate teletype code relay coils.

Since there are three significant figures in the reader output, there should be three sets of commutator segments and a brush for each set. The sets or groups of commutator segments illustrated for the silicon channel are designated 301, 302 and 303, while the corresponding brushes are designated 301', 302' and 303'. While the brushes are shown as mechanically coupled to the shaft 283, it will be understood that the brushes may be stationary and the commutator segments may be rotated. The commutator segments are designated with the numerals 0 to 9 in FIG. 25. When the reader servo motor 278 comes to a stop, indicating a balanced condition for the potentiometer 260, one pair of contacts in each of groups 301, 302 and 303 will be closed by a respective one of the brushes to indicate the required three digit number. For example, for the number 123, brush 301' should span contacts 1 of group 301, brush 302' should span contacts 2 of group 302, and brush 303' should span contacts 3 of group 303.

Figure 26:
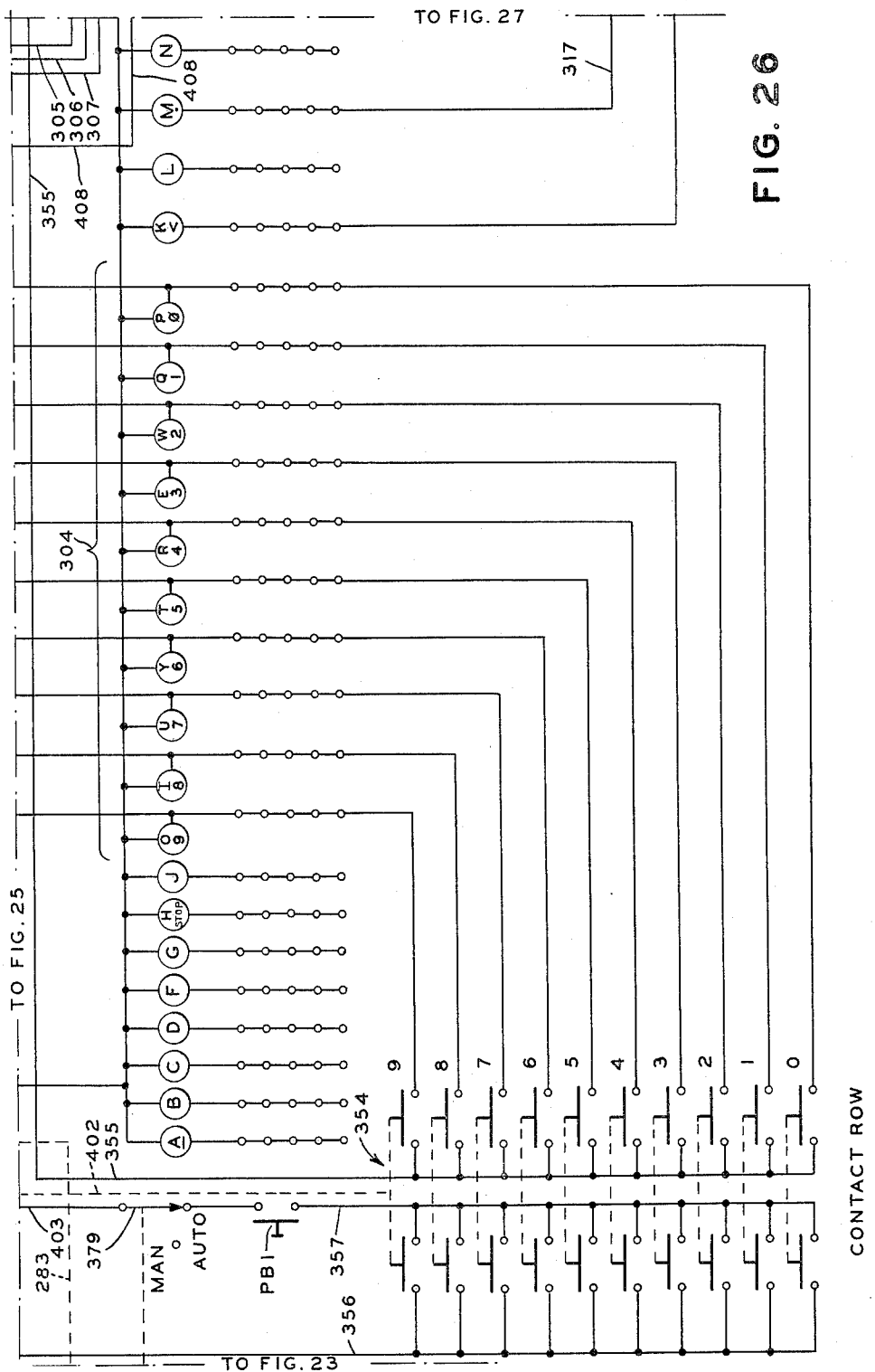

Each one of the pairs of contacts in rows 0 to 9 is provided with a common terminal connected to one side of a respective one of teletype actuating relay coils 304 (FIG. 26). These relay coils are provided with contacts which will duplicate the teletype code for the corresponding numeral. The other side of each one of these coils is connected to ground conductor 200. The other contacts of the commutator segments in group 301 (the hundreds group) are connected to a conductor 305. The other contacts of the commutator segments in group 302 (the tens group) are connected to conductor 306. The other contacts of the commutator segments in group 303 (the ones group) are connected to a conductor 307. These conductors lead to terminals 305T, 306T and 307T (FIG. 27), which in turn are indicated as being connected to a stepper, which will be described below. Also shown are terminals 308T, 309T and 310T, which correspond to terminals 305T—307T but for the nickel channel. Similarly, terminals 311T, 312T and 313T are provided for the manganese channel, and terminals 314T, 315T and 316T are provided for the chromium channel. These contacts represent the hundreds, tens and ones common conductors for the commutator segments in each channel equivalent to the segments 300 illustrated. Additional terminals would be provided for additional channels.

In addition to the teletype actuating relay coils 304, there is also provided a teletype actuating relay coil for each of the other keys normally provided on a teletypewriter. These coils are shown in FIGS. 26 and 27.

After the reader servo motor is stopped, connections will be made through appropriate ones of the commutator segments 300 and through appropriate ones of the relay coils 304 between terminals 305, 306 and 307 and ground. For the silicon concentration 123, one circuit will extend from the terminal 305T through the conductor 305, contacts 1 of group 301, relay coil 1 of group 304, and conductor 200 to ground. Similarly, the other circuits will be completed through contacts 2 of group 302 and coil 2 of group 304 and through contacts 3 of group 303 and coil 3 of group 304, respectively. When a D.C. potential is applied to the terminal 305T by the stepper (as will be described hereinafter, the coil 1 of group 304 will be energized to set up the teletype code for the numeral 1. Similarly, when the stepper applies a D.-C. potential to the terminal 306T, the coil 2 of group 304 will be energized to set up the teletype code for the numeral 2. Again, when terminal 307T is provided with a D.-C. potential by the stepper, the coil 3 of group 304 will be energized to set up the teletype code for the numeral 3. This same sequence may be followed for the other element channels. Application of the D.-C. potential to the terminals T will be described hereinafter.

Figure 27:
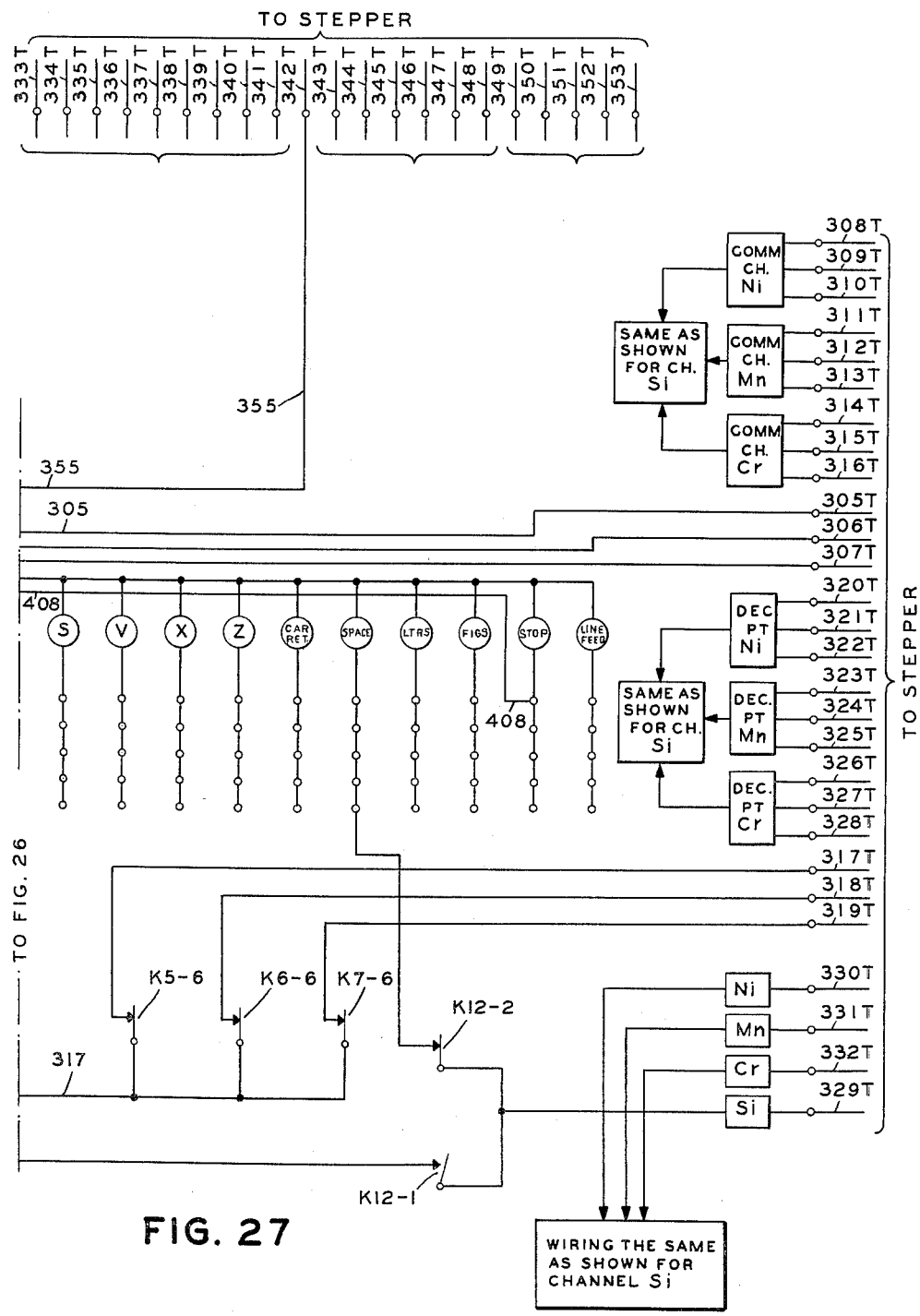

Circuit connections for providing other variable information to complete an analysis message are also shown in FIG. 27. Thus a decimal point should be located properly in the message. It will be recalled that the silicon decimal point may be determined by the unenergized one of relays K5, K6 and K7. Thus a terminal 317T, which may derive its potential from the stepper, is connected through normally closed contacts K5-6, a conductor 317, and the teletype actuating relay coil for a "period" to ground conductor 200. Thus, when a D.C. potential is applied to terminal 317T and contacts K5-6 are closed, a period or "decimal point" will be printed. A period will similarly be printed when a D.C. potential is applied to terminal 318T and contacts K6-6 are closed. A period will be printed when a D.C. potential is applied to terminal 319T and contacts K7-6 are closed. By appropriate stepper connections, which will be described below, the decimal point will appear at the proper place in the analysis record. Terminals corresponding to 317T, 318T and 319T (320T—328T) are shown for the nickel, manganese and chromium channels.

As has been explained previously, a "less than" symbol "<" should be printed when the arc test range (spark test where no arc test channel is provided) is exceeded. As will be explained below, a relay K12 (FIG. 18) will be energized when the time converter range is exceeded. Since the illustrated relay K12 is in the silicon spark channel, energization of this relay should not result in the printing of a "less than" symbol. However, if the corresponding K12 relay of the silicon arc time converter is energized, a "less than" symbol will be printed. For this purpose a "less than" teletype actuating relay coil, <, is energized when a D.C. potential is applied to terminal 329T (FIG. 27) and when normally open contacts K12-1 are closed. When a D.C. potential is applied to terminal 329T and normally closed contacts K12-2 are closed, the space teletype actuating relay coil will be energized to have the teletype pass a space instead of printing. In this way, depending upon the condition of relay K12, a "less than" symbol will be printed or a space will occur at the appropriate point in the message. Corresponding terminals 330T, 331T and 332T are provided for the nickel, manganese and chromium channels, respectively.

In addition to variable information dependent upon the results of a particular analysis, a printed message will normally contain additional predetermined information such as a sample identification, date, time, and the like. For this purpose terminals 333T—353T (FIG. 27) are provided. Terminals 333T—348T might each be connected to a push button panel suitably connected to the teletype actuating relay coils so that operation of appropriate push buttons will set up the desired sample identification and date information, which will be printed when the D.C. potential is applied to the terminals by the stepper. Terminals 349T—353T might be connected to a clock to accurately record the time at which the test is made. To illustrate the arrangement, one push button bank 354 is shown in FIG. 26.

Bank 354 contains ten pairs of contacts, each pair being operated by a push button. One terminal of each pair of contacts of the right-hand set is connected through a conductor 355 to terminal 343T. The other terminal of each of the contacts of the right-hand set is connected to a respective one of the teletype actuating relay coils 304, so that when a D.C. potential is applied to terminal 343T by the stepper, one of coils 304 corresponding to an operated push button in bank 354 will be energized, resulting in the printing of a numeral from 0 to 9. The terminals of the other set of contacts in bank 354 are connected in parallel between a conductor 356 and a conductor 357. The conductor 356 leads to a source of positive D.C. potential, as will be explained below. The conductor 357 leads to one terminal of the print button PB-1. This arrangement serves as an interlock, preventing initiation of the printing operation unless one of the push buttons in bank 354 is operated, thus providing power to the print button PB-1. If desired, this interlocking could be extended to include other push button banks to prevent printing of an analysis in the absence of predetermined data. The contacts of such other banks could be interposed in parallel with each other and in series with the conductor 356.

Figure 23:
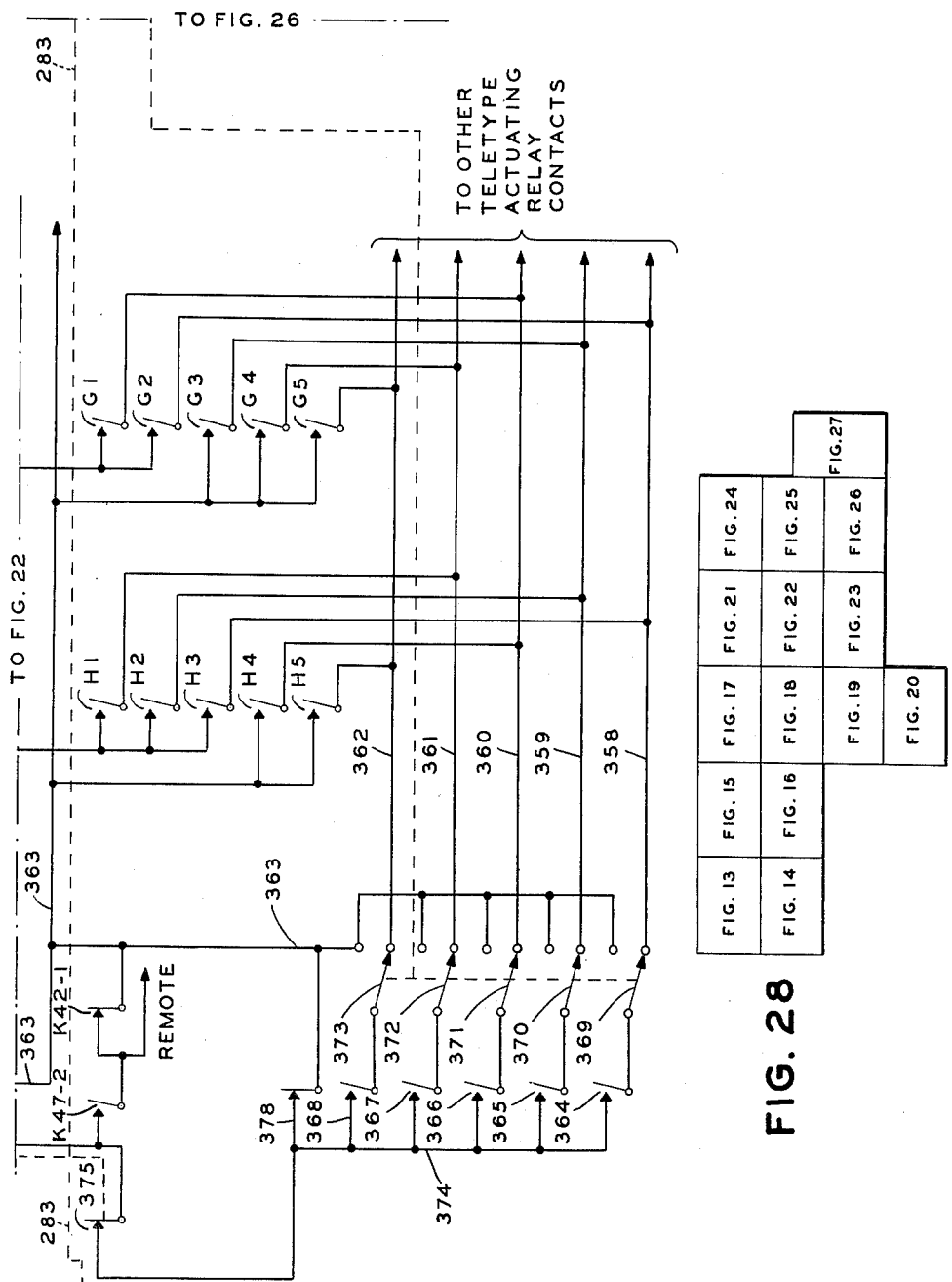

Each of the teletype actuating relays is provided with a set of five contacts which will be closed when the corresponding coil is energized. One terminal of each contact of each relay is connected to an appropriate one of character busses 358, 359, 360, 361 and 362. The contacts for the "G" and "H" or "Stop" relays are shown in FIG. 23. The other teletype actuating relay contacts will be similarly connected preferably to provide the conventional teletype code.

Figure 17:
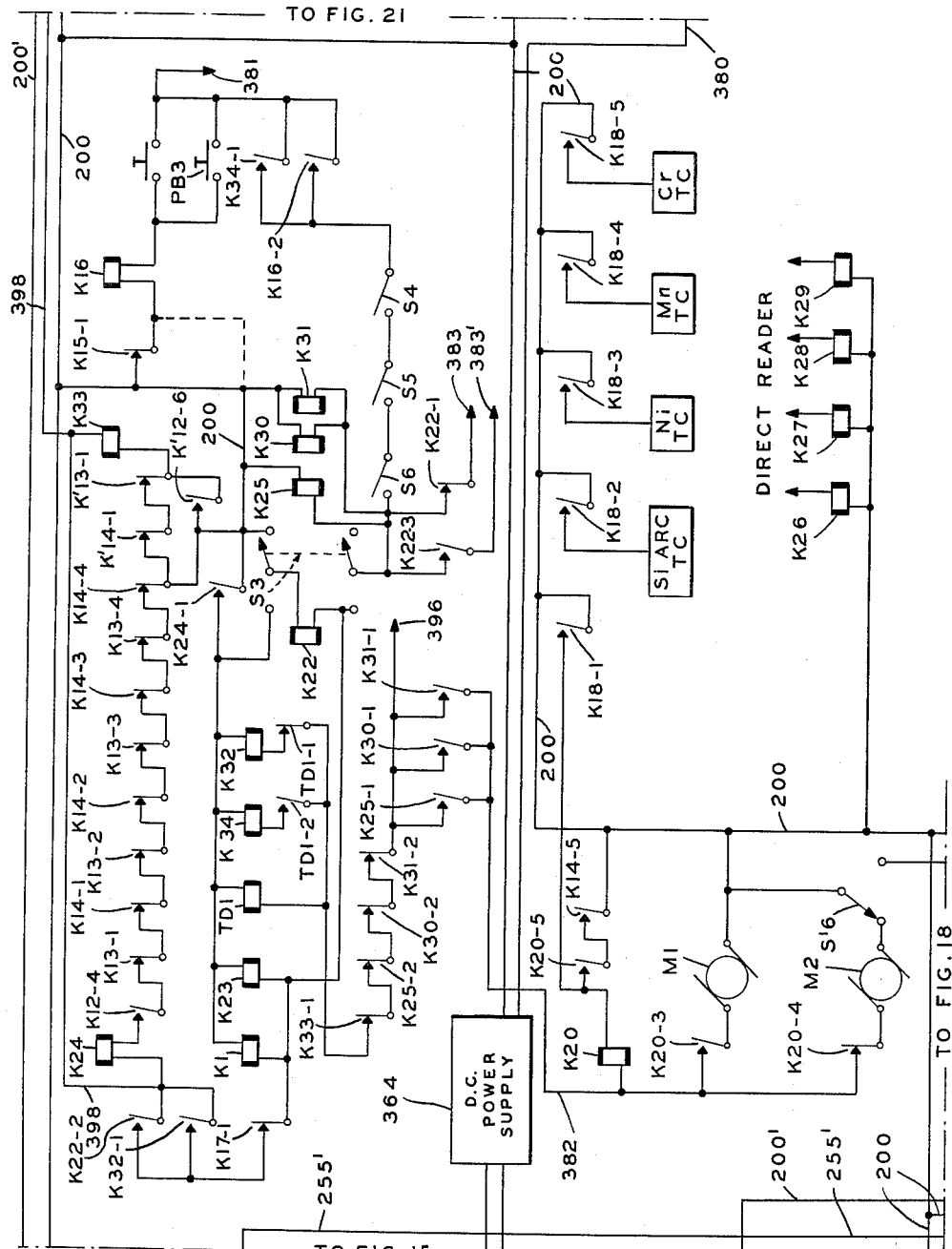

Contacts G1 and G2 are connected to ground conductor 200 to provide space signals at character busses 360 and 358, respectively. Contacts G3, G4 and G5 are connected to a conductor 363 to provide mark signals as busses 359, 361 and 362, respectively. The conductor 363 may be provided with a positive D.C. potential, e.g., 24 volts, from a D.C. power supply 364 (FIG. 17). When busses 358, 359, 360, 361 and 362 are scanned (in this order) it will be recognized that the customary teletype code for the letter "G," i.e., space—mark—space—mark—mark, will be produced. Contacts H1, H2 and H3 are connected to conductor 200 and also to busses 361, 359 and 358, respectively. Contacts H4 and H5 are connected to conductor 363 and also to busses 360 and 362, respectively. When the character busses are scanned, the customary teletype code for the letter "H," i.e., space—space—mark—space—mark, will be produced.

Scanning of the character busses may be effected by means of sequentially closed switch contacts 364, 365, 366, 367 and 368 connected to the character busses 358—362, respectively, through ganged switches 369, 370, 371, 372 and 373, respectively. The switch contacts 364—368 may be located on the teletype machine and may be closed sequentially by means of a suitable mechanism coupled to the teletype machine main shaft. The switches 364—368 are connected through a conductor 374 and a teletype line key 375 to teletype print relays 376 and 377 (FIG. 22) located in a teletype machine and arranged to operate the same in a normal manner. A pair of normally closed contacts 373 coupled between conductor 363 and conductor 374 and arranged to be operated in sequence with contacts 364—368 provides the usual start space signal and stop mark signal. The sequence of contact operations is 378, 364, 365, 366, 367, 368 and 378. When contact 378 is opened, a space signal is provided to the teletype machine. Next the contacts 364 will be closed and a space or mark signal will be supplied to the teletype machine depending upon the potential supplied to character bus 358. Character busses 359, 360, 361 and 362 will next be scanned, and, lastly, a mark signal will be applied by closing of contacts 378.

The ganged switches 369—373 are single-pole double-throw switches arranged in one position to be connected to the character busses and in the other position thereof to the conductor 363 in order to permit manual operation of the teletype machine. The switches 369—373 are also ganged with a switch 379 (FIG. 26) which, in the illustrated position thereof (automatic), completes the circuit closed by print button PB-1. In the other position of switch 379 (manual), the teletype machine may be manually operated in the usual way.

PROGRAMMING

In accordance with the invention, the system is intended to perform the various operations with a minimum of manual steps. The system operation will now be described, starting with the instrument in the following condition:

(1) Time converters are not at zero.
(2) Results of previous tests have been printed.
(3) A sample has been inserted in the direct reader, i.e., direct reading spectrograph, ready for analysis.
(4) The previous sample has been subjected to a spark test only.
(5) Switch 379 (FIG. 26) is in the automatic position thereof.

Figure 22:
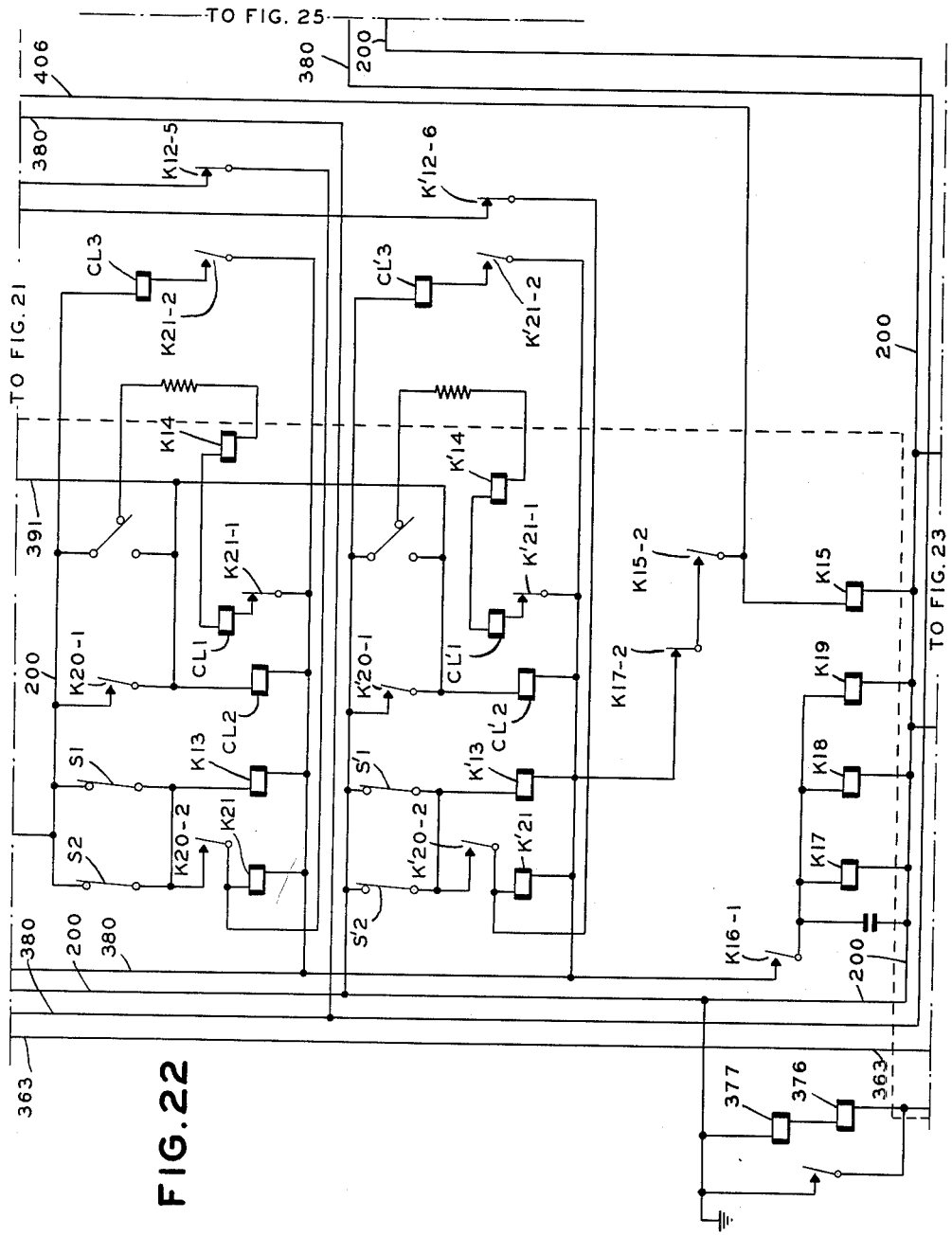

A number of relays are energized in the foregoing instrument condition. These relays are K13 (FIG. 22), K14 (FIG. 22) and K15 (FIG. 22). A coil CL1 (FIG. 22) will also be energized at this time. Accordingly, the relays K13, K14 and K15 and the coil CL1 will be treated as if their contacts are normally closed when these relays are energized, and normally open when these relays are de-energized, which is the reverse of the situation for the remaining relays.

*Starting.*—The operator may commence operation by pushing a start button PB3 (FIG. 17), the contacts of which remain closed only while the switch is held closed. As soon as the start button PB3 is depressed, a relay K16 is energized through a circuit extending from a source of positive potential (not shown) located in the direct reader and connected to terminal 381, the contacts of push button PB3, the coil of relay K16, normally closed contacts K15–1, and conductor 200 to ground. When relay K16 (which may be termed the start relay) is energized, a sequence of operations, consisting of preburn, exposure, rest and measure cycles, is initiated in the direct reader, as is well known. Operation of relay K16 causes normally open contacts K16–1 (FIG. 22) and K16–2 (FIG. 17) thereof to close. Relays K17, K18 and K19 (FIG. 22), the coils of which are in parallel, are energized upon the closing of contacts K16–1, the circuit extending from a D.C. power supply 364 through a conductor 380, contacts K16–1 and the coils of relays K17, K18 and K19, and conductor 200 to ground.

Operation of relay K18 completes an energizing circuit for a relay K20 (FIG. 17) extending from a source of positive potential in D.C. power supply 364 through a conductor 381, the coil of relay K20, normally open contacts K18–1 and conductor 200 to ground. The relay K20 is provided for starting the silicon spark time converter. A corresponding relay for each of the other spark and arc time converters should be provided and may be energized through appropriate contacts of relay K18. Energization of relay K20 completes an energizing circuit for cam coil CL2 extending from conductor 380 through coil CL2 and normally open contacts K20–1 to ground conductor 200. Coil CL2, which is a solenoid, must be energized before the silicon spark time converter can operate. This coil forms a part of an ambiguity elimination arrangement described in detail in the co-pending patent application of James C. Heselwood referred to previously.

Operation of relay K18 also results in energizing a relay K21 (FIG. 22) through a circuit extending from conductor 380 through the coil of relay K21, normally open contacts K20–2 and parallel connected limit switches S1 and S2 to ground conductor 200. Operation of relay K21 causes deenergization of coil CL1 and relay K14 by opening the energizing circuit for these relays at normally closed contacts K21–1. The coil CL1, when energized, applies a brake to the silicon spark time converter shaft so that de-energization thereof frees the shaft for rotation to permit the time converter to be returned to zero time setting. A clutch coil CL3 is also energized through a circuit extending from conductor 380 through normally open contacts K21–2 to ground conductor 200. The clutch CL3 connects the shaft of a reverse motor M1 (FIG. 17) to the silicon spark time converter shaft. The motor M1 is energized upon closing of contacts K20–3, which applies power to the motor M1 by completing the connection thereof between conductor 382 and ground conductor 200. The motor M1 causes the time converter shaft to rotate in the reverse direction, returning its potentiometer to zero setting.

Motor M2 (FIG. 17), which is provided for operating the silicon spark time converter in the forward direction, is prevented from operating by the opening of normally closed contacts K20–4 located in its energizing circuit. Release of relay K14, which occurs when relay K21 picks up, opens contacts K14–1 (FIG. 17), which prevents recycling, i.e., a repeat of operations for arc testing. The relay K14 is provided for the silicon spark time converter. Additional relays corresponding to K14 should be provided for the other time converters and the corresponding contacts thereof may be connected in series with contacts K14–1. This is illustrated in FIG. 17 where contacts K14–2 might belong to the manganese time converter, contacts K14–3 might belong to the chromium time converter, contacts K14–4 might belong to the nickel time converter, and contacts K'14–1 belong to the silicon arc time converter. The last mentioned relay, i.e., K'14, is shown in FIG. 22 along with the other relays of the silicon arc time converter. These relays correspond to relays of the silicon spark time converter and bear the same numbers except that the letter designations are primed.

De-energization of relay K14 also acts to lock in relay K20 through normally open contacts K20–5 and K14–5 (FIG. 17). It will be remembered that K14 is one of those relays which is energized at the assumed starting point of the cycle.

As the silicon spark time converter is brought within one contact space of its zero position, the limit switch S1 opens. The relays K13 and K21 are held in, however, through limit switch S2. Switch S2, which is located on the interpolating potentiometer shaft, maintains this circuit closed when the interpolating potentiometer shaft is very close to zero. Limit switch S2 opens when the interpolating potentiometer shaft arrives at the zero position. Opening of switch S2 causes relays K13 and K21 to drop out. When relay K21 drops out, contacts K21–1 thereof close, energizing brake coil CL1 and brake relay K14. Clutch CL3 is again energized by the closing of contacts K21–2. The silicon spark time converter is now positioned at zero time setting and is ready to accept a signal from the direct reader. Very accurate positioning of the time converter at zero setting is achieved by de-energizing cam coil CL2. In order for cam coil CL2 to be de-energized, contacts K20–1 should be open. In order to open these contacts, relay K20 is de-energized by the opening of contacts K14–5, which occurs when relay K14 is energized by the closing of contacts K21–1. When relay K20 drops out, contacts K20–3 thereof open, thereby stopping reverse motor M1. At the same time, contacts K20–4 close, starting forward motor M2, so that the silicon spark time converter is ready for measurement operation as soon as an input signal from the direct reader energizes its clutch CL3.

It will be recalled that when start button PB3 was depressed, relay K16 picked up. With a double-pole double-throw switch S3 (FIG. 17) in the spark position thereof, and with safety interlock switches S4, S5 and S6 closed, closing of contacts K16–2 applies a positive potential from terminal 381 to one side of each of relays K22, K1 and K23. These relays remain unoperated because normally open contacts K24–1 are still open. The relay K22 may be termed the spark-arc transfer relay and performs switching functions which may be effected manually by operation of switch S3.

While relay K22 remains de-energized, normally closed contacts K22–1 thereof apply a positive potential from terminal 381 through contacts K16–2 to a terminal 383 which initiates the spark analysis sequence of operations of the direct reader. Thus with relay K22 de-energized, closing of contacts K16–2 may be analogized to the operation of a spark test start button on the direct reader. Closing of contacts K16–2 also energizes a relay K25, some of whose contacts (not shown) set up the normal programming operation of the direct reader. The direct reader then proceeds through the customary warm-up and exposure period at the end of which excitation of the sample stops and the measuring period begins.

When start button PB3 is released, relay K16 drops out and contacts K16–1 and K16–2 open. Opening of contacts K16–1 drops out relays K17, K18 and K19. Relays K17, K18 and K19 are preferably of the slow-to-release type, so that holding circuits for other relays initially operated by contacts of relays K17, K18 and K19 have had an opportunity to be established before relays K17, K18 and K19 drop out.

*Measuring period.*—The measuring period commences with energization of relays K26—K29 (FIG. 17). These relays are energized by appropriate connections with the direct reader. One of the relays K26—K29 is provided for each element channel. With a direct reader of the type described in the above mentioned Saunderson et al. patent, each of the relays K26—K29 would remain energized until the voltage on the standard condenser discharges to a voltage equal to that on the element condenser, the time required for this discharge being dependent upon the voltage accumulated on the element condenser and the rate of discharge of the voltage on the standard reference condenser. Since only the silicon spark and arc time converter control circuits are shown in the drawings, the contacts of only relay K27 will be shown as connected in FIG. 21. Connections for relays K26, K28 and K29 would be identical.

The direct reader output signals for all channels are commenced by energization of relays K26—K29. The time of de-energization of each relay determines the end of the corresponding direct reader output signal. Only the silicon channel operation will be described, although it should be understood that operation for the other channels can proceed in the same manner.

When relay K27 is energized, contacts K27–1 and K27–2 (FIG. 21) close, applying ground potential from conductor 200 to conductors 390 and 391. With ground potential on conductor 390, relay K21 or relay K'21 will be energized, depending upon the condition of relay K23 (FIG. 17). With relay K23 de-energized, ground potential from conductor 390 is applied to one side of relay K21 through normally closed contacts K23–1. With relay K21 picked up, brake relay K14 and brake coil CL1 will be de-energized by the opening of normally closed contacts K21–1. At the same time, clutch CL3 will be energized by the closing of normally open contacts K21–2. Operation of clutch coil CL3 operatively connects forward motor M2 to the spark time converter shaft, causing the latter to turn in the forward direction. In order to permit operation of the time converter, cam coil CL2 is picked up by the closing of contacts K27–2, which applies ground potential to one side of coil CL2 through conductor 391.

The instant the time converter tap switch leaves the zero time position, limit switches S1 and S2 close. Closing of switch S1 energizes relay K13, closing contacts K13–1 (FIG. 17) thereof. Contacts K13–1 are included in series circuit containing contacts K14–1, etc. Thus the closing of contacts K13–1 prepares the circuit for recycle operation in the event an arc test of the sample is necessary. Contacts K13–1 form a part of the silicon channel. Contacts K13–2, K13–3 and K13–4 are corresponding contacts of corresponding relays for the manganese, chromium and nickel channels, respectively. It will be observed that no corresponding contacts for the silicon arc channel are provided in the series circuit between conductor 200 and recycle relay K24 since, in the event of an arc test producing a "<" result, recycle is not desired. Closing of switch S2 prepares relay K21 for energization during the next starting operation when contacts K20–2 will be closed.

De-energization of relay K27 will occur when the voltage on the standard iron condenser discharges to the voltage on the silicon condenser in the direct reader. When relay K27 drops out, contacts K27–1 thereof open, causing relay K21 to drop out by the removal of ground potential from conductor 390. Relay K14 and coil CL1 will pick up by the closing of normally closed contacts K21–1. Operation of relay K14 closes contacts K14–1 (FIG. 17) thereof, preparing the circuit for recycle operation. Energization of coil CL1 applies a braking action to the silicon time converter shaft to stop it from rotating. Contacts K21–2 open, de-energizing clutch coil CL3, thus disconnecting forward motor M2 from the time converter shaft. Opening of contacts K27–2 de-energizes cam coil CL2, which then acts to position the time converter tap switch exactly on the proper tap position without ambiguity. The silicon time converter potentiometer, including the interpolating potentiometer, will now be the proper setting determined by the percent concentration ratios of silicon and iron, as previously explained. The other spark time converters will proceed to carry out their operations at the same time as the silicon spark time converter, although the stopping time of each will, in general, be different and will depend upon the percent concentration ratios of the corresponding elements.

If the tap switch of the silicon spark time converter had not left zero time position, either because of a malfunctioning of the equipment or because of too large a silicon concentration, recycling for arc excitation will not take place since relay K13 will not have picked up and contacts K13–1 thereof will not close.

Figure 18:
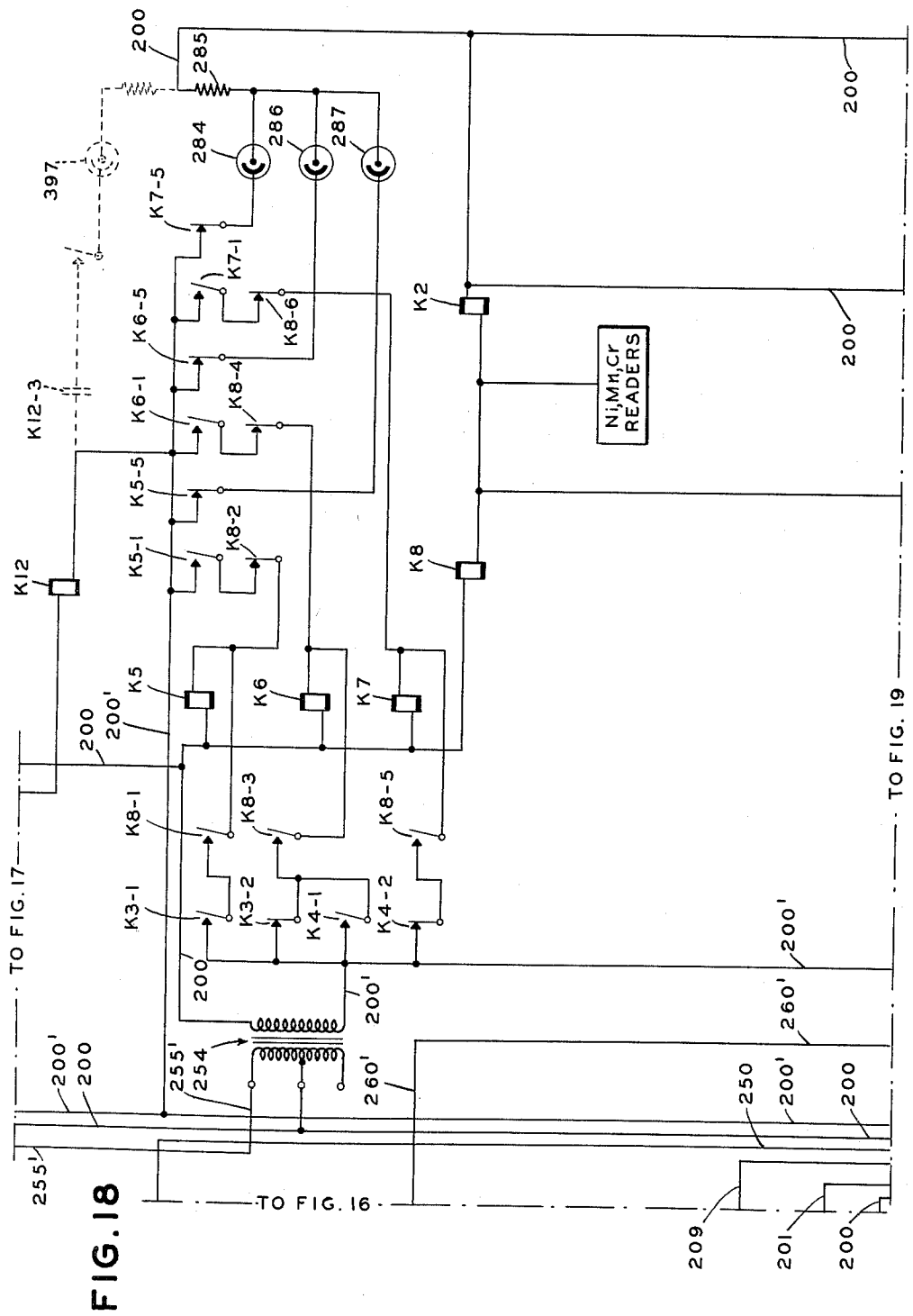

The direct reader is preferably provided with a timer, which is energized when the measuring period begins and de-energized at the end of the maximum permissible measuring period. This timer, which is not shown in the drawings, may be provided with contacts which remove power from terminal 381 and from a terminal 396 at the the end of the maximum permissible measuring period. Removal of power from terminal 381 causes relay K25 to drop out and also relays K30 and K31, whose coils are connected in parallel with K25. As a result, contacts K25–1, K30–1 and K31–1 drop out, removing power from conductor 382, which stops forward motor M2. The circuit for motor M2 is also broken at a limit switch S'6 (FIG. 17), which opens at the maximum time converter shaft travel. The contact of switch S'6 removes ground potential from motor M2 and applies ground potential to the "less than" relay K12. When the relay corresponding to K12 for any of the manganese, chromium, nickel and silicon arc channels is energized, contacts K12–3 (FIG. 18) close, illuminating a "less than" light 397. This connection is shown in FIG. 18 in dotted lines, since for the silicon spark channel no contacts corresponding to K12–3 are provided. It will be recalled that in the embodiment of the invention illustrated an arc channel is provided only for silicon analysis. Energization of relay K12 also closes normally open contacts K12–4 (FIG. 17) thereof, these latter contacts being included in the energizing circuit for recycle relay K24. Opening of normally closed contacts K12–5 (FIG. 22) de-energizes relay K21, which in turn closes contacts K21–1 and energizes brake coil CL1 and brake relay K14. Opening of contacts K21–2 de-energizes clutch coil CL3. These actions prevent the time converter forward motor M2 from driving the time converter shaft and positively stopping the time converter shaft from rotating. Energization of relay K14 also prepares the energizing circuit of relay K24 for completion. Upon energization of relay K12, contacts K12–2 (FIG. 27) thereof open to disconnect terminal 329T from the teletype space code relay. For the nickel, manganese and chromium channels, this would cause printing of a "less than" symbol at a subsequent step in the cycle. For the silicon channel, contacts K12–1 and K12–2 are not connected in the spark time converter. The printing of the "less than" symbol depends upon the results of the arc test in which case should a relay K'12 (not shown, on the drawing, but which corresponds to relay K12 on the spark time converter) be energized because the arc time converter shaft has travelled to maximum time, contacts K'12–2 will open to disconnect terminal 329T from the teletype space code relay and contacts K'12–1 will close, thus causing the printing of a "less than" symbol during the subsequent printing step in the cycle.

Upon energization of relay K14, relays K12 and K13 having previously been energized, recycle relay K24 (FIG. 17) is energized. The energizing circuit for relay K24 extends from A.C. supply conductor 398 through the coil of relay K24 and series connected contacts K12–4, K13–1, K14–1, K13–2, K14–2, K13–3, K14–3, K13–4, K14–4, and conductor 200 to ground. It will be evident that for relay K24 to pick up the K13 and K14 relays for each spark time converter will have to be energized.

When relays K25, K30 and K31 drop out, as described previously, an energizing circuit for a relay K32 (FIG. 17) is completed. This circuit extends from terminal 396 through normally closed contacts K31–2, normally closed contacts K30–2, normally closed contacts K25–2, normally closed contacts K33–1 of a prevent recycle relay K33 (FIG. 17), normally closed contacts TD1–1 of a timer TD1 (FIG. 17), the coil of relay K32, normally open contacts K24–1, and conductor 200 to ground. Operation of relay K32 closes contacts K32–1 thereof, completing the energizing circuits for relays K22, K23 and K1. The energizing circuits for relays K1, K22 and K23 extend from conductor 398 through contacts K32–1, normally closed contacts K17–1, the parallel connected coils of relays K1, K22 and K23, contacts K24–1, and conductor 200 to ground. Operation of K1 opens contacts K1–1 and closes contacts K1–2 (FIG. 20) to disconnect the silicon spark time converter from the computer and range changer and to connect the silicon arc time converter to the computer and range changer.

Operation of relay K23 opens contacts K23–3, K23–4, K23–5 and K23–1 (FIG. 21), thereby disconnecting the time converter control circuits for the nickel, chromium, manganeses and silicon spark time converters by preventing energization of their relays K21. Closing of contacts K23–6 applies ground potential to relay K'21 to produce operation of the silicon arc time converter.

Operation of spark-arc transfer relay K22 conditions the direct reader for arc operation instead of spark operation.

Upon de-energization of relays K25, K30, and K31, as previously described, time delay relay TD1 picks up through a circuit extending from terminal 396 through contacts K31–2, K30–2, K25–2, K33–1, the coil of time delay relay TD1, contacts K24–1, and conductor 200 to ground. After a short interval, which might be, for example, one to two seconds, relay TD1 times out and contacts TD1–1 thereof open, while contacts TD1–2 close. Opening of contacts TD1–1 de-energizes reset relay K32. This does not result in any action since contacts K32–1 are bridged by contacts K22–2. The closing of contacts TD1–2 energizes a restart relay K34, since the coil of this relay and contacts TD1–2 are in parallel with the coil of timer TD1.

Energization of relay K34 closes contacts K34–1 thereof, applying power from terminal 381 to the coil of relay K25 to energize the latter. Energization of relays K34 and K25 commences the arc test cycle in the direct reader. The closing of contacts K25–1 applies power from terminal 396 to conductor 382, thereby starting the forward motor (not shown) of the silicon arc time converter corresponding to motor M2. Motor M2 of the silicon spark time converter will not be operated because switch S'6 will be open, i.e., will not be made with the motor terminal but rather with the "less than" relay terminal. The forward motors of the other time converters will be energized but no action will take place because their brakes (CL1) and clutches (CL3) will not be energized.

If the arc test warmup and exposure cycle of the direct reader is complete, the measuring period will commence with energization of relay K27. Relay K27 will remain energized until the voltage of the standard iron reference condenser discharges to the voltage accumulated on the silicon condenser. Energization of relay K27 will result in operation of relay K'21 through a circuit extending from conductor 380 through the coil of relay K'21, normally closed contacts K'12–6, contacts K23–6 and contacts K27–1 to ground conductor 200. Relay K'12 is not shown in the drawings but appears in the silicon arc time converter circuit and corresponds to "less than" relay K12 (FIG. 18). Closing of contacts K27–2 results in energization of cam coil CL'2, which establishes a running condition for the silicon arc time converter worm gear and tap switch. With relay K'21 energized, contacts K'21–1 open, resulting in de-energization of brake coil CL'1. Clutch coil CL'3 will be energized upon closing of contacts K'21–2.

As soon as the tap switch of the silicon arc time converter leaves zero position, switches S'1 and S'2 close. Closing of switch S'1 energizes relay K'13, which in turn closes contacts K'13–1, thereby preparing the circuit for the prevent-recycle operation to be described. Closing of switch S'2 prepares the circuit for energization of relays K'20 and K'21 during the next starting operation.

Relay K27 (FIG. 17) will be de-energized when the standard iron reference condenser discharges to the voltage level of the silicon condenser. The consequent opening of contacts K27–1 and K27–2 (FIG. 21) will cause relay K'21 and cam coil CL'2 to be de-energized. De-energization of relay K'21 causes contacts K'21–1 thereof to close and contacts K'21–2 thereof to open. Closing of contacts K'21–1 causes relay K'14 to pick up and coil brake CL'1 to be energized. Energization of relay K'14 closes contacts K'14–1 (FIG. 17) thereof, thereby completing an energizing circuit for prevent-recycle relay K33, extending from conductor 398 through the coil of relay K33, contacts K'13–1, contacts K'14–1, and conductor 200 to ground. Operation of relay K33 opens normally closed contacts K33–1 thereof, which acts to prevent any further recycling operation, irrespective of the result of the arc test. Energization of coil CL'1 applies braking action to the silicon arc time converter shaft to stop the same from rotating. At the same time, opening of contacts K'21–2 de-energizes clutch coil CL'3 to disengage the time converter shaft from the forward driving motor.

The opening of contacts K27–2 de-energizes cam coil CL'2 to provide accurate location of the time converter tap switch exactly on the proper tap position, without ambiguity. The voltage appearing at slider 128' of the silicon arc interpolating potentiometer 125' (FIG. 20) will now be directly proportional to the actual percent concentration of silicon in the sample as determined by the arc test.

Should the arc test range be exceeded, i.e., the silicon concentration be below that at which the arc time converter is calibrated, a "less than" light 397 will be illuminated when the relay corresponding to "less than" relay K12 is picked up upon operation of limit switch S'6 (FIG. 18). Contacts of this relay will also cause a "less than" symbol to be printed in the appropriate place in the message. If the silicon arc time converter shaft is stopped by opening of relay K27 prior to operation of limit switch S'6, the relay corresponding to K12 will not be picked up. The potential appearing at slider 128' will be applied to the silicon reader circuit irrespective of the arc test result. However, if the arc test range is exceeded, a "less than" symbol will be printed in addition to the concentration corresponding to the minimum potentiometer reading. It will be observed that the various lamps shown in the drawings, e.g., the lamp 397 of FIG. 18, are of the neon type, although other types of lamps could, of course, be used.

Upon completion of the direct reader timing interval, as determined by its own timer, the relays K25, K30 and K31 will be de-energized and will act to de-energize the direct reader control circuit and also to remove potential from conductor 397, thereby to de-energize the silicon arc time converter forward motor corresponding to motor M2 (FIG. 17).

Since, as explained previously, operation of the computer circuit takes place at the same time that the time converters are operating, the potentials appearing at the terminals REM, Ni, Si, Mn, Cr and Fe (FIG. 16) are equal to the actual percent concentrations of the remainder and of nickel, silicon, manganese, chromium and iron, respectively, in the sample subjected to testing in the direct reading spectrometer.

*Reading period.*—After the time converters have stopped operating, the operator may actuate clear button PB2 (FIG. 25) to initiate the sequence of operations of the reading period, in which the computer outputs (i.e., modified time converter outputs) are converted into an analog quantity suitable for encoding, e.g., rotational position of the shafts of the reader potentiometers, including potentiometer 260 (FIG. 20) of the silicon reader and the corresponding potentiometers of the other readers. Actuation of switch PB2 completes an energizing circuit for relay K9 extending from power supply 364 through conductor 380, normally closed contacts K35–1 (FIG. 24), normally closed contacts K36–1, switch PB2, the coil of relay K9, and conductor 200 to ground. Relay K9 locks in through contacts K9–2 thereof, which are connected in parallel with switch PB2.

Figure 19:
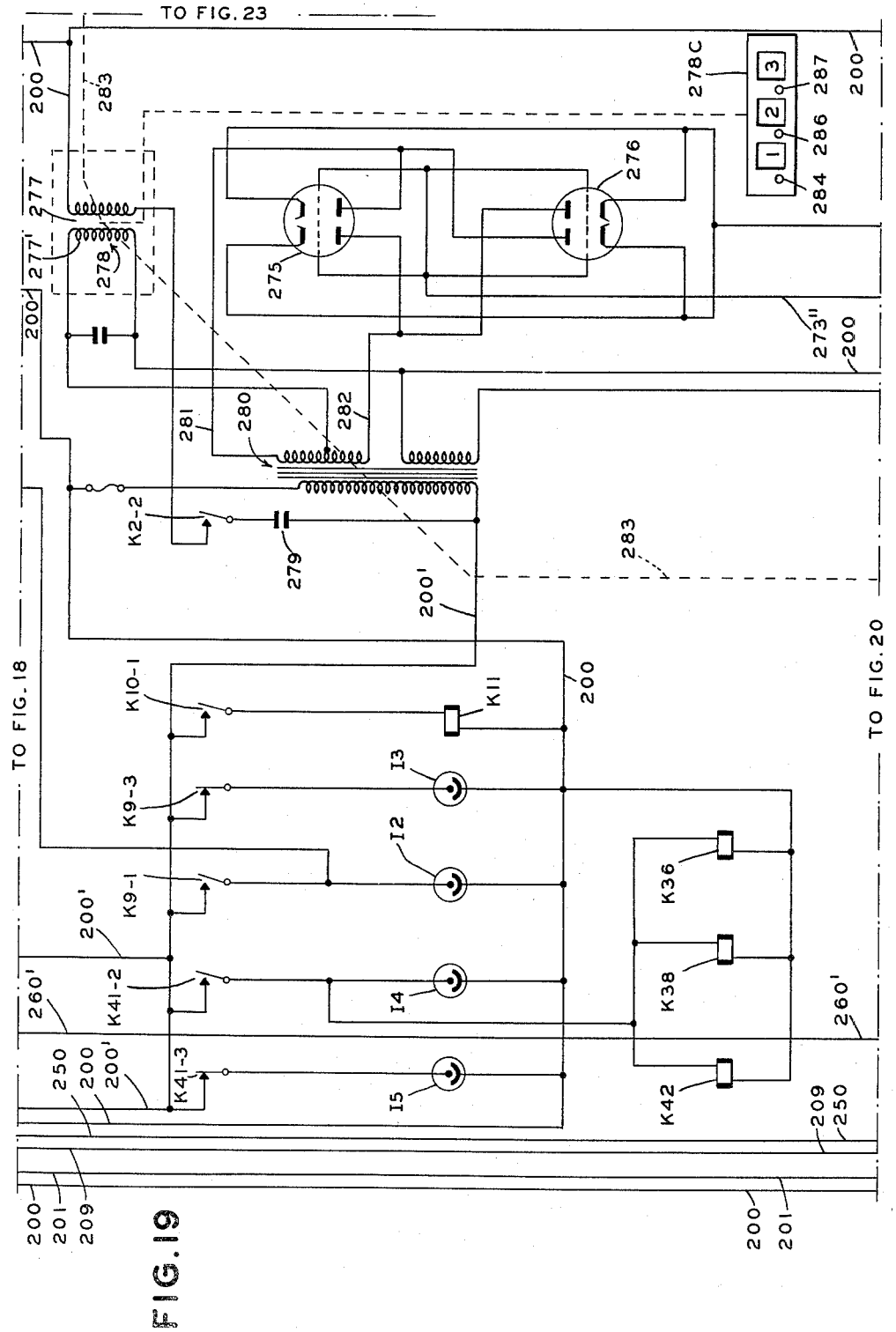

Opening of contacts K9–3 (FIG. 19) extinguishes light I3 (FIG. 19). Closing of contacts K9–1 (FIG. 19) energizes lamp I2, which indicates that the circuit has been cleared in preparation for the reading operation. Closing of contacts K9–1 also energizes relays K8 and K2 (FIG. 18).

Energization of relay K2 opens normally closed contacts K2–3 (FIG. 20) thereof, which disconnects reader potentiometer 260 from conductor 250 and hence from one side of the input to chopper 270. Since the reader potentiometer 260 is always connected to the other side of chopper 270, there is created an unbalanced input to the reader servo amplifier. It will be understood that circuit connections corresponding to the foregoing and to the following reader connections will be repeated for the reader channels which are not illustrated, i.e., the manganese, nickel and chromium channels. Closing of contacts K2–1 connects interpolating potentiometer 125 or interpolating potentiometer 125' (depending upon the condition of relay K1) to the range changer input at conductor 250 and to the reader servo amplifier input at one side of chopper 270, as has previously been described. Similarly, contacts K2–2 will close to apply power to servo motor 277 which will turn in a direction indicated by the phase signal from the servo amplifier.

As previously described, the range changer input (interpolating potentiometer output) is compared by choppers 245 and 240 with the one and ten volt reference potentials. Relays K3 and K4 will assume energized or de-energized conditions, depending upon whether the interpolating potentiometer output is less than one volt, greater than one volt but less than ten volts, or greater than ten volts. The conditions of relays K3 and K4, together with the condition of relay K8, will determine the energized or de-energized conditions of relays K5, K6 and K7, whose operation has previously been considered. For the following sequence it will be assumed that the interpolating potentiometer output is greater than ten volts, which means that relay K5 will be de-energized while relays K6 and K7 will both be energized.

It will be recalled that energization of relay K9 resulted in energization of relay K8 (FIG. 18). Energization of relay K8, with relays K3 and K4 de-energized, will cause relay K7 to be energized, relay K6 to be energized, and relay K5 to be de-energized. Energization of relay K7 closes contacts K7–4 thereof, connecting potentiometer 260 (FIG. 20) to contacts K6–4 and K5–2. Opening of contacts K7–5 prevents illumination of the 0 to 1% neon lamp 284. Opening of contacts K7–6 (FIG. 27) disconnects the decimal point teletype code relay "." (FIG. 26) from the one volt stepper contact 319T (FIG. 27). Closing of contacts K7–3 connects resistor 267' between the slider of potentiometer 263 (FIG. 16) and ground, to maintain circuit balance. Opening of contacts K7–2 disconnects potentiometer 260 from the one volt input at potentiometer 263.

Energization of relay K6 causes contacts K6–4 thereof to close, connecting potentiometer 260 to the one hundred volt potentiometer 261. Opening of contacts K6–5 prevents energization of one to ten volt range lamp 286 (FIG. 18). Opening of contacts K6–6 (FIG. 27) disconnects the decimal code relay from the ten volt stepper contact 318T. Closing of contacts K6–3 connects resistor 268' (FIG. 16) between the ten volt tap of potentiometer 262 and ground, to maintain circuit balance. Opening of contacts K6–2 prevents the ten volt input from potentiometer 262 from being applied to potentiometer 260.

De-energization of relay K5 closes contacts K5–5 (FIG. 18) thereof, completing the energizing circuit for the ten to one hundred volt range lamp 287. Closing of contacts K5–6 (FIG. 27) connects the decimal point code relay to the one hundred volt stepper contact 317T, so that a decimal point will be printed in the third position of the silicon concentration code, indicating a concentration in excess of 10%, e.g., 11.5%. Opening of contacts K5–4 (FIG. 16) disconnects resistor 269 from the one hundred volt tap of potentiometer 261. Closing of contacts K5–3 connects potentiometer 260 to the one hundred volt source, i.e., the slider of potentiometer 261.

As previously explained, the interpolating potentiometer output at slider 128 (or at slider 128' for arc operation) is compared with the voltage output at the slider of potentiometer 260 by means of chopper 270 and the slider of potentiometer 260 is adjusted through linkage 283 driven by servo motor 277 until the output of potentiometer 260 is equal to the output of the interpolating potentiometer. As the shaft or other linkage 283 is moved, e.g., rotated, the counter 278C (FIG. 19) is actuated to give a visual indication of the voltage output at the slider of potentiometer 260. At the same time, the shaft 283 positions the reader commutators (FIG. 25)

so that the brushes will rest on contacts representing the numbers on the reader counter supplying appropriate information to the code relays 304 (FIG. 26) so a typed or printed record will subsequently automatically be made. With switch 210 (FIG. 16) in the operate position as shown, the counter 278C and the reader commutators will be supplied with information on the actual percent concentration of silicon. Should the switch 210 be placed in the calibrate position, the information supplied thereto will be the percent ratio concentration. The readers, counters and commutators for the other elements for which an analysis is sought will operate in the same way as just described for silicon. After all the readers are balanced, a switch S7 (FIG. 21) will be mechanically closed by a linkage with switch 375 (FIG. 23). The action of manually opening and closing switch 375 results in the mechanical closing of switch S7. This results in energization of a relay K37 (FIG. 21) through a circuit extending from the high side of the A.C. line at conductor 200′, through a manual switch S8, the switch S7, a resistor 400, the coil of relay K37 and conductor 200 to ground. A local teletype motor M3 is also energized through a circuit extending from conductor 200′ through switch S8, switch S7, a coil 401, Motor M3 and conductor 200 to ground. Switch S8 is manually operated to remove power from the teletype only for servicing purposes. In operation it is normally closed at all times.

The automatic elements of the instrument will now be ready for the printing operation to be initiated. However, during the reading operation the operator should provide certain additional information to be included in the final message. This will be done through operation of push buttons located in banks, of which the bank 354 is shown in FIG. 26. The push buttons of the various banks will be mechanically released from any previous data upon operation of clear button PB2, as indicated by the mechanical linkage shown at 402. Thereafter, the operator may insert suitable information, such as the furnace number and test number, by depressing proper push buttons. The circuit will preferably be arranged so that blank buttons must be depressed on rows where no information is required, which will close print interlock circuits such as the ones shown in bank 354 and previously described. Operation of a push button in each bank will connect the appropriate code relays to the appropriate stepper terminals. For example, operation of the No. 8 push button of bank 354 will connect the 8 code relay to stepper terminal 342T (FIG. 27) through conductor 355.

*Printing.*—The printing operation is commenced by actuation of print button PB1 (FIG. 26), which is depressed momentarily by the operator. Operation of switch PB1 causes energization of relay K35 through a circuit extending from D.C. power supply 364, through conductor 380, normally closed contacts K35–1, normally closed contacts K36–1, conductor 356, the operated one of the left-hand set of contacts of bank 354 (print interlock circuit), print button PB1, switch 379, a conductor 403 and the coil of relay K35 to ground conductor 200. When energized, relay K35 locks in through a circuit extending from D.C. power supply 364 through conductor 380, contacts K35–2, normally closed contacts K38–1, normally open contacts K37–1, a conductor 404, normally open contacts K35–3 and the coil of relay K35 and conductor 200 to ground.

Energization of relay K35 results in energization of teletype clutch actuator K39 (FIG. 24) through a circuit extending from D.C. conductor 380 through normally open contacts K35–2, normally closed contacts K38–1, normally open contacts K37–1, and coil K39 to ground through conductor 200. Energization of coil K39 starts the teletype mechanism sweeping transmitting contacts 364–368 and 378.

In sweeping the transmitting contacts of the local teletype machine, the following sequence will be observed:

(1) Stepper advance contact S9 (FIG. 24) closes.
(2) Transmitting contact 378 opens.
(3) Transmitting contact 364 closes.
(4) Transmitting contact 364 opens.
(5) Transmitting contact 365 closes.
(6) Transmitting contact 365 opens.
(7) Transmitting contact 366 closes.
(8) Transmitting contact 366 opens.
(9) Transmitting contact 367 closes.
(10) Transmitting contact 367 opens.
(11) Transmitting contact 368 closes.
(12) Transmitting contact 368 opens.
(13) Transmitting contract 378 closes.
(14) Stepper advance contact S9 opens.

This cycle will be repeated over and over again while the teletype clutch actuator K39 is energized.

Energization of relay K35 opens contacts K35–1 (FIG. 24) thereof, thereby opening the energizing circuit for relay K9 (FIG. 25). This will cause normally closed contacts K9–3 (FIG. 19) to close, thereby illuminating neon lamp I3. Opening of contacts K9–1 (FIG. 19) opens the energizing circuits for relays K2 and K8 (FIG. 18), dropping out these relays. Opening of contacts K9–1 also extinguishes lamp I2.

Closing of contacts K8–6 releases relay K7 from control of relay K4 since relay K8 is of the make-before-break type, so that contacts K8–6 close before contacts K8–5 open. Relays K6 and K5 are likewise disconnected from the operation of relay K3. De-energization of relay K2 causes the reader potentiometer 260 (and also the corresponding reader potentiometers for the other readers) to be connected to its reader servo amplifier input, as previously explained. Similarly, the interpolating potentiometers are disconnected from the range changers and from input to the reader servo amplifiers. These actions keep the servo amplifiers and readers in the state of balance previously established because the reader potentiometers are now balanced against themselves. Opening of contacts K2–2 (FIG. 19) disconnects the fixed phase of servo motor 278 from the circuit.

Figure 24:
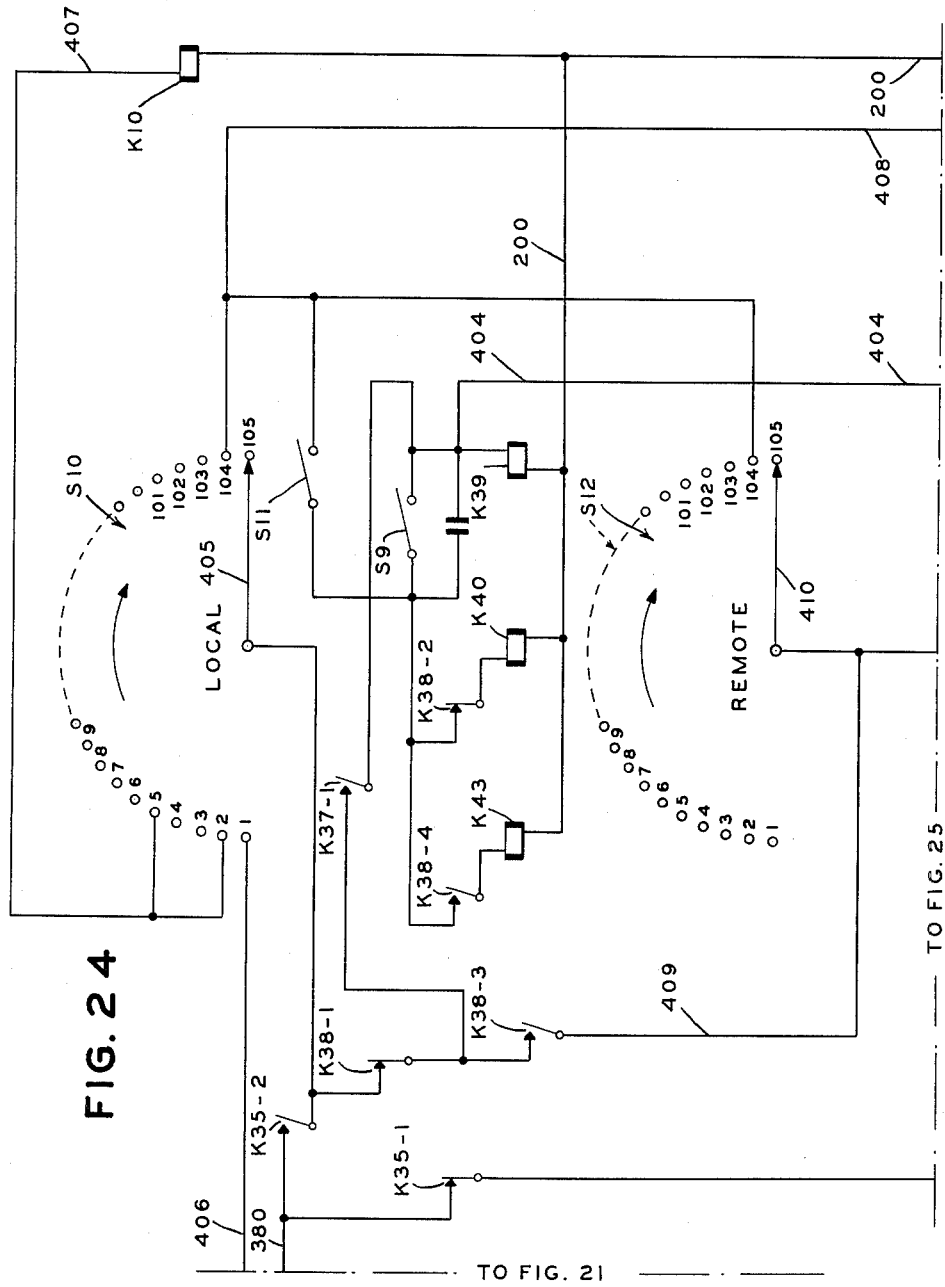

When stepper advance contact S9 is closed (once in each teletype transmitting contact cycle) a local stepper switch coil K40 will be energized through a circuit extending from D.C. conductor 380 through contacts K35–2, K38–1, K37–1, stepper advance contact S9, normally closed contacts K38–2, coil K40 and conductor 200 to ground. Each time coil K40 is energized, a wiper 405 of a stepping switch S10 (FIG. 24) is caused to advance one contact. Switch S10 should be provided with one contact for each element of the message to be printed; and, in addition, contacts for control operations. For example, as shown in FIG. 24, switch S10 may have 105 contact positions. The first energization of coil K40 causes the wiper 405 to leave blank contact 105 of switch S10 and to advance to contact 1.

With wiper 405 resting on contact 1 of switch S10, an energizing circuit for relay K15 (FIG. 22) is completed. This circuit extends from D.C. conductor 380 through contacts K35–2, wiper 405, contact 1 of switch S10, and a conductor 406 and the coil of relay K15 to ground conductor 200. Once energized, relay K15 locks up through a circuit extending from conductor 380, normally closed contacts K17–2, normally open contacts K15–2, and the coil of relay K15 to ground conductor 200. When relay K15 is energized, contacts K15–1 (FIG. 17) thereof close, preparatory to energization of relay K16 upon operation of start button PB3 at the commencement of the next instrument cycle.

If a code relay is connected to the No. 1 contact of stepper switch S10, it will also be energized when wiper 405 is resting on contact 1. The connections between the contacts of switch S10 and the associated code relays are not shown, but are made through respective ones of the T terminals shown in FIG. 27 or through additional such T terminals not illustrated. The T terminals are connected to appropriate code relays, depending upon the internal connections set up as a result of the analysis and manually through the push button banks. Several examples of connections are illustrated in FIGS. 26 and 27 and have previously been explained. However, since contact 1 is used for control purposes, it is desirable that no code relay be connected thereto. Some of the terminals of switch S10 will be connected through T terminals to the letters and figures code relays to achieve proper operation of the teletype machine in the production of the desired message. Examples of suitable messages for indicating the analysis results in four element analyses of steel samples might be as follows:

| Heat | Test | Date | Time | Analysis | | | |
|---|---|---|---|---|---|---|---|
| JX8888 | 10 | 12-28-54 | 0826 | Si .111 | Mn 3.43 | Cr 11.5 | Ni .913 |
| AR 1234 | 1 | 12-28-54 | 1030 | Si .234 | Mn 1.46 | Cr 10.7 | Ni <.005 |

The first sequence of sweeping teletype transmitting contacts will be ended with the opening of switch S9. Since teletype clutch actuator K39 remains energized, the next sequence will immediately begin with the closing of switch S9, which will in turn again energize local stepper K40, which had been released when switch S9 opened. This will cause wiper 405 to advance to the second terminal of switch S10. At this time rounder relay K10 (FIG. 24) will be energized through a circuit extending from wiper 405 through contact 2 of switch S10, a conductor 407, the coil K10 and conductor 200 to ground. As has previously been explained, relay K10, when energized, sets the commutator contacts and the counter exactly in the nearest contact or number in order to eliminate ambiguity which might arise should the shaft 283 stop rotating in some intermediate position. Relay K10 will be released when wiper 405 leaves contact 2 of switch S10. Further energization of relay K10 may occur at some other point or points to insure maintenance of the commutators at the proper points. For example, contact 5 of switch S10 may be connected to conductor 407. When wiper 405 reaches the next to the last contact of switch S10, i.e., the contact 104, the stop code relay will be energized through a conductor 408 to stop the teletype machine, indicating that the end of the message has been reached. When wiper 405 rests on contact 104 of switch S10, the local stepper coil K40 will be energized through a switch S11 to advance wiper 405 to its final position on contact 105. Thereafter, no further stepping will take place since stepper advance switch S9 will not be energized by the teletype sweeping operation, the latter having been terminated by energization of the stop code relay.

Upon opening of switch S7 (FIG. 21) coincident with the stop signal received by the teletype, relay K37 will be de-energized, resulting in opening of contacts K37–1 (FIG. 24). Opening of contacts K37–1 causes relay K35 to be de-energized, removing power from relay K9 whereby the latter will be de-energized.

*Remote printing.*—If it is desired to print the message at one or more remote locations, remote printing operation is initiated by closing a switch PB4 (FIG. 25). Closing of switch PB4 completes an energizing circuit for a relay K41, extending from conductor 380 through a normally closed switch PB5, switch PB4, the coil of relay K41, and conductor 200 to ground. Contacts K41–1 bridge switch PB4 so that the latter may be released without dropping out relay K41. Closing of contacts K41–2 (FIG. 19) applies power from conductor 200′ to a remote print indicating lamp I4 and to the coils to relays K36, K38 and K42 (FIG. 19). Opening of normally closed contacts K41–3 extinguishes a local print indicating lamp I5. Operation of relay K38 opens the previously established energizing circuit for relay K35 at normally closed contacts K38–1. For remote printing there is provided a switch S12 which may be identical to the switch S10, and its various contacts are connected to the same teletype code relays as are the corresponding contacts of the switch S10. Switch S12 may differ from switch S10 in connections so that a different message may be printed remotely, e.g., tape printing instead of columnar printing.

Operation of relay K38 opens contacts K38–2 thereof, thereby disconnecting the coil K40 of local stepper switch S10 from stepper advance contact S9. Closing of contacts K38–4 connects remote stepper switch coil K43 in place of the coil K40, so that when the coil K43 is operated by closing of switch S9, wiper 410 of the switch S12 will be advanced from contact to contact. Opening of contacts K42–1 (FIG. 23) disconnects the remote teletype selector magnet terminal from D.C. conductor 363 and closing of contacts K42–2 connects the remote teletype selector magnet terminal to the transmitting contacts 364—368 and 378.

To start the remote teletype machine or machines, the switch 375 (FIG. 23) should be manually opened and then closed, thus sending a start signal to the remote printer. The printing operation may now be commenced by operating print button PB1, which will energize relay K35 and teletype clutch actuator K39 in the manner previously described. However, instead of switch S10 stepping from position to position, switch S12 will do this. The remote teletype selector magnets will be energized in accordance with the space and mark signals appearing on the character busses 358—362. At the end of the message, the stop code relay will be energized as wiper 410 makes with contact 104 of switch S12. This will stop the successive sweeping of the transmitting contacts, as previously described. Remote stepping switch coil K43 will receive one further impulse from contact 104 of switch S12, which will step wiper 410 to contact 105, where it will come to rest. Opening of switch S7 will again de-energize relay K37, opening contacts K37–1 and thus de-energizing relay K35 and teletype clutch actuator K39. Manual opening of switch PB5 (FIG. 25) will cause relay K41 to drop out, which will in turn disconnect the remote teletype machine, will illuminate lamp I5, and will extinguish lamp I4. Relays K36, K38 and K42 will also be de-energized, returning the circuit to condition for local printing.

Under some circumstances it may be desirable to store output data in addition to printing the same. This may conveniently be done by causing a tape to be punched at the same time as the local printing operation is effected. If desired, such a tape may then be used to transmit that data to the remote station or stations. Other storage devices, such as magnetic tape, can, of course, be used instead of a punched tape.

*Summary.*—There has now been described a complete operating sequence of the computer printer. The sequence may be repeated as often as desired, either with the same sample or with substituted samples in the direct reader. Once the print button has been pushed, the measuring functions for the next test may be started since the printing portions of the circuit are then effectively separated from the measuring and computing portions. However, before pressing the start button to start the next measuring and computing cycle, the direct reader should be reset in the customary manner, i.e., the various timing relays and other elements within the direct reader are reset so that a new analysis may be made. To commence a new cycle of operations, the start button PB3 is depressed. This will initiate the direct reader sequence of operations, consisting of preburn, exposure, rest and measure cycles. It also causes the time converter units to return to zero setting, and then starts the forward timing motors of the time converters so that they will reach constant speed and be ready to drive the time converter potentiometers when the time signals actuate the electric clutches. After the time converters have completed their operations, automatic recycling of one or more channels may take place if there is an insufficient quantity of any element in the sample to produce a reliable analysis under spark conditions. The recycling sequence automatically converts the direct reader from spark to arc operation and resets the exposure and measure circuits. At this point the time converters in the computer printer are not reset, but the input connections of the deficient element channel are switched to a different time converter calibrated for arc operation. During this time the computer servo and the readers remain connected. The reader for the element which is being re-analyzed on arc is automatically switched from its spark time converter to the corresponding arc unit. As the arc cycle comes to completion and the computer servo balances, the readers will stop running. The results indicated at this time represent the computed answers figured on a basis of true concentration ratios for all elements involved, irrespective of whether they were analyzed by spark or arc excitation.

The operator, by observing the motions of the reader dials and by noting when they come to rest, may determine when the computing and reading cycles have been completed. When he is certain that this condition has been reached, he may depress the teletype print button. This initiates the printing process and essentially disconnects the reading and printing equipment from the spectrograph and computer components. At the time the readers are disconnected, the rounder solenoids are actuated so that the analysis is given to the nearest whole number. The purpose of disconnecting the readers is twofold. First, the rounder solenoid and linkage would "fight" the reader servo if this were not done. Second, it is desired to place the equipment in such a condition that the spectrograph may continue on a subsequent analysis while the results of the first analysis are being considered.

The printing operation may be repeated as often as desired (either locally or remotely) without affecting any other parts of the equipment. When the operator has checked his results and found them satisfactory, they may be transmitted to a remote station or stations by the operation of the remote print control. The results of the analysis may be stored in the readers indefinitely, but when it is time to accept new data from the computer, the reader dials must be cleared and the reader reconnected to the computer. This function is performed by the reader clear button (PB2), which also eliminates all heat numbers or other information which may have been punched into the push button panels (such as panel 354). This control also disconnects the printing equipment so that the teletype will not print a record without the next identifying heat and test numbers having been inserted. Thus, although the readers may now properly indicate the computer data for the next analysis, the printing cycle cannot be actuated until a new set of heat numbers has been punched. In other words, the heat number buttons, besides encoding the message with the proper heat numbers (or other information), may also act to reconnect the printing equipment. The second analysis can now be printed locally and transmitted remotely. If desired, the spectrograph may be reset and started again as soon as the print button has been actuated and the operator is ready to accept the newly computed results.

It should be understood that the circuits and other elements described can be modified to achieve varying operational conditions and to accommodate and yield data in varying forms. While the invention has been described in particular embodiments thereof and in a particular use, various modifications thereof will occur to those skilled in the art without departing from the spirit and scope of the invention, as set forth in the appended claims.

What is claimed is:

1. A data conversion system, comprising a source of a plurality of signal indications, means automatically to convert said signal indications into electrical circuit parameters each representative of a respective item of intermediate data, said items of intermediate data being interrelated in accordance with a predetermined mathematical functional relationship and each bearing a proportional relationship to a respective signal indication, means responsive to a predetermined unsatisfactory item of intermediate data to act on said source to cause said source to produce a substitute signal indication in place of the signal indication corresponding to said unsatisfactory item of intermediate data and to convert said substitute signal indication into a satisfactory item of intermediate data, an electrical network representative of said functional relationship, means to derive from said parameters a plurality of electrical quantities each proportional to a respective one of said items of intermediate data and to apply said quantities to said network, means to vary the condition of said network in a sense to produce an electrical output for each of said electrical quantities, each of said electrical outputs being proportional to a respective item of final data, said items of final data constituting a solution of said functional relationship, and means to produce an intelligible record of said items of final data.

2. A data conversion system, comprising a source of a plurality of separate electrical impulses each of which varies individually in time duration as a function of relative concentration of an element in a sample, individual means to convert each of said electrical impulses into an electrical circuit parameter representative of a respective relative concentration of an element in said sample, said relative concentrations being interrelated in accordance with a predetermined mathematical equation, an electrical network representative of said equation, means to derive from said parameters a plurality of electrical quantities each proportional to a respective one of said relative concentrations and to apply said quantities to said network as a group, means to vary the condition of said network in accordance with said electrical quantities in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

3. A data conversion system for use with a direct reading spectrograph whose output is a plurality of separate electrical impulses each of which varies individually as a function of the ratio of concentration of a particular element to a reference element in the sample analyzed by said spectrograph, comprising individual means to convert each of said electrical impulses into electrical parameter proportional to the corresponding concentration ratio, a computer circuit arranged to solve the mathematical equation interrelating said concentration ratios, means to derive from said parameters a plurality of electrical quantities each proportional to a respective one of said parameters and to apply said quantities as a group to said circuit in accordance with the relative magnitudes of said quantities and, means to vary the condition of said circuit in a sense to produce a plurality of electrical outputs constituting a solution of said equation and each being proportional to the actual concentration of a respective one of the elements in said sample, and means automatically to produce an intelligible record of said element concentrations.

4. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses automatically to adjust the resistance of each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities as a group to said circuit, means to vary the condition of said circuit in accordance with the relative magnitudes of said quantities and in a sense to produce a plurality of electrical outputs constituting a solution of said equation and each being proportional to the actual concentration of a respective one of the elements in said sample, and means automatically to produce an intelligible record of siad element concentrations.

5. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses automatically to adjust the resistance of each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities as a group to said computer circuit, means to vary the condition of said computer circuit in accordance with the relative magnitudes of said quantities and in a sense to produce a plurality of electrical outputs constituting a solution of said equation and each being proportional to the actual concentration of a respective one of the elements in said sample, encoding means coupled to said computer circuit and being arranged to establish an individual code for each element concentration, and printing means responsive to each established individual codes to produce a printed record of said element concentrations.

6. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses to adjust the resistance to each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities to said computer circuit, means to vary the condition of said computer circuit in a sense to produce a plurality of electrical outputs constituting a solution of said equation and each being proportional to the actual concentration of a respective one of the elements in said sample, a reading circuit for each of said electrical outputs, said reading circuits each containing a servo-mechanism for establishing an analog quantity corresponding to the digital value of the associated element concentration and a range sensing circuit for establishing the actual value of the associated element concentration within established ranges, encoding means responsive to each analog quantity to establish an individual code for the digital value of each element concentration, and means responsive to said individual codes for printing a record of said element concentrations, said last mentioned means also being responsive to the established ranges determined by said range sensing circuits for including in said records an indication of said ranges.

7. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses to adjust the resistance of each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities to said computer circuit, means to vary the condition of said computer circuit in a sense to produce a plurality of electrical outputs constituting a solution of said equation and each being proportional to the actual concentration of a respective one of the elements in said sample, a reading circuit for each of said electrical outputs, said reading circuits each containing a servo-mechanism for establishing a mechanical analog corresponding to the digital value of the associated element concentration and a range sensing circuit for determining the actual value of the associated element concentration within predetermined ranges, encoding means responsive to each mechanical analog to establish an individual code for the digital value of each element concentration, and printing means responsive to said individual codes for printing a record of said element concentrations, said printing means also being responsive to the ranges determined by said range sensing circuits for including in said records an indication of said ranges.

8. A data conversion system as set forth in claim 7 in which said predetermined ranges differ from each other by a factor of ten and in which the printing means prints a decimal point in the digital record of each element concentration at a point corresponding to the decimal range determined by the corresponding range sensing circuit.

9. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses to adjust the resistance of each of said potentiometers to a respective value proportional to the corresponding concentration ratio, a computer circuit arranged to solve the mathematical equation interrelating said concentration ratios, means to derive from said potentiometers a plurality of voltages each proportional to a respective one of said concentration ratios and to apply said voltages to said computer circuit, a first servo-mechanism responsive to changes in condition of said computer circuit caused by said voltages for producing variation of said voltages in a sense to return said computer circuit to a predetermined condition, said voltages, after said variation thereof, constituting a solution of said equation and each being proportional to the actual concentration of a respective one of the elements in said sample, a reading circuit for each of said varied voltages, said reading circuits each containing a second servo-mechanism for establishing a mechanical analog corresponding to the digital value of the associated element concentration and a range sensing circuit for establishing the actual value of the associated element concentration within predetermined ranges, encoding means responsive to each mechanical analog to establish an individual code for the digital value of each element concentration, and means responsive to said individual codes for printing a record of said element concentrations, said last mentioned means also being responsive to the ranges determined by said range sensing circuits for including in said records an indication of said ranges.

10. A data conversion system for use with a direct reading spectrograph arranged for both spark and arc tests of samples and whose output is a plurality of separate electrical impulses each of which varies individually as a function of the ratio of concentration of a particular element to a reference element in the sample analyzed by said spectrograph, comprising a first potentiometer for each of said impulses produced as a result of a spark test, at least one second potentiometer for an impulse produced for at least a selected one of said elements as a result of an arc test of said sample, means responsive to each of said spark test electrical impulses to adjust the resistance of each of said first potentiometers to a respective value proportional to the corresponding concentration ratio, circuit means associated with the spark test potentiometer for said selected element and responsive to a concentration ratio below the spark test range for said selected element to cause said spectrograph to perform an arc test of said sample thereby to supply an arc test electrical impulse for said selected element to said second potentiometer, means responsive to said arc test to adjust the resistance of said second potentiometer to a value proportional to the corresponding concentration ratio, a computer circuit arranged to solve the mathematical equation interrelating said concentration ratios, means to derive from said first potentiometers a plurality of electrical quantities each proportional to a respective one of said concentration ratios and to apply said quantities to said computer circuit, means responsive to operation of said circuit means to derive the electrical quantity for said selected element from said second potentiometer instead of from the corresponding first potentiometer, means to vary the condition of said computer circuit in a sense to produce a plurality of electrical outputs constituting a solution of said equation and each being proportional to the actual concentration of a respective one of the elements in said sample, and means automatically to produce a printed record of said actual concentrations.

11. A data conversion system for use with a direct reading spectrograph arranged for both spark and arc tests of samples and whose output is a plurality of separate electrical impulses each of which varies individually in time duration as a function of the ratio of concentration of a particular element to a reference element in the sample analyzed by said spectrograph, comprising a first potentiometer for each of said impulses produced as a result of a spark test, at least one second potentiometer for an impulse produced for at least a selected one of said elements as a result of an arc test of said sample, means responsive to the time duration of each of said spark test electrical impulses to adjust the resistance of each of said first potentiometers to a respective value proportional to the corresponding concentration ratio, circuit means associated with the spark test potentiometer for said selected element and responsive to a concentration ratio below the spark test range for said selected element to cause said spectrograph to perform an arc test of said sample thereby to supply an arc test electrical impulse for said selected element to said second potentiometer, means responsive to the time duration of said arc test to adjust the resistance of said second potentiometer to a value proportional to the corresponding concentration ratio, a computer circuit arranged to solve the mathematical equation interrelating said concentration ratios, means to derive from said first potentiometers a plurality of electrical quantities each proportional to a respective one of said concentration ratios and to apply said quantities to said computer circuit, means responsive to operation of said circuit means to derive the electrical quantity for said selected element from said second potentiometer instead of from the corresponding first potentiometer, means to vary the condition of said computer circuit in a sense to produce a plurality of electrical outputs constituting a solution of said equation and each being proportional to the actual concentration of a respective one of the elements in said sample, a reading circuit for each of said electrical outputs, said reading circuits each containing a servo-mechanism for establishing an analog quantity corresponding to the digital value of the associated element concentration and a range sensing circuit for establishing the actual value of the associated element concentration within predetermined ranges, encoding means responsive to each analog quantity to establish an individual code for the digital value of each element concentration, printing means responsive to said individual codes for printing a record of said element concentrations, said printing means also being responsive to the ranges determined by said range sensing circuits for including in the record for each element an indication of the appropriate range, and means responsive to a concentration ratio below the range of the associated first potentiometer or, where provided, the associated second potentiometer, for including in the corresponding record an indication that such range has been exceeded.

12. A data conversion system, as set forth in claim 11, including manually operable means to establish individual codes for items of additional desired information, and means associated with said printing means for automatically printing said items of additional information at preselected points in said printed record.

13. A data conversion system, as set forth in claim 12, including an interlock circuit for preventing the printing of said record until said manually operable means has been operated for at least selected ones of said additional items of information.

14. A data conversion system, as set forth in claim 12, in which the means associated with the printing means includes a stepping switch having an individual contact for each character in the element concentration records and for each character in the items of additional information.

15. A data conversion system, as set forth in claim 14, in which the printing means is a teletype machine having a switch arranged to be operated after printing of each character by said machine and in which advance of said stepping switch from contact to contact is controlled by operation of said switch.

16. A data conversion system, comprising a direct reading spectrograph whose output is a plurality of separate electrical impulses each of which varies individually in time duration as a function of the ratio of concentration of a particular element to a reference element in the sample analyzed by said spectrograph, a time converter for each of said impulses, each time converter comprising a potentiometer having taps spaced along the winding thereof in accordance with the functional relationship between impulse duration and concentration ratio for the associated element, a wiper, a motor arranged to move said wiper from tap to tap of said potentiometer and a clutch for operatively connecting said motor and said wiper, means intercoupling said spectrograph and said time converter clutches so that each output impulse of said spectrograph causes the clutch of an associated time converter to operatively connect the time converter motor and wiper whereby the wiper will advance from tap to tap of the associated potentiometer until the end of the impulse causes the clutch to disengage the motor and wiper, the resistance values of the potentiometer taps at which said wipers stop at the end of the respective impulses being proportional to the concentration ratios of the respective elements in said sample, a computer circuit arranged to solve the mathematical equation interrelating said concentration ratios, means to derive from the wipers of said potentiometers a plurality of electrical quantities each proportional to a respective one of said concentration ratios and to apply said quantities of said computer circuit, means to vary the condition of said computer circuit in a sense to produce a plurality of electrical outputs constituting a solution of said equation and each being proportional to the actual concentration of a respective one of the elements in said sample, and means automatically to produce a printed record of said actual concentrations.

17. A data conversion system, comprising a direct reading spectrograph whose output is a plurality of separate electrical impulses each of which varies individually in time duration as a function of the ratio of concentration of a particular element to a reference element in the sample analyzed by said spectrograph, a time converter for each of said impulses, each time converter comprising a potentiometer having taps spaced along the winding thereof in accordance with the functional relationship between impulse duration and concentration ratio for the associated element, a wiper, a motor arranged to move said wiper from tap to tap of said potentiometer and a clutch for operatively connecting said motor and said wiper, means intercoupling said spectrograph and said time converter clutches so that each output impulse of said spectrograph causes the clutch of an associated time converter to operatively connect the time converter motor and wiper whereby the wiper will advance from tap to tap of the associated potentiometer until the end of the impulse causes the clutch to disengage the motor and wiper, the resistance values of the potentiometer taps at which said wipers stop at the end of the respective impulses being proportional to the concentration ratios of the respective elements in said sample, a source of variable potential for said potentiometers, a computer circuit including said potentiometers and arranged to solve the mathematical equation interrelating said concentration ratios, means to derive from said wipers a plurality of voltages each proportional to a respective one of said concentration ratios and to apply said voltages to said computer circuit, means to vary said variable potential thereby to vary the condition of said computer circuit in a sense to produce a plurality of electrical outputs constituting a solution of said equation and each being proportional to the actual concentration of a respective one of the elements in said sample, and means automatically to produce a printed record of said actual concentrations.

18. A data conversion system, comprising a direct reading spectrograph whose output is a plurality of separate electrical impulses each of which varies individually in time duration as a function of the ratio of concentration of a particular element to a reference element in the sample analyzed by said spectrograph, a time converter for each of said impulses, each time converter comprising a potentiometer having taps spaced along the winding thereof in accordance with the functional relationship between impulse duration and concentration ratio for the associated element, a wiper, a motor arranged to move said wiper from tap to tap of said potentiometer and a clutch for operatively connecting said motor and said wiper, means intercoupling said spectrograph and said time converter clutches so that each output impulse of said spectrograph causes the clutch of an associated time converter to operatively connect the time converter motor and wiper whereby the wiper will advance from tap to tap of the associated potentiometer until the end of the impulse causes the clutch to disengage the motor and wiper, the resistance values of the potentiometer taps at which said wipers stop at the end of the respective impulses being proportional to the concentration ratios of the respective elements in said sample, a source of variable potential for said potentiometers, a computer circuit arranged to solve the mathematical equation interrelating said concentration ratios, said computer circuit including, as one branch, said potentiometers and having another branch joined to said one branch at a point, a source of constant potential for said other branch, means to derive from said wipers a plurality of voltages each proportional to a respective one of said concentration ratios and to apply said voltages to said point, means to vary said variable potential thereby to maintain said point at a predetermined potential at which the respective voltages at said wipers constitute a solution of said equation, each of said voltages being proportional to the actual concentration of a respective one of the elements in said sample, and means automatically to produce a printed record of said actual concentrations.

19. A data conversion system, as set forth in claim 18, in which said one branch of said computer includes a resistance element whose value may be adjusted to compensate for elements present in said sample other than said particular elements and said reference element.

20. A data conversion system, comprising a direct reading spectrograph whose output is a plurality of separate electrical impulses each of which varies individually as a function of the ratio of concentration of a particular element to a reference element in the sample analyzed by said spectrograph, a potentiometer for each of said spectrograph, a potentiometer for each of said impulses, means responsive to each of said electrical impulses to adjust the resistance of each of said potentiometers to a respective value proportional to the corresponding concentration ratio, a computer circuit including said potentiometers and arranged to solve the mathematical equation interrelating said concentration ratios, said computer circuit also including a variable resistance element whose value may be adjusted to compensate for elements present in said sample other than said particular elements and said reference element, means to derive from said potentiometers a plurality of electrical quantities each proportional to a respective one of said concentration ratios and to apply said quantities to said circuit, means to vary the condition of said circuit in a sense to produce a plurality of electrical outputs constituting a solution of said equation and each being proportional to the actual concentration of a respective one of the elements in said sample, and means automatically to produce an intelligible record of said element concentrations.

21. A data conversion system, comprising a direct reading spectrograph arranged for both spark and arc tests of samples and whose output is a plurality of separate electrical impulses each of which varies individually in time duration as a function of the ratio of concentration of a particular element to a reference element in the sample analyzed by said spectrograph, a first potentiometer for each of said impulses produced as a result of a spark test for a selected one of said elements and at least one second potentiometer for an impulse produced as a result of an arc test of said sample, means responsive to the time duration of each of said spark test electrical impulses to adjust the resistance of each of said first potentiometers to a respective value proportional to the corresponding concentration ratio, a computer circuit including said first potentiometers and arranged to solve the mathematical equation interrelating said concentration ratios, said computer circuit including a resistance element whose value may be adjusted to compensate for elements present in said sample other than said particular elements and said reference element, means associated with the spark test potentiometer for said selected element and responsive to a concentration ratio below the spark test range for said selected element to cause said spectrograph to perform an arc test of said sample thereby to supply an arc test electrical impulse to said second potentiometer and to substitute said second potentiometer for the corresponding first potentiometer in said computer circuit, means responsive to the time duration of said arc test electrical impulse to adjust the resistance of said second potentiometer to a value proportional to the corresponding concentration ratio, means to derive from the potentiometers connected in said computer circuit a plurality of electrical quantities each proportional to a resepective one of said concentration ratios and to apply said quantities to said computer circuit, means to vary the condition of said computer circuit in a sense to produce a plurality of electrical outputs constituting a solution of said equation and each being proportional to the actual concentration of a respective one of the elements in said sample, a reading circuit for each of said electrical outputs, said reading circuits each containing a servo-mechanism for establishing an analog quantity corresponding to the digital value of the associated element concentration and a range sensing circuit for establishing the actual value of the associated element concentration within established ranges, encoding means responsive to each analog quantity to establish an individual code for the digital value of each element concentration, and means responsive to said individual codes for printing a record of said element concentrations, said last mentioned means also being responsive to the established ranges determined by said range sensing circuits for including in said records an indication of said ranges.

22. A data conversion system for use with a direct reading spectrograph whose output is a plurality of separate electrical impulses each of which varies individually as a function of the ratio of concentration of a particular element to a reference element in the sample analyzed by said spectrograph, comprising a first potentiometer for each of said impulses, means responsive to each of said electrical impulses to adjust the resistance of each of said first potentiometers to a respective value proportional to the corresponding concentration ratio, a computer circuit arranged to solve the mathematical equation interrelating said concentration ratios, means to derive from said first potentiometers a plurality of electrical quantities each proportional to a respective one of said concentration ratios and to apply said quantities to said computer circuit, means to vary the condition of said computer circuit in a sense to produce a plurality of electrical output voltages constituting a solution of said equation and each being proportional to the actual concentration of a respective one of the elements in said sample, a reading and encoding device for each of said outputs, said devices being coupled to said computer circuit and being arranged to establish an individual code for each element concentration, each reading and encoding device comprising a second potentiometer, a range sensing circuit, means to apply the corresponding computer output voltage to said range sensing circuit, a source of a plurality of fixed voltages delimiting voltage ranges within which said computer output voltage may lie, said range sensing circuit including means to compare said computer output voltage and said fixed voltages and to apply the lower fixed voltage delimiting the voltage range within which said computer output voltage lies to one end of said second potentiometer, motor means arranged to move the slider of said second potentiometer, a comparison circuit arranged to compare said computer output voltage and the voltage developed at the slider of said second potentiometer, means to apply the output of said comparison circuit to said motor means to cause the latter to move the slider of said potentiometer in a sense to reduce the difference between the voltage appearing at said slider and said computer output voltage, a plurality of electrical circuits each arranged, when completed, to establish an individual code combination for a particular digit, an encoding mechanism having a plurality of possible positions in each of which said mechanism is included in a unique combination of said electrical circuits, and means intercoupling said motor means and said encoding mechanism to cause the latter to assume the position thereof corresponding to the position of said slider whereby the unique combination of said electrical circuits corresponding to the digital value of the computer output voltage is set up, and printing means responsive to said established individual codes to produce a printed record of said element concentrations.

23. A data conversion system, as set forth in claim 22, in which switching means is provided sequentially and momentarily to complete the electrical circuits whereby the printing means prints a record of the element concentrations.

24. A data conversion system, as set forth in claim 23, in which said printing means is a teletype machine and in which the teletype machine is provided with a switch for initiating said circuit completion after printing of each character.

25. A data conversion system, as set forth in claim 24, in which additional electrical circuits are provided and are arranged, when completed, to establish individual code combinations for desired additional information and in which said switching means is arranged to complete said electrical circuits and said additional electrical circuits in predetermined order.

26. Analytical apparatus, comprising a direct reading spectrograph whose output is a plurality of separate electrical impulses each of which varies individually as a function of the ratio of concentration of a particular element to a reference element in the sample analyzed by said spectograph, means automatically to convert each of said electrical impulses into an electrical parameter proportional to the corresponding concentration ratio, a computer circuit arranged to solve a mathematical relationship interrelating said concentration ratios, means to derive from said parameters a plurality of electrical quantities each proportional to a respective one of said parameters and to apply said quantities as a group to said circuit, means to vary the condition of said circuit in accordance with the relative magnitudes of said quantities and in a sense simultaneously to produce a plurality of electrical outputs constituting a solution of said mathematical relationship and each being proportional to the actual concentration of a respective one of the elements in said sample, and means automatically to produce an intelligible record of said element concentrations.

27. Analytic apparatus, comprising a source of a plurality of separate electrical indications which vary individually as individual functions of relative concentrations of elements in a sample analyzed by said source and which are interrelated as a group so as to be representative of substantially the total concentration of elements in said sample, individual means automatically to convert said electrical indications into corresponding electrical circuit parameters, each individual means being arranged to operate in accordance with a respective corresponding one of said individual functions whereby each of said electrical circuit parameters is representative of a respective relative concentration of elements in said sample and whereby said electrical circuit parameters as a group are representative of the total concentration of elements in said sample in accordance with a predetermined mathematical equation, an electrical network having circuit elements representative of said equation, means to derive from said parameters a plurality of electrical quantities each proportional to a respective one of said relative concentrations and to apply said quantities as a group to said network, means to vary the condition of said network in accordance with the relative magnitudes of said quantities and in a sense simultaneously to produce an electrical output for each of said electrical quantities, each of said electrical outputs being proportional to a rsepective element concentration, said element concentrations constituting a solution of said equation, and means automatically to produce an intelligible record of said element concentrations.

28. Analytical apparatus, comprising a direct reading spectrograph whose output is a plurality of separate electrical impulses each of which varies individually as a function of the ratio of concentration of a particular element to a reference element in the sample analyzed by said spectrograph, means automatically to convert each of said electrical impulses into an electrical parameter proportional to the corresponding concentration ratio, a computer circuit arranged to solve the mathematical equation interrelating said concentration ratios, namely:

$$\%Fe = \frac{100}{1 + \frac{\%x}{\%Fe} + \frac{\%y}{\%Fe} + \frac{\%z}{\%Fe} + \cdots}$$

where Fe represents the reference element in said sample and $x$, $y$, $z$, etc., represent particular elements in said sample, means to derive from said parameters a plurality of electrical quantities each proportional to a respective one of said parameters and to apply said quantities as a group to said circuit, means to vary the condition of said circuit in accordance with the relative magnitudes of said quantities and in a sense simultaneously to produce a plurality of electrical outputs constituting a solution of said mathematical equation and each being proportional to the actual concentration of a respective one of the elements in said sample, and means automatically to produce an intelligible record of said element concentrations.

29. Analytic apparatus, comprising a source of a plurality of separate electrical impulses which vary individually as individual functions of relative concentrations of elements analyzed by said source and which are interrelated as a group so as to be representative of substantially the total concentration of elements in said sample, individual means automatically to convert said electrical impulses into corresponding electrical circuit parameters, each individual means being arranged to operate in accordance with a respective corresponding one of said individual functions whereby each of said electrical circuit parameters is representative of a respective relative concentration of elements in said sample and whereby said electrical circuit parameters as a group are representative of the total concentration of elements in said sample in accordance with a predetermined mathematical equation, an electrical network having circuit elements representative of said equation and including adjustable means to compensate for elements present in said sample other than elements for which said electrical impulses are provided, means to derive from said parameters a plurality of electrical quantities each proportional to a respective one of said relative concentrations and to apply said quantities as a group to said network, means to vary the condition of said network in accordance with the relative magnitudes of said quantities and in a sense to produce an electrical output for each of said electrical quantities, each of said electrical outputs being proportional to a respective element concentration, said element concentrations constituting a solution of said equation, and means automatically to produce an intelligible record of said element concentrations.

30. Analytical apparatus, comprising a direct reading spectrograph arranged for at least two different types of excitation and whose output is a plurality of separate electrical impulses each of which varies individually as a function of the ratio of concentration of a particular element to a reference element in the sample analyzed by said spectrograph, means to convert each of said electrical impulses into an electrical parameter lying within a given range and being proportional to the corresponding concentration ratio, means responsive to an electrical impulse which tends to yield a parameter outside of the corresponding given range to cause said spectrograph to repeat said analysis with a type of excitation different from the one first used and to substitute the resultant electrical impulse and corresponding parameter for the electrical impulse and corresponding parameter outside of its given range, a computer circuit arranged to solve a mathematical relationship interrelating said concentration ratios, means to derive from said parameters a plurality of electrical quantities each proportional to a respective one of said parameters and to apply said quantities to said circuit, means to vary the condition of said circuit in a sense to produce a plurality of electrical outputs constituting a solution of said mathematical relationship and each being porportional to the actual concentration of a respective one of the elements in said sample, and means automatically to produce an intelligible record of said element concentrations.

31. Analytical apparatus, comprising a direct reading spectrograph whose output is a plurality of separate electrical impulses each of which varies individually as a function of the ratio of concentration of a particular element to a reference element in the sample analyzed by said spectrograph, means automatically to convert each of said electrical impulses into an electrical parameter proportional to the corresponding concentration ratio, a computer circuit arranged to solve a mathematical relationship interrelating said concentration ratios, means to derive from said parameters a plurality of electrical quantities each proportional to a respective one of said parameters and to apply said quantities to said circuit, means to vary the condition of said circuit in a sense to produce a plurality of electrical outputs constituting a solution of said mathematical relationship and each being proportional to the actual concentration of a respective one of the elements in said sample, encoding means coupled to said circuit and being arranged to establish an individual code for each element concentration, first printing means responsive to said established individual codes for producing a printed record of said element concentrations in a predetermined form, and second printing means responsive to said established individual codes for producing another printed record of said element concentrations in a form different from said predetermined form.

32. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses to adjust the resistance of each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities to said computer circuit, means to vary the condition of said computer circuit in a sense to produce a plurality of electrical outputs constituting a solution of said equation and each being proportional to the actual concentration of a respective one of the elements in said sample, a reading circuit for each of said electrical outputs, said reading circuits each containing a servo-mechanism for establishing an analog quantity corresponding to the digital value of the associated element concentration and a range sensing circuit for establishing the actual value of the associated element concentration within established ranges, encoding means responsive to each analog quantity to establish an individual code for the digital value of each element concentration, and means responsive to said individual codes for printing a record of said element concentrations, said last mentioned means also being responsive to the established ranges determined by said range sensing circuits for including in said records an indication of said ranges, means to disconnect said reading circuits from said electrical outputs thereby to permit analysis of a succeeding sample while the record of the preceding sample is being printed, and means operative upon operation of said last mentioned means to cause said servo-mechanisms to maintain said established analog quantities despite disconnection of said electrical outputs from said reader circuits.

33. A data conversion system for use with a direct reading spectrograph whose output is a plurality of separate electrical impulses each of which varies individually as a function of the ratio of concentration of a particular element to a reference element in the sample analyzed by said spectrograph, comprising a potentiometer for each of said impulses, means responsive to each of said electrical impulses to adjust the resistance of each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities to said computer circuit, means to vary the condition of said computer circuit in a sense to produce a plurality of electrical outputs constituting a solution of said equation and each being proportional to the actual concentration of a respective one of the elements in said sample, reading means for said electrical outputs, said reading means containing at least one servo-mechanism for establishing, for each electrical output, an analog quantity corresponding to the digital value of the associated element concentration and at least one range sensing circuit for establishing, for each electrical output, the actual value of the associated element concentration within established ranges, encoding means responsive to each analog quantity to establish an individual code for the digital value of each element concentration, and means responsive to said individual codes for printing a record of said element concentrations, said last mentioned means also being responsive to the established ranges determined by said range sensing circuits for including in said records an indication of said ranges.

34. A data conversion system for use with a direct reading spectrograph whose output is a plurality of separate electrical impulses each of which varies individually in time duration as a function of the ratio of concentration of a particular element to a reference element in the sample analyzed by said spectrograph, comprising a potentiometer for each of said impulses, means responsive to the time duration of each of said electrical impulses to adjust the resistance of each of said potentiometers to a respective value proportional to the corresponding concentration ratio, a computer circuit arranged to solve the mathematical equation interrelating said concentration ratios, means to derive from said potentiometers a plurality of electrical quantities each proportional to a respective one of said concentration ratios and to apply said quantities to said computer circuit, means to vary the condition of said computer circuit in a sense to produce a plurality of electrical outputs constituting a solution of said equation and each being proportional to the actual concentration of a respective one of the elements in said sample, a reading circuit for each of said electrical outputs, said reading circuits each containing a servo-mechanism for establishing an analog quantity corresponding to the digital value of the associated element concentration and a range sensing circuit for establishing the actual value of the associated element concentration within established ranges, encoding means responsive to each analog quantity to establish an individual code for the digital value of each element concentration, means to establish individual codes for indicating said established ranges and for indicating preselected additional information, first means responsive to at least certain of said individual codes for printing a record of said element concentrations, said established ranges and at least some of said additional information, and second means responsive to at least certain of said individual codes for printing another record of said element concentrations, said estabilshed ranges and at least some of said additional information.

35. A data conversion system as set forth in claim 34 in which the additional information contained in one of said records is different from that contained in the other of said records.

36. A data conversion system, comprising a source of a plurality of separate electrical impulses each of which varies individually as an individual function of a relative concentration of a respective element in a sample and which impulses are interrelated as a group so as to be representative of substantially the total concentration of elements in said sample, individual means to convert each of said electrical impulses into a corresponding electrical circuit parameter, each individual means being arranged to operate in accordance with a respective corresponding one of said individual functions whereby each of said electrical circuit parameters is representative of the relative concentration of a respective element in said sample and whereby said electrical circuit parameters as a group are representative of the total concentration of elements in said sample in accordance with a predetermined mathematical equation, an electrical network having circuit elements representative of said equation, means to derive from said parameters a plurality of electrical quantities each proportional to a respective one of said relative concentrations and to apply said quantities as a group to said network, means to vary the condition of said network in accordance with said electrical quantities in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

37. A data conversion system, comprising a source of a plurality of separate electrical impulses each of which varies individually as an individual function of a relative concentration of a respective element in a sample with respect to a reference concentration and which impulses are interrelated as a group so as to be representative of substantially the total concentration of elements in said sample, individual means to convert each of said electrical impulses into a corresponding electrical circuit parameter, each individual means being arranged to operate in accordance with a respective corresponding one of said individual functions whereby each of said electrical circuit parameters is representative of the relative concentration of a respective element in said sample with respect to said reference concentration and whereby said electrical circuit parameters as a group are representative of the total concentration of elements in said sample in accordance with a predetermined mathematical equation, an electrical network having circuit elements representative of said equation, means to derive from said parameters a plurality of electrical quantities each proportional to a respective one of said relative concentrations and to apply said quantities as a group to said network, means to vary the condition of said network in accordance with the relative magnitudes of said quantities and in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

38. A data conversion system, comprising a source of a plurality of separate electrical impulses each of which varies individually as an individual function of a relative concentration of a respective element in a sample with respect to another element in said sample and which impulses are interrelated as a group so as to be representative of substantially the total concentration of elements in said sample, individual means to convert each of said electrical impulses into a corresponding electrical circuit parameter, each individual means being arranged to operate in accordance with a respective corresponding one of said individual functions whereby each of said electrical circuit parameters is representative of the relative concentration of a respective element in said sample with respect to said other element in said sample and whereby said electrical circuit parameters as a group are representative of the total concentration of elements in said sample in accordance with a predetermined mathematical equation, an electrical network having circuit elements representative of said equation, means to derive from said parameters a plurality of electrical quantities each proportional to a respective one of said relative concentrations and to apply said quantities as a group to said network, means to vary the condition of said network in accordance with the relative magnitudes of said quantities and in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

39. In combination with a direct reading spectrograph having a plurality of separate time outputs each of which is representative of the log of the intensity ratio of radiation of an unknown element to a reference element, means for converting said outputs into voltages each of which is representative of concentration ratio, a current summing network for feeding all of said outputs to a reference point, a constant current branch connected to said reference point, a servo mechanism responsive to the voltage at said reference point for adjusting the voltage supplying the current summing network so that the resultant voltage at the reference point is zero, and means for reading the adjusted voltages.

40. A data conversion system, comprising a source of a plurality of separate electrical impulses each of which varies individually as an individual function of a relative concentration of a respective element in a sample and which impulses are interrelated as a group so as to be representative of substantially the total concentration of elements in said sample, individual means to convert each of said electrical impulses into a corresponding electrical circuit parameter, each individual means being arranged to operate in accordance with a respective corresponding one of said individual functions whereby each of said electrical circuit parameters is representative of the relative concentration of a respective element in said sample and whereby said electrical circuit parameters as a group are representative of the total concentration of elements in said sample in accordance with a predetermined mathematical equation, an electrical network having circuit elements representative of said equation and including adjustable means to compensate for elements present in said sample other than elements for which said electrical impulses are provided, means to derive from said parameters a plurality of electrical quantities each proportional to a respective one of said relative concentrations and to apply said quantities as a group to said network, means to vary the condition of said network in accordance with said electrical quantities in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

41. A data conversion system, comprising a source of a plurality of separate electrical impulses each of which varies individually as an individual function of a relative concentration of a respective element in a sample with respect to a reference concentration and which impulses are interrelated as a group so as to be representative of substantially the total concentration of elements in said sample, individual means to convert each of said electrical impulses into a corresponding electrical circuit parameter, each individual means being arranged to operate in accordance with a respective corresponding one of said individual functions whereby each of said electrical circuit parameters is representative of the relative concentration of a respective element in said sample with respect to said reference concentration and whereby said electrical circuit parameters as a group are representative of the total concentration of elements in said sample in accordance with a predetermined mathematical equation, an electrical network having circuit elements representative of said equation and including adjustable means to compensate for elements present in said sample other than elements for which said electrical impulses are provided, means to derive from said parameters a plurality of electrical quantities each proportional to a respective one of said relative concentrations and to apply said quantities as a group to said network, means to vary the condition of said network in accordance with the relative magnitudes of said quantities and in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

42. A data conversion system, comprising a source of a plurality of separate electrical impulses each of which varies individually as an individual function of a relative concentration of a respective element in a sample with respect to another element in said sample and which impulses are interrelated as a group so as to be representative of substantially the total concentration of elements in said sample, individual means to convert each of said electrical impulses into a corresponding electrical circuit parameter, each individual means being arranged to operate in accordance with a respective corresponding one of said individual functions whereby each of said electrical circuit parameters is representative of the relative concentration of a respective element in said sample with respect to said other element in said sample and whereby said electrical circuit parameters as a group are representative of the total concentration of elements in said sample in accordance with a predetermined mathematical equation, an electrical network having circuit elements representative of said equation and including adjustable means to compensate for elements present in said sample other than elements for which said electrical impulses are provided, means to derive from said parameters a plurality of electrical quantities each proportional to a respective one of said relative concentrations and to apply said quantities as a group to said network, means to vary the condition of said network in accordance with the relative magnitudes of said quantities and in a sense to produce simultaneously an electrical output for each of said electrical quantities, each of said electrical outputs being proportional to a respective element concentration, said element concentrations constituting a solution of said equation, and means automatically to produce an intelligible indication of said element concentrations.

References Cited in the file of this patent

UNITED STATES PATENTS

| | | |
|---|---|---|
| 2,446,874 | Geffner et al. | Aug. 10, 1948 |
| 2,682,995 | Carey et al. | July 6, 1954 |
| 2,700,750 | Dickinson | Jan. 25, 1955 |
| 2,713,457 | Bubb | July 19, 1955 |
| 2,714,309 | Redemske | Aug. 2, 1955 |
| 2,755,021 | Silvertooth | July 17, 1956 |

(Other references on following page)

UNITED STATES PATENTS

| | | |
|---|---|---|
| 2,786,629 | Piety | Mar. 26, 1957 |
| 2,787,428 | Schuck | Apr. 2, 1957 |
| 2,813,451 | Stickney | Nov. 19, 1957 |
| 2,824,285 | Hunt | Feb. 18, 1958 |

OTHER REFERENCES

Journal of the Optical Society of America (Carpenter et al.), vol. 37, No. 9, pp. 707–713, September 1947.

Electronic Equipment (Edwards), pp. 20–23, August 1955.

UNITED STATES PATENT OFFICE
CERTIFICATE OF CORRECTION

Patent No. 3,027,086      March 27, 1962

Charles W. Hargens III, et al.

It is hereby certified that error appears in the above numbered patent requiring correction and that the said Letters Patent should read as corrected below.

Column 4, line 59, for "could" read -- would --; column 11, line 37, after "$V_y$" insert a comma; column 12, line 46, for "becomes" read -- become --; column 13, line 50, for "is" read -- it --; column 16, lines 31 and 32 should appear as shown below instead of as in the patent:

E output=E input X GDC+KGDC +E input X GDC X GAC column 18, line 43, for "0.1%" read -- 0-1% --; column 21, line 42, for "in" read -- is --; column 23, lines 20, 23 and 26, for "D.-C.", each occurrence, read -- D.C. --; column 34, line 13, for "contract" read -- contact --; column 35, line 26, for the upside-down line, read -- K40, which had been released when switch S9 opened. --; line 70, for "to", second occurrence, read -- of --; column 38, lines 70 and 71, strike out "in accordance with the relative magnitudes of said quantities and"; line 72, after "circuit" insert -- in accordance with the relative magnitudes of said quantities and --; column 39, line 50, for "each" read -- said --; line 59, for "to", second occurrence, read -- of --; column 43, line 8, for "of" read -- to --; column 44, lines 27 and 28, strike out "a potentiometer for each of said spectrograph,"; column 46, line 72, for "rsepective" read -- respective --; column 50, line 3, for "estabilshed" read -- established --.

Signed and sealed this 14th day of August 1962.

(SEAL)
Attest:

ERNEST W. SWIDER
Attesting Officer

DAVID L. LADD
Commissioner of Patents